(12) United States Patent
Hayden et al.

(10) Patent No.: US 7,383,463 B2
(45) Date of Patent: Jun. 3, 2008

(54) INTERNET PROTOCOL BASED DISASTER RECOVERY OF A SERVER

(75) Inventors: John M Hayden, Holliston, MA (US); Hongmei Wang, Shrewsbury, MA (US); Frederic Corniquet, Le Pecq (FR); Philippe Armangau, Acton, MA (US); Pascal Donette, Magny les Hameaux (FR); Aju John, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 793 days.

(21) Appl. No.: 10/771,591

(22) Filed: Feb. 4, 2004

(65) Prior Publication Data

US 2005/0193245 A1 Sep. 1, 2005

(51) Int. Cl.
*G06F 11/00* (2006.01)
(52) U.S. Cl. ............................................. 714/4; 714/57
(58) Field of Classification Search .................. 714/57, 714/4, 6, 7
See application file for complete search history.

(56) References Cited

U.S. PATENT DOCUMENTS

| | | | |
|---|---|---|---|
| 4,686,620 A | 8/1987 | Ng | 364/200 |
| 4,755,928 A | 7/1988 | Johnson et al. | 364/200 |
| 5,060,185 A | 10/1991 | Naito et al. | 364/900 |
| 5,434,994 A | 7/1995 | Shaheen et al. | 395/500 |
| 5,513,314 A * | 4/1996 | Kandasamy et al. | 714/6 |
| 5,535,381 A | 7/1996 | Kopper | 395/600 |
| 5,596,706 A | 1/1997 | Shimazaki et al. | 395/182.04 |
| 5,673,382 A * | 9/1997 | Cannon et al. | 714/6 |
| 5,742,792 A | 4/1998 | Yanai et al. | 395/489 |
| 5,819,292 A | 10/1998 | Hitz et al. | 707/203 |
| 5,829,046 A | 10/1998 | Tzelnic et al. | 711/162 |
| 5,829,047 A | 10/1998 | Jacks et al. | 711/162 |
| 5,835,953 A | 11/1998 | Ohran | 711/162 |
| 5,870,764 A | 2/1999 | Lo et al. | 707/203 |
| 5,873,116 A | 2/1999 | Van Fleet | 711/147 |
| 5,893,140 A | 4/1999 | Vahalia et al. | 711/118 |
| 5,901,327 A | 5/1999 | Ofek | 395/849 |
| 5,915,264 A | 6/1999 | White et al. | 711/168 |
| 5,974,563 A | 10/1999 | Beeler, Jr. | 714/5 |

(Continued)

OTHER PUBLICATIONS

EMC Celerra SE5 File Server, EMC Corporation, Hopkinton, Mass. 01748-9103, 2002, 2 pages.

(Continued)

*Primary Examiner*—Joshua A Lohn
(74) *Attorney, Agent, or Firm*—Richard C. Auchterlonie; Novak Druce & Quigg, LLP.

(57) ABSTRACT

For disaster recovery of a file server at an active site, the files that define the user environment of the file server are replicated to a virtual server at a disaster recovery site. To switch over user access from the active site to the disaster recovery site, the disaster recovery system determines whether there are sufficient network interfaces and file system mounts at the disaster recovery site. If so, the required resources are reserved, and user access is switched over. If not, an operator is given a list of missing resources or discrepancies, and a choice of termination or forced failover. Interruptions during the failover can be avoided by maintaining a copy of user mappings and a copy of session information at the disaster recovery site, and keeping alive client-server connections and re-directing client requests from the active site to the disaster recovery site.

9 Claims, 55 Drawing Sheets

U.S. PATENT DOCUMENTS

| | | | |
|---|---|---|---|
| 6,029,175 A | 2/2000 | Chow et al. | 707/104 |
| 6,035,412 A | 3/2000 | Tamer et al. | 714/6 |
| 6,052,797 A | 4/2000 | Ofek et al. | 714/6 |
| 6,076,148 A | 6/2000 | Kedem | 711/162 |
| 6,101,497 A | 8/2000 | Ofek | 707/10 |
| 6,243,825 B1 * | 6/2001 | Gamache et al. | 714/4 |
| 6,269,431 B1 | 7/2001 | Dunham | 711/162 |
| 6,279,011 B1 | 8/2001 | Muhlestein | 707/204 |
| 6,324,581 B1 | 11/2001 | Xu et al. | 709/229 |
| 6,356,863 B1 * | 3/2002 | Sayle | 703/27 |
| 6,366,558 B1 * | 4/2002 | Howes et al. | 370/219 |
| 6,434,681 B1 | 8/2002 | Armangau | 711/162 |
| 6,496,908 B1 | 12/2002 | Kamvysselis et al. | 711/162 |
| 6,502,205 B1 | 12/2002 | Yanai et al. | 714/7 |
| 6,549,992 B1 | 4/2003 | Armangau et al. | 711/162 |
| 6,609,213 B1 * | 8/2003 | Nguyen et al. | 714/4 |
| 6,629,266 B1 * | 9/2003 | Harper et al. | 714/38 |
| 6,944,785 B2 * | 9/2005 | Gadir et al. | 714/4 |
| 6,978,398 B2 * | 12/2005 | Harper et al. | 714/13 |
| 7,069,468 B1 * | 6/2006 | Olson et al. | 714/7 |
| 7,080,378 B1 * | 7/2006 | Noland et al. | 718/104 |
| 7,143,307 B1 * | 11/2006 | Witte et al. | 714/6 |
| 7,146,524 B2 * | 12/2006 | Patel et al. | 714/6 |
| 2002/0120660 A1 * | 8/2002 | Hay et al. | 709/100 |
| 2002/0188711 A1 * | 12/2002 | Meyer et al. | 709/223 |
| 2003/0018927 A1 * | 1/2003 | Gadir et al. | 714/4 |
| 2003/0079154 A1 * | 4/2003 | Park et al. | 714/1 |
| 2003/0217119 A1 | 11/2003 | Raman et al. | 709/219 |
| 2004/0030727 A1 | 2/2004 | Armangau et al. | 707/200 |
| 2004/0030846 A1 | 2/2004 | Armangau et al. | 711/154 |
| 2004/0030951 A1 | 2/2004 | Armangau et al. | 714/6 |
| 2007/0168478 A1 * | 7/2007 | Crosbie | 709/221 |

OTHER PUBLICATIONS

"Celerra File Server in the E-Infostructure," EMC Corporation, Hopkinton, Mass., 2000, 9 pages.

"Celerra File Server Architecture for High Availability," EMC Corporation, Hopkinton, Mass., Aug. 1999, 7 pages.

Chutani, Sailesh, et al., "The Episode File System," Carnegie Mellon University IT Center, Pittsburgh, PA, Jun. 1991, 18 pages.

D.L. Burkes and R.K. Treiber, "Design Approaches for Real-Time Transaction Processing Remote Site Recovery," Digest of Papers in Spring COMPCON90, Feb. 26-Mar. 2, 1990, *Thirty-Fifth IEEE Computer Society International Conference*, San Francisco, CA, pp. 568-572.

"Network Data Management Protocol (NDMP)," http://www.ndmp.org/info/; NDMP White Paper, http://www.ndmp.org/info/technology/wp.html; "Protocol Specification Summary, Document Version: 1.7.2S," http://www.ndmp.org/info/spec_summary.html; "Legato Systems Embraces the NDMP Standard: Legato Networker Software to be NDMP Compliant in Q3," http://www-ftp.legata.com/News/Press/PR209.html; published at least as early as Oct. 11, 1999, 17 pages.

R. Stager and D. Hitz, Internet Draft filename "draft-stager-iquard-netapp-backup-05.txt," *Network Data Management Protocol (NDMP)*, last update Oct. 12, 1999, pp. 1-73.

Koop, P., "Replication at Work. (four companies use Oracle and Sybase replication servers to solve business problems)," DBMS, vol. 8, No. 3, p. 54(4), Mar. 1995.

"Remote Mirroring Technical White Paper", Copyright 1994-2002 Sun Microsystems, published at least as early as May 17, 2002 at sun.com, 25 pages.

"EMC TechNote:" Celerra Replicator, EMC Corporation, Hopkinton, MA, 2002 (5 pages).

"EMC TimeFinder Product Description Guide", EMC Corporation, Hopkinton, MA, 1998, pp. 1-31.

"Leveraging SnapView/IP in Oracle8i Environments with the CLARiiON IP4700 File Server", Engineering White Paper, EMC Corporation, Hopkinton, MA, Feb. 13, 2002, pp. 1-16.

"Using EMC CLARiiON FC4700 and SnapView with Oracle 8i", Engineering White Paper, EMC Corporation, Hopkinton, MA, Mar. 4, 2002, pp. 1-22.

"Disaster Recovery Guidelines for using HP SureStore E XP256, Continuous Access XP with Oracle Databases," Rev 1.03, Hewlett-Packard Company, Palo Alto, CA, May 2000, pp. 1-28.

"Enterprise Volume Manager and Oracle8 Best Practices", Compaq White Paper, Compaq Computer Corporation, Dec. 1999, pp. 1-11.

Veritas Database Edition for Oracle, "Guidelines for Using Storage Checkpoint and Storage Rollback with Oracle Databases", Veritas Software Corporation, Mountain View, CA, Aug. 2001, pp. 1-16.

"Veritas Volume Replication and Oracle Databases", A Solutions White Paper, Veritas Software Corporation, Mountain View, CA, May 29, 2000, pp. 1-31.

Nabil Osorio and Bill Lee, "Guidelines for Using Snapshot Storage Systems for Oracle Databases", Oracle Corporation, Redwood Shores, CA, Oct. 2001, pp. 1-12.

"EMC PowerPath—Storage Virtualization," EMC Corporation, Hopkinton, MA, 2003, 2 pages.

"Symmetrix Data Migration Services," EMC Corporation, Hopkinton, MA, Jul. 2001, 4 pages.

"Graphical Management of the Celerra Network Server For the Microsoft Administrator," EMC Corporation, Hopkinton, MA, May 18, 2003, pp. 1-20.

"EMC Services—Celerra NS600 Basic Implementation," EMC Corporation, Hopkinton, MA, Dec. 2002, 2 pages.

"Celerra NS600 and NS600S QuickStart," EMC Corporation, Hopkinton, MA, Jul. 2003, 2 pages.

"Virtual Machines as Special class of Operating Systems," www.softpanorama.org/Freenix/vm.shtml, printed Jul. 24, 2002, pp. 1-13.

"Active Directory Overview," www.microsoft.com, Microsoft Corporation, Bellevue, WA, Jun. 30, 1999, 13 pages.

Phillips, John, "Storage Consolidation and Data Protection using MultiStore™," www.netapp.com, Network Appliance, Inc., Sunnyvale, CA, 2003, 13 pages.

VFM™ (Virtual File Manager) Software, www.netapp.com, Network Appliance, Inc., Sunnyvale, CA, 2003, 4 pages.

Watson & Benn, "Multiprotocol Data Access: NFS, CIFS, and HTTP," www.netapp.com, Network Appliance, Inc., Sunnyvale, CA, 2003, 29 pages.

"Active Directory Overview," www.microsoft.com, Microsoft Corp., Bellevue, WA, 2003, 15 pages.

"NTLM," www.opengroup.org, 2003, 16 pages.

Glass, Eric, "The NTLM Authentication Protocol," http://davenport.sourceforge.net, 2003, 50 pages.

Rozmanov, Dmitry, "NTLM Authorization Proxy Server," www.geocities.com/rozmanov, Dec. 13, 2002, 4 pages.

Remsburg, Michael, "Unix File Systems—Directories," http://opserver.dist.maricopa.edu, Maricopa Community Colleges, Phoenix, AZ, May 13, 2002, 3 pages.

"Kerberos: The Network Authentication Protocol," http://web.mit.edu/kerberos/www/, Massachusetts Institute of Technology, Cambridge, MA, 2003, 2 pages.

Steiner et al., "Kerberos: An Authentication Service for Open Network Systems," Massachusetts Institute of Technology, Cambridge, MA, Mar. 30, 1988, pp. 1-15.

Deuby, Sean, "Windows 2000 Glossary," Windows & .Net Magazine, www.winnetmag.com, Penton Media, Inc., Loveland, CO., 2003, 7 pages.

"Windows 2000 Startup and Logon Traffic Analysis," www.microsoft.com, Microsoft Corp., Bellevue, WA, Aug. 2000, 34 pages.

"Microsoft Windows 2000 Server—Implementing Registry-Based Group Policy for Applications," Microsoft Corp., Bellevue, WA, 2000, pp. 1-49.

* cited by examiner

INTERNET PROTOCOL BASED DISASTER RECOVERY OF A SERVER

BACKGROUND OF THE INVENTION

1. Field of the Invention

The present invention relates generally to data processing networks, and more particularly to disaster recovery of servers in a data processing network.

3. Description of Related Art

Large institutional users of data processing systems such as banks, insurance companies, and stock market traders must and do take tremendous steps to insure back up data availability in case of a major disaster. More recently these institutions have developed a heightened awareness of the importance of reducing business interruptions due to server failure in view of the many natural disasters and other world events including power grid failures and the destruction of the World Trade Center in New York City.

Business interruption due to loss of a server at a primary site can be minimized by maintaining a replica of the server at a secondary site. The state of the server at the secondary site should be synchronized to a prior consistent state of the server at the primary site in order to reduce disruption when service is switched over to the secondary site upon loss of service at the primary site. This has been done by remote data mirroring of storage volumes or files in the primary site to the secondary site.

It is possible to minimize disruption due to server failure by synchronous mirroring of server state and stored data between a primary server and a secondary server. This technique is practical when the primary server and the secondary server are close together so that there is no more than a tolerable loss of performance due to the delay in transmitting state and data changes from the primary server to the secondary server and returning an acknowledgement from the secondary server to the primary server.

Unfortunately, for disaster protection, the primary server and secondary server must be geographically separated. For protection from large-scale disasters such as hurricanes, power grid failure, and nuclear attack, the primary and secondary servers should be separated by hundreds of kilometers. Once the primary and secondary servers are separated by hundreds of kilometers, it is impractical to mirror synchronously all of the state and data between the primary and secondary servers. This is especially true when it is desired to use a shared data transmission link rather than a dedicated link between the primary and secondary servers.

For remote mirroring, it is often impractical for the primary and secondary servers to have identical software or hardware. In the usual case, the primary server has been installed for quite some time in a local data network and the hardware and software of the primary server is obsolete. Yet there is no desire to replace the existing primary server because of the cost of labor and possible disruption of service during replacement. In this situation, it is often possible to use a single present generation hardware platform to support multiple virtual secondary servers.

A virtual secondary server provides replicas of the files stored on the primary server. The files include user data files, server configuration files, and user configuration information (such as user accounts, file ownership, and trustee rights) so that users may login immediately and access data in the event of a failure of the primary server.

For the typical case where the primary server and the virtual secondary server are supported by different hardware and software, there have been problems setting up the virtual secondary server in such a way that users can immediately access data in the event of a failure on the primary server. The hardware supporting the virtual secondary server must have sufficient storage and network resource for the virtual secondary server. The network resources must be set up to avoid address conflicts. Problems with storage resources, network resources, and address conflicts may not become known until an attempted failover from the primary server to the virtual secondary server.

SUMMARY OF THE INVENTION

In accordance with a first aspect, the invention provides a method in a disaster recovery environment including a primary file server at an active site and a secondary virtual file server at a disaster recovery site remote from the active site. The secondary virtual file server includes a collection of files being replicated from the primary server to the disaster recovery site. The secondary virtual file server needs resources including network interfaces and file system mounts at the disaster recovery site for providing user access at the disaster recovery site. The method includes determining whether there are sufficient network interfaces and file system mounts at the disaster recovery site for the virtual secondary file server for providing user access at the disaster recovery site, and upon finding that there are sufficient network interfaces and file system mounts at the disaster recovery site for the virtual secondary file server for providing user access at the disaster recovery site, reserving the network interfaces and file system mounts that are needed at the disaster recovery site for providing user access at the disaster recovery site.

In accordance with another aspect, the invention provides a method in a disaster recovery environment including a primary file server at an active site and a secondary virtual file server at a disaster recovery site remote from the active site. The secondary virtual file server includes a collection of files being replicated from the primary server to the disaster recovery site. The secondary virtual file server needs resources including network interfaces and file system mounts at the disaster recovery site for providing user access at the disaster recovery site. The method includes determining whether there are sufficient network interfaces and file system mounts at the disaster recovery site for the virtual secondary file server for providing unrestricted user access at the disaster recovery site once a configuration change would be made to the primary file server, and upon finding that there are insufficient network interfaces and file system mounts at the disaster recovery site for the virtual secondary file server for providing unrestricted user access at the disaster recovery site once the configuration change would be made to the primary file server, providing an operator with a list of missing resources or discrepancies, and receiving from the operator a choice of termination or configuration change, and upon receiving from the operator a choice of configuration change, reserving network interfaces and file system mounts that are available and needed at the disaster recovery site for providing user access at the disaster recovery site, and then performing failover of user access from the active site to the disaster recovery site.

In accordance with another aspect, the invention provides a method in a disaster recovery environment including a primary file server at an active site and a secondary virtual file server at a disaster recovery site remote from the active site. The secondary virtual file server includes a collection of files being replicated from the primary server to the disaster recovery site. The secondary virtual file server needs resources including network interfaces and file system mounts at the disaster recovery site for providing user access at the disaster recovery site. The method includes determining whether there are sufficient network interfaces and file system mounts at the disaster recovery site for the virtual secondary file server for providing unrestricted user access at the disaster recovery site, and upon finding that there are insufficient network interfaces and file system mounts at the disaster recovery site for the virtual secondary file server for providing unrestricted user access at the disaster recovery site, providing an operator with a list of missing resources or discrepancies, and receiving from the operator a choice of termination or forced failover, and upon receiving from the operator a choice of forced failover, reserving network interfaces and file system mounts that are available and needed at the disaster recovery site for providing user access at the disaster recovery site, and then performing failover of user access from the active site to the disaster recovery site.

In accordance with another aspect, the invention provides a method in a disaster recovery environment including a primary file server at an active site and a secondary virtual file server at a disaster recovery site remote from the active site. The secondary virtual file server includes a collection of files being replicated from the primary server to the disaster recovery site. The method includes maintaining a primary copy of user mappings at the disaster recovery site and a read-only cache of the user mappings at the active site during user file access at the active site, and upon failover of user access from the primary file server at the active site to the virtual secondary server at the disaster recovery site, accessing the primary copy of user mappings at the disaster recovery site in order to continue user file access at the disaster recovery site.

In accordance with another aspect, the invention provides a method in a disaster recovery environment including a primary file server at an active site and a secondary virtual file server at a disaster recovery site remote from the active site. The secondary virtual file server includes a collection of files being replicated from the primary server to the disaster recovery site. The method includes maintaining a copy of user session information at the disaster recovery site during user file access at the active site, and upon failover of user access from the primary file server at the active site to the virtual secondary server at the disaster recovery site, accessing the copy of the user session information at the disaster recovery site so that users accessing files of the primary file server at the active site continue to access copies of the files at the disaster recovery site without a need to log onto the disaster recovery site.

In accordance with yet another aspect, the invention provides a method in a disaster recovery environment including a primary file server at an active site and a secondary virtual file server at a disaster recovery site remote from the active site. The secondary virtual file server includes a collection of files being replicated from the primary server to the disaster recovery site. The method includes a network client accessing the primary file server at the active site using a CIFS connection and detecting a failure of the primary file server to respond to a file access request in a timely fashion, and upon detecting the failure of the primary file server to respond to the file access request in a timely fashion, the network client redirecting the file access request to the disaster recovery site without terminating the CIFS connection.

In accordance with yet another aspect, the invention provides a method in a disaster recovery environment including a primary file server at an active site and a secondary virtual file server at a disaster recovery site remote from the active site. The primary file server stores a collection of user files, and the secondary virtual file server stores secondary copies of the user files. The method includes replicating changes to the user files from the primary file server to the secondary copies of the user files in the secondary virtual file server during user file access at the active site, and during the replication of the changes to the user files from the primary file server to the secondary virtual file server, creating at the disaster recovery site a series of snapshot copies of the secondary virtual file server, each of the snapshot copies providing a group consistent state of the user files in the secondary virtual file server.

In accordance with still another aspect, the invention provides a disaster recovery system including a primary file server at an active site, and a secondary virtual file server at a disaster recovery site remote from the active site. The secondary virtual file server includes a collection of files being replicated from the primary server to the disaster recovery site. The secondary virtual file server needs resources including network interfaces and file system mounts at the disaster recovery site for providing user access at the disaster recovery site. The disaster recovery system is programmed for responding to a request from a system administrator by determining whether there are sufficient network interfaces and file system mounts at the disaster recovery site for the virtual secondary file server for providing user access at the disaster recovery site, and upon finding that there are sufficient network interfaces and file system mounts at the disaster recovery site for the virtual secondary file server for providing user access at the disaster recovery site, reserving the network interfaces and file system mounts that are needed at the disaster recovery site for providing user access at the disaster recovery site.

In accordance with yet another aspect, the invention provides a disaster recovery system including a primary file server at an active site, and a secondary virtual file server at a disaster recovery site remote from the active site. The secondary virtual file server includes a collection of files being replicated from the primary server to the disaster recovery site. The secondary virtual file server needs resources including network interfaces and file system mounts at the disaster recovery site for providing user access at the disaster recovery site. The disaster recovery system is programmed for responding to a configuration change request from a system administrator by determining whether there are sufficient network interfaces and file system mounts at the disaster recovery site for the virtual secondary file server for providing unrestricted user access at the disaster recovery site once a configuration change would be made to the primary file server, and upon finding that there are insufficient network interfaces and file system mounts at the disaster recovery site for the virtual secondary file server for providing unrestricted user access at the disaster recovery site once a configuration change would be made to the primary file server, providing the system administrator with a list of missing resources or discrepancies, and receiving from the system administrator a choice of termination or configuration change, and upon receiving from the system administrator a choice of configuration change, reserving network interfaces and file system mounts that are available and needed at the disaster recovery site for providing user access at the disaster recovery site once the configuration change would be made to the primary file server, and then performing the configuration change to the primary file server.

In accordance with yet another aspect, the invention provides a disaster recovery system including a primary file server at an active site, and a secondary virtual file server at a disaster recovery site remote from the active site. The secondary virtual file server includes a collection of files being replicated from the primary server to the disaster recovery site. The secondary virtual file server needs resources including network interfaces and file system mounts at the disaster recovery site for providing user access at the disaster recovery site. The disaster recovery system is programmed for responding to a failover request from a system administrator by determining whether there are sufficient network interfaces and file system mounts at the disaster recovery site for the virtual secondary file server for providing unrestricted user access at the disaster recovery site, and upon finding that there are insufficient network interfaces and file system mounts at the disaster recovery site for the virtual secondary file server for providing unrestricted user access at the disaster recovery site, providing the system administrator with a list of missing resources or discrepancies, and receiving from the system administrator a choice of termination or forced failover, and upon receiving from the system administrator a choice of forced failover, reserving network interfaces and file system mounts that are available and needed at the disaster recovery site for providing user access at the disaster recovery site, and then performing failover of user access from the active site to the disaster recovery site.

In accordance with yet another aspect, the invention provides a disaster recovery system including a primary file server at an active site, and a secondary virtual file server at a disaster recovery site remote from the active site. The secondary virtual file server includes a collection of files being replicated from the primary server to the disaster recovery site. The disaster recovery system is programmed for maintaining a primary copy of user mappings at the disaster recovery site and a read-only cache of the user mappings at the active site during user file access at the active site, and upon failover of user access from the primary file server at the active site to the virtual secondary server at the disaster recovery site, for accessing the primary copy of user mappings at the disaster recovery site in order to continue user file access at the disaster recovery site.

In accordance with yet still another aspect, the invention provides a disaster recovery system including a primary file server at an active site, and a secondary virtual file server at a disaster recovery site remote from the active site. The secondary virtual file server includes a collection of files being replicated from the primary server to the disaster recovery site. The disaster recovery site is programmed for maintaining a copy of user session information at the disaster recovery site during user file access at the active site, and upon failover of user access from the primary file server at the active site to the virtual secondary server at the disaster recovery site, accessing the copy of the user session information at the disaster recovery site so that users accessing files of the primary file server at the active site continue to access copies of the files at the disaster recovery site without a need to log onto the disaster recovery site.

In accordance with a final aspect, the invention provides a disaster recovery system including a primary file server at an active site, and a secondary virtual file server at a disaster recovery site remote from the active site. The secondary virtual file server includes a collection of files being replicated from the primary server to the disaster recovery site. The disaster recovery system further includes at least one network client programmed for accessing the primary file server at the active site using a CIFS connection and detecting a failure of the primary file server to respond to a file access request in a timely fashion, and upon detecting the failure of the primary file server to respond to the file access request in a timely fashion, redirecting the file access request to the disaster recovery site without terminating the CIFS connection.

In accordance with a final aspect, the invention provides a disaster recovery system including a primary file server at an active site, and a secondary virtual file server at a disaster recovery site remote from the active site. The primary file server stores a collection of user files, and the secondary virtual file stores secondary copies of the user files. The system is programmed for replicating changes to the user files from the primary file server to the secondary copies of the user files in the secondary virtual file server during user file access at the active site. The disaster recovery site is programmed for creating at the disaster recovery site a series of snapshot copies of the secondary virtual file server during the replication of the changes to the user files from the primary file server to the secondary virtual file server. Each of the snapshot copies provides a group consistent state of the user files in the secondary virtual file server.

BRIEF DESCRIPTION OF THE DRAWINGS

Other objects and advantages of the invention will become apparent upon reading the detailed description with reference to the drawings, in which.

Figure 1:
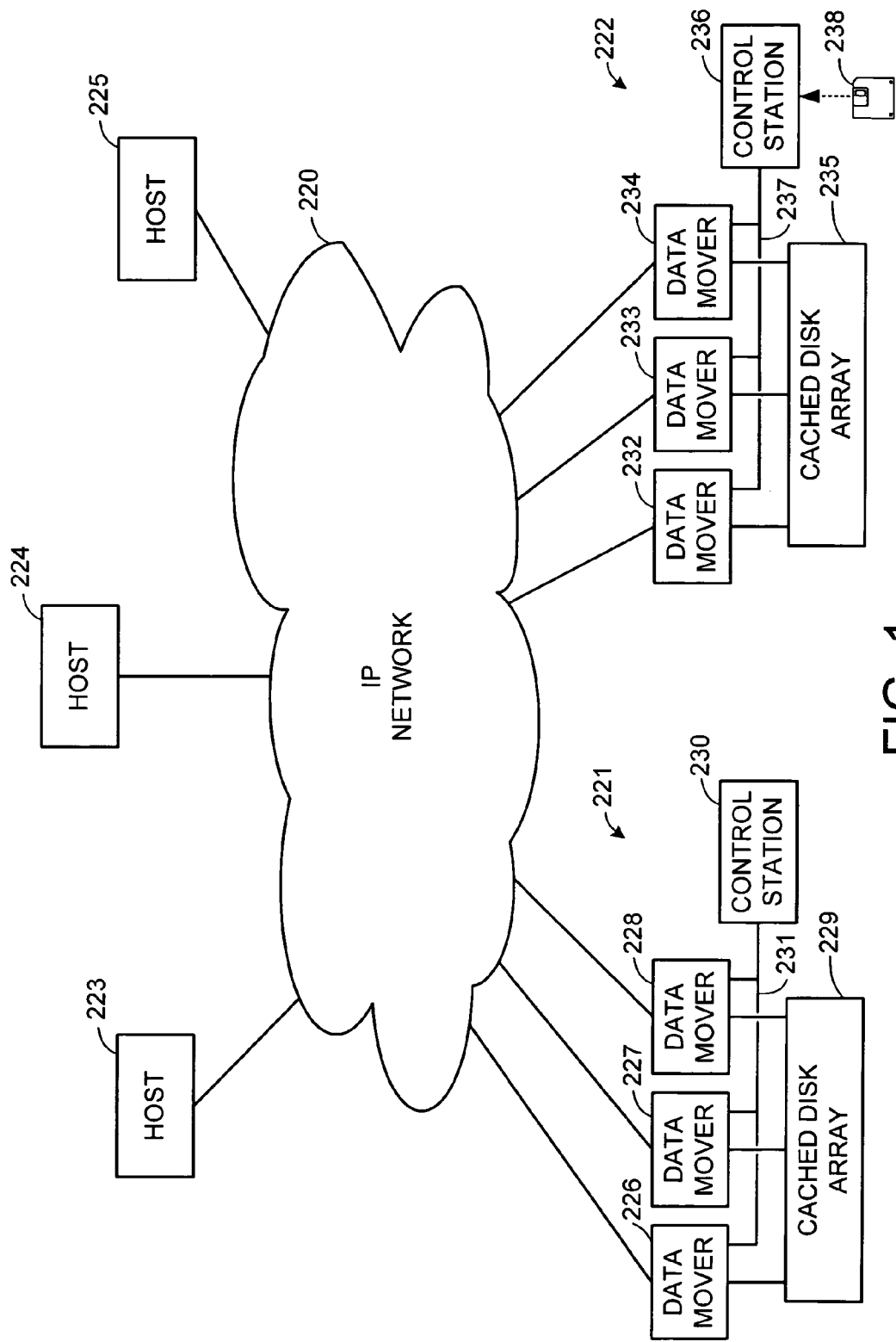
FIG. 1 is a block diagram of an IP network including multiple hosts and multiple data mover computers.

While the invention is susceptible to various modifications and alternative forms, specific embodiments thereof have been shown by way of example in the drawings and will be described in detail. It should be understood, however, that it is not intended to limit the form of the invention to the particular forms shown, but on the contrary, the intention is to cover all modifications, equivalents, and alternatives falling within the scope of the invention as defined by the appended claims.

DESCRIPTION OF ILLUSTRATIVE EMBODIMENTS

Remote Data Replication Facility

FIG. 1 shows an IP network 220 including multiple network file servers 221, 222, and multiple hosts 223, 224, 225. The hosts and network file servers, for example, can be distributed world wide and linked via the Internet. Each of the network file servers 221, 222, for example, has multiple data movers 226, 227, 228, 232, 233, 234, for moving data between the IP network 220 and the cached disk array 229, 235, and a control station 230, 236 connected via a dedicated dual-redundant data link 231, 237 among the data movers for configuring the data movers and the cached disk array 229, 235. Further details regarding the network file servers 221, 222 are found in Vahalia et al., U.S. Pat. No. 5,893,140, incorporated herein by reference.

In operation, it is desired for each of the network file servers 221, 222 to provide read-only access to a copy of the same file system. For example, each of the network file servers could be programmed to respond to user requests to access the same Internet site. The IP network 220 routes user requests to the network file servers 221, 222 in the same continent or geographic region as the user. In this fashion, the user load is shared among the network file servers.

In the wide-area network of FIG. 1, it is desired to perform read-write updating of the respective file system copies in the network file servers 221, 222 while permitting concurrent read-only access by the hosts. It is also desired to distribute the updates over the IP network.

Figure 2:
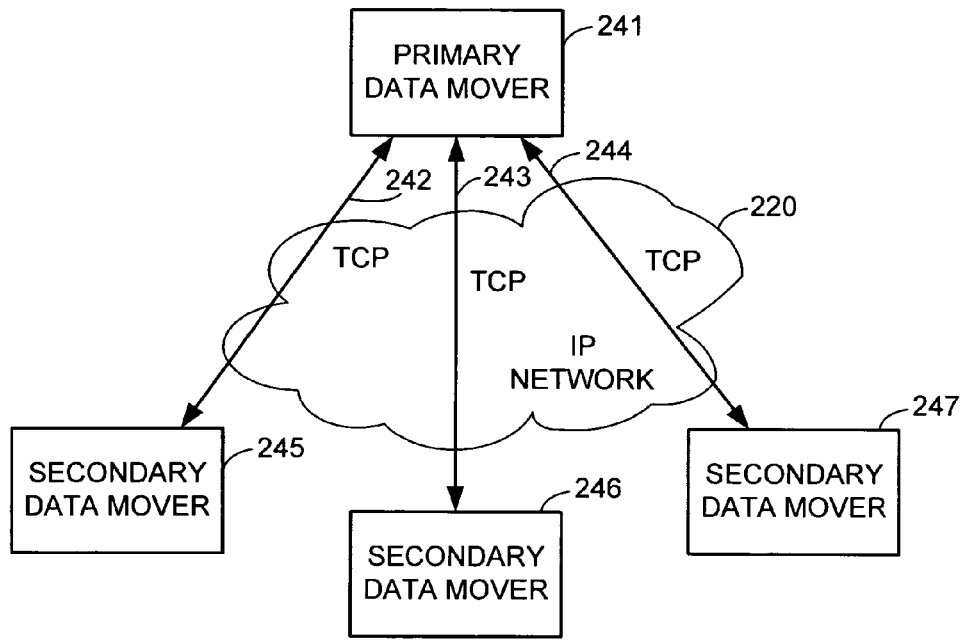
FIG. 2 is a block diagram showing a primary data mover distributing remote copy data to multiple secondary data movers in the IP network by establishing a Transmission Control Protocol (TCP) connection with each of the secondary data movers.

There are a number of ways that updates could be distributed over the IP network from a primary data mover to multiple secondary data movers. As shown in FIG. 2, for example, a primary data mover establishes a connection 242, 243, 244 in accordance with the industry-standard Transmission Control Protocol (TCP) over the IP network 220 to each secondary data mover 245, 246, 247, and then concurrently sends the updates to each secondary data mover over the TCP connection. When the updates need to be distributed to a large number of secondary data movers, however, the amount of time for distributing the updates may become excessive due to limited resources (CPU execution cycles, connection state, or bandwidth) of the primary data mover 241. One way of extending these limited resources would be to use existing IP routers and switches to implement "fan out" from the primary data mover 241 to the secondary data movers 245, 246, 247. Still, a mechanism for reliability should be layered over the Internet Protocol.

Figure 3:
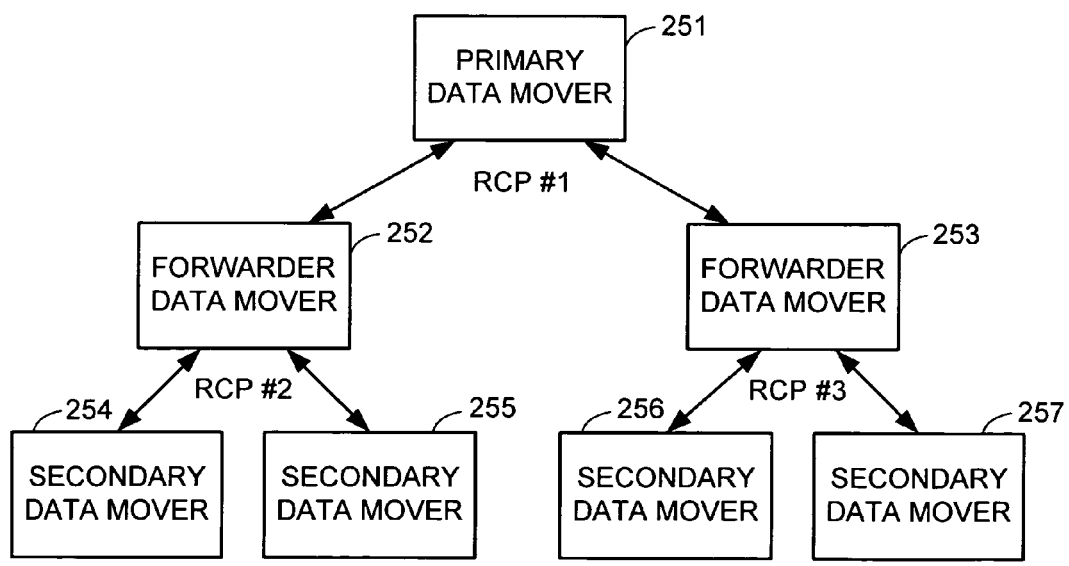
FIG. 3 is a block diagram showing a primary data mover distributing remote copy data to multiple data movers through forwarder data movers.

FIG. 3 shows that the time for distributing updates from a primary data mover 251 to a large number of secondary data movers 254, 255, 256, 257 can be reduced by using intermediate data movers 252, 253 as forwarders. The primary data mover 251 sends the updates to the forwarder data movers 252, 253, and each of the forwarder data movers sends the updates to a respective number of secondary data movers. The forwarder data movers 252, 253 may themselves be secondary data movers; in other words, each may apply the updates to its own copy of the replicated read-only file system. The distribution from the primary data mover 251 to the forwarder data movers 252, 253 can be done in a fashion suitable for wide-area distribution (such as over TCP connections). The forwarding method of replication of FIG. 3 also has the advantage that the distribution from each forwarder data mover to its respective data movers can be done in a different way most suitable for a local area or region of the network. For example, some of the forwarder data movers could use TCP connections, and others could use a combination of TCP connections for control and UDP for data transmission, and still other forwarders could be connected to their secondary data movers by a dedicated local area network.

For implementing the replication method of FIG. 3 over the Internet Protocol, there are a number of desired attributes. It is desired to maintain independence between the primary data mover and each of the secondary data movers. For example, a new secondary data mover can be added at any time to replicate an additional remote copy. The primary data mover should continue to function even if a secondary data mover becomes inoperative. It is also desired to maintain independence between the replication method and the IP transport method. Replication should continue to run even if the IP transport is temporarily inactive. It is desired to recover in a consistent fashion from a panic or shutdown and reboot. A record or log of the progress of the replication can be stored for recovery after an interruption. It is desired to build re-usable program blocks for the replication function, so that the program blocks for the replication function can be used independent of the location of the primary file system or its replicas.

In a preferred implementation, independence between the replication process, the IP transport method, and the primary file system being replicated, is ensured by use of a save volume. The save volume is a buffer between the data producer (i.e., the host or application updating the primary file system), the replication process, and the data consumer (the secondary data movers). The save volume stores the progress of the replication over the Internet Protocol so as to maintain the consistency of the replication process upon panic, reboot, and recovery. The transport process need not depend on any "in memory" replication information other than the information in the save volume, so as to permit the replication process to be started or terminated easily on any data mover for load shifting or load balancing.

When a save volume is used, it can be shared between a primary data mover and a secondary data mover in the case of local file system replication, or a primary copy of the shared volume can be kept at the primary site, and a secondary copy of the shared volume can be kept at the secondary site, in the case of remote file system replication.

Figure 4:
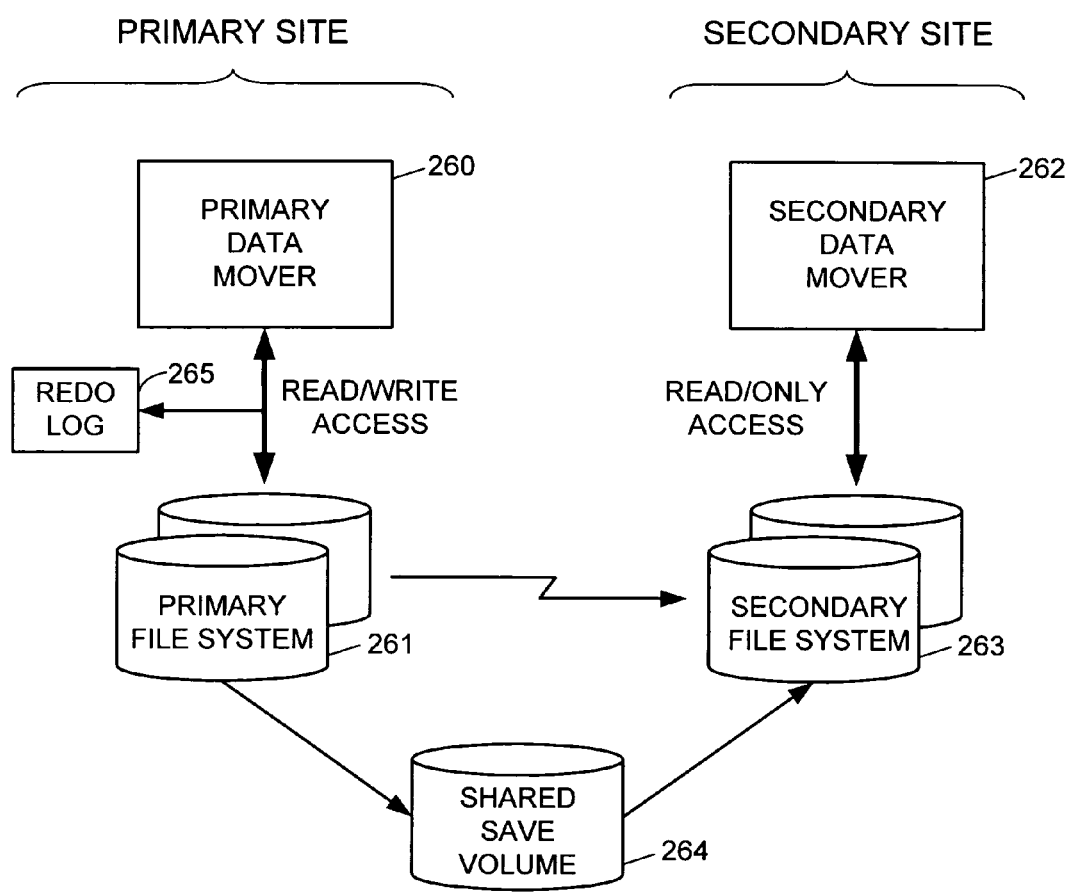
FIG. 4 is a block diagram showing a shared save volume used to buffer local copy data transmitted from a primary data mover to a secondary data mover.

For the case of local file system replication, FIG. 4 shows a primary site including a primary data mover 260 managing access to a primary file system 261, and a secondary data mover 262 managing access to a secondary file system 263 maintained as a read-only copy of the primary file system 261. A save volume 264 is shared between the primary data mover 260 and the secondary data mover 262. This sharing is practical when the secondary site is relatively close to the primary site. A redo log 265 records a log of modifications to the primary file system 261 during the replication process for additional protection from an interruption that would require a reboot and recovery.

Local replication can be used to replicate files within the same network file server. For example, in the network file server 221 in FIG. 1, the primary data mover could be the data mover 226, the secondary data mover could be the data mover 227, the save volume could be stored in the cached disk array 229, and replication control messages could be transmitted between the data movers over the data link 231.

Figure 5:
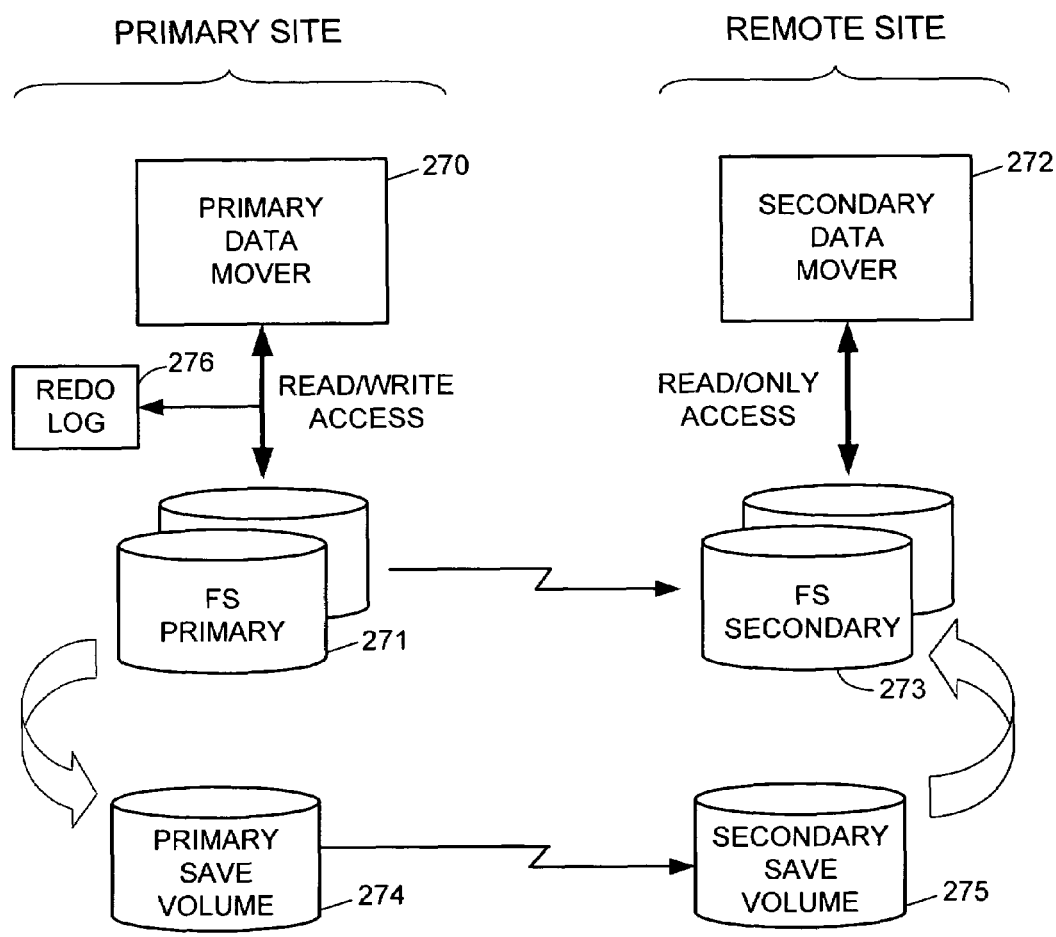
FIG. 5 is a block diagram showing a primary save volume and a secondary save volume.

For the case of remote file system replication, FIG. 5 shows a primary site including a primary data mover 270 managing access to a primary file system 271, and a secondary data mover 272 managing access to a secondary file system 273 maintained as a read-only copy of the primary file system 271. The primary site includes a primary save volume 274, and the remote site includes a secondary save volume 275. A redo log 276 records a log of modifications to the primary file system 271 during the replication process for additional protection from an interruption that would require a reboot and recovery.

Figure 6:
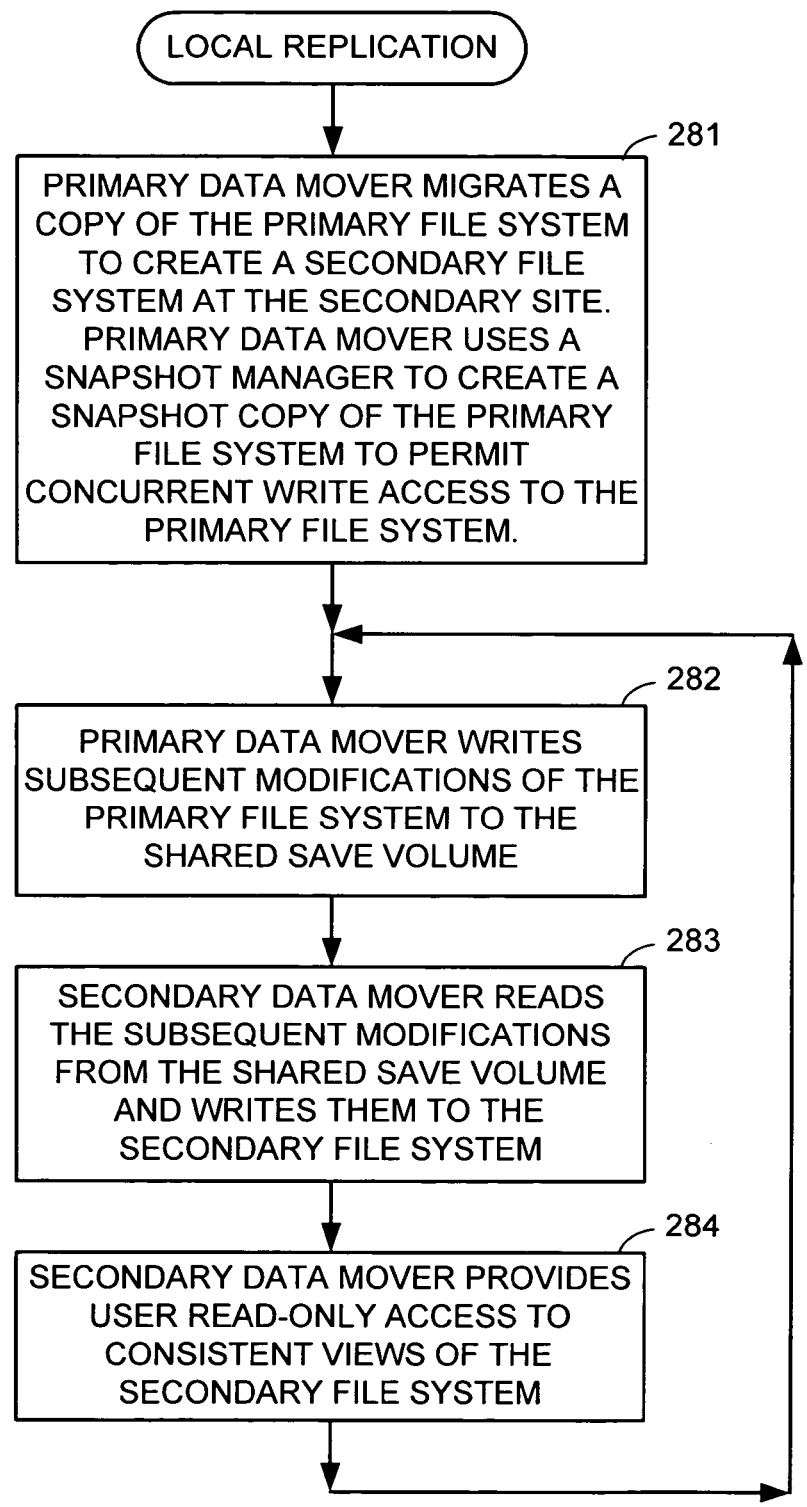
FIG. 6 is a flowchart showing local replication in the system of FIG. 4.

FIG. 6 shows a method of operating the system of FIG. 4 for local replication. In a first step 281, the primary data mover migrates a copy of the primary file system to create a secondary file system at the secondary site in such a way to permit concurrent write access to the primary file system. The migration, for example, may use the method shown in FIG. 17 of Ofek U.S. Pat. No. 5,901,327, in which a bit map indicates remote write pending blocks. Alternatively, the migration may use a snapshot copy mechanism, for example, as described in Kedem, U.S. Pat. No. 6,076,148, in which a bit map indicates the blocks that have changed since the time of snap-shotting of the primary file system. The snapshot method is preferred, because it is most compatible with the delta set technique for remote copy of subsequent modifications. For example, a snapshot manager creates a snapshot copy of the primary file system, as will be further described below with reference to FIGS. 25 to 27. The migration may involve taking a first snapshot copy of the primary file system, copying the first snapshot copy to the secondary file system, starting replication and creating a second snapshot copy of the primary file system, and then copying the differential between the first snapshot copy and the second snapshot copy from the primary file system to the secondary file system, in a fashion similar to that described further below with reference to steps 536 and 537 in FIG. 28. In any event, it is desired for the secondary file system to become a copy of the state of the primary file system existing at some point of time, with any subsequent modifications of the primary file system being transferred through the shared save volume.

In step 282, the primary data mover writes subsequent modifications of the primary file system to the shared save volume. In step 283, the secondary data mover reads the subsequent modifications from the shared save volume and writes them to the secondary file system. In step 284, the secondary data mover provides user read-only access to consistent views of the secondary file system, by integrating the subsequent revisions into the secondary file system while providing concurrent read-only access to the secondary file system. This can be done by using a remote data facility to maintain a remote copy of a pair of delta volumes and to switch between the delta volumes as described in Suchitra Raman, et al., U.S. patent application Ser. No. 10/147,751 filed May 16, 2002, entitled "Replication of Remote Copy Data for Internet Protocol (IP) transmission, Pub. No. U.S. 2003/0217119 A1 published Nov. 20, 2003, incorporated herein by reference. This can also be done by successively accumulating delta sets at the secondary, and accessing a block index or map of updated data blocks in the delta set.

Each delta set, for example, is a set of consistent updates to blocks of the secondary file system. The updated blocks are included in "delta chunks" transmitted from the primary file server to the secondary file server. Each delta set includes a number of delta chunks, and each delta chunk belongs to a single delta set. Each delta chunk is transmitted with a header including a generation count, a delta set number, and a chunk number within the delta set. When a delta set is accumulated, a block index or map is created to identify the updated blocks in the delta set. Once the delta set has been accumulated, a background integration process is started that writes the updates into the secondary file system, and the progress of the background process is recorded by updating the block index or map for the delta set when each updated block is written to the secondary file system. During the background process, read access to the secondary file system is permitted on a priority basis. For this read access to a specified block of the file system, the secondary file server first accesses the block index or map of the delta set, and if the specified block is in the delta set, the secondary file server returns the data of the block from the delta set. If the specified block is not in the delta set, then the secondary file server returns the data of the block from the secondary file system.

In FIG. 6, execution loops from step 284 back to step 282. In this fashion, the secondary file system is updated from the primary site concurrently with read-only access at the secondary site.

Figure 7:
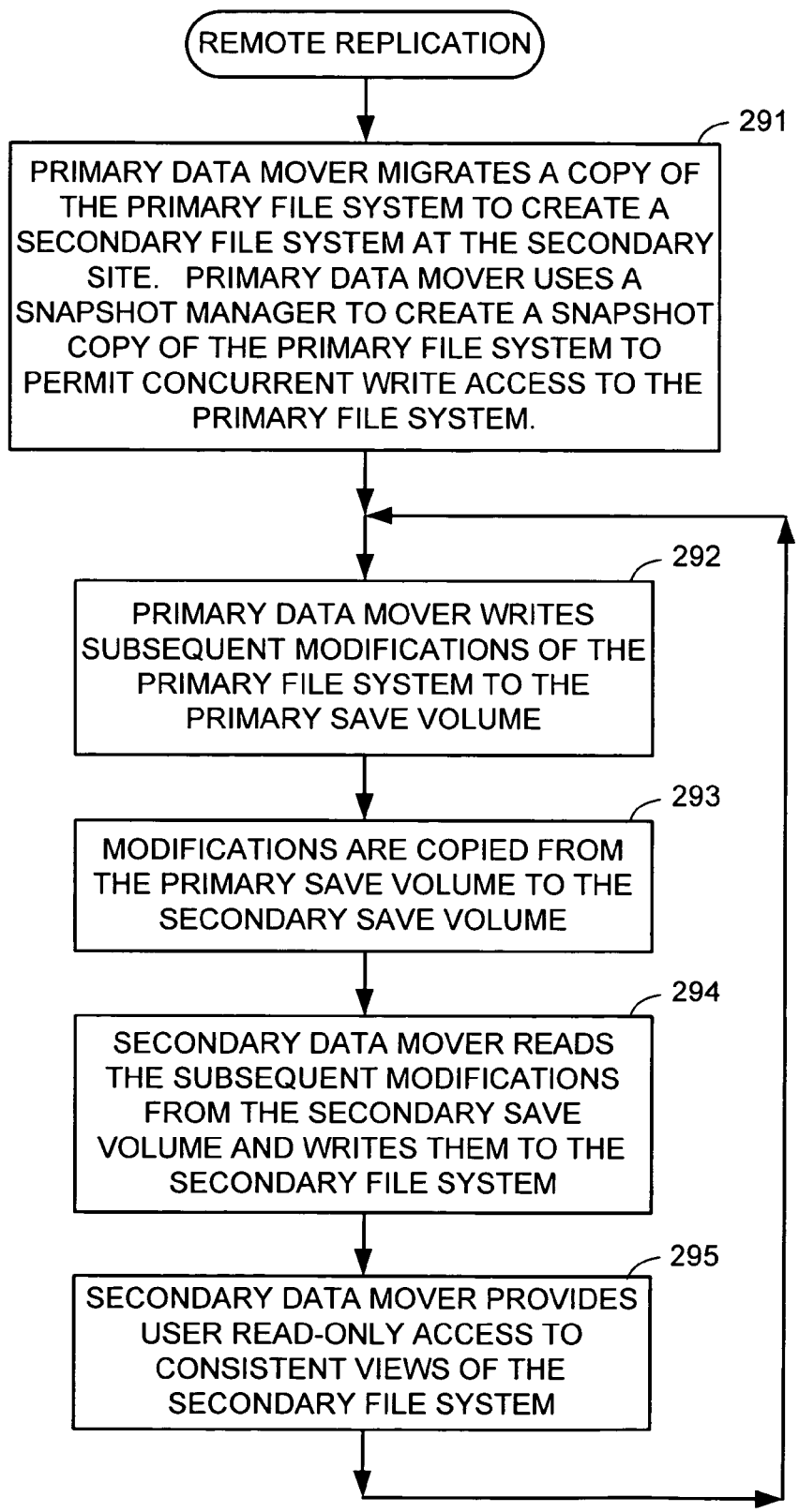
FIG. 7 is a flowchart showing remote replication in the system of FIG. 5.

FIG. 7 shows a method of operating the system of FIG. 5 for remote replication. In a first step 291, the primary data mover migrates a copy of the primary file system to create a secondary file system at the secondary site, in a fashion similar to step 281 in FIG. 6. In step 292, the primary data mover writes subsequent modifications of the primary file system to the primary save volume, in a fashion similar to step 282 in FIG. 6. In step 293, the modifications are copied from the primary save volume to the secondary save volume, by transmitting delta chunks. In step 294, the secondary data mover reads the modifications from the secondary save volume and writes them to the secondary file system. In step 295, the secondary data mover provides user read-only access to consistent views of the secondary file system, in a fashion similar to step 284 of FIG. 6. Execution loops from step 295 back to step 292. In this fashion, the secondary file system is remotely updated from the primary site concurrently with read-only access at the secondary site.

Figure 8:
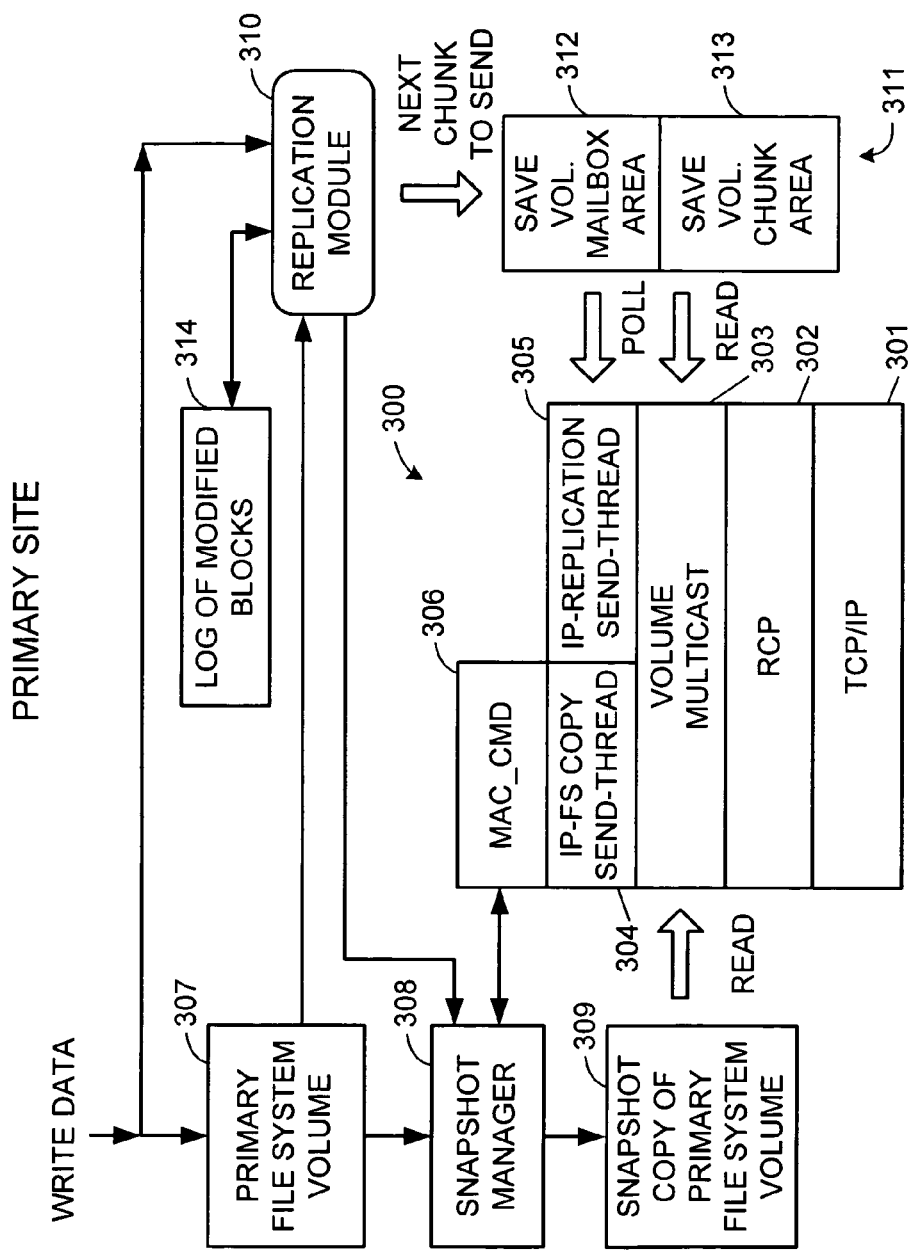
FIG. 8 is a block diagram of a primary site, including layered programming in a primary data mover.

FIG. 8 shows layered programming 300 for a primary data mover. It is desired to use layered programming in accordance with the International Standard Organization's Open Systems Interconnection (ISO/OSI) model for networking protocols and distributed applications. As is well known in the art, this OSI model defines seven network layers, namely, the physical layer, the data link layer, the network layer, the transport layer, the session layer, the presentation layer, and the application layer.

As shown in FIG. 8, the layered programming 300 includes a conventional TCP/IP transport layer 301. The layers above the TCP/IP transport layer 301 include a replication control protocol (RCP) session layer 302, a volume multicast presentation layer 303, and an IP-FS (file system) copy send-thread 304 and an IP-replication send-thread 305 at the program layer level. Over these program layers is a management and configuration command interpreter (MAC_CMD) 306 for system operator set-up, initiation, and supervisory control of the replication process.

In operation, the RCP layer 302 provides an application program interface (API) for multicasting data over TCP/IP. RCP provides callback, acknowledgement (ACK), and resumption of aborted transfers.

RCP provides the capability for a remote site to replicate and rebroadcast remote copy data. The remote site functions as a router when it rebroadcasts the remote copy data. RCP can also be used to replicate data locally within a group of data movers that share a data storage system.

To create a new remote copy in response to a supervisory command, the command interpreter 306 initiates execution of a replication module 310 if the replication module is not presently in an active mode. Then, the command interpreter 306 invokes a snapshot manager 308 to create a snapshot copy 309 of a primary file system volume 307. When the snapshot copy is created, the snapshot manager 308 obtains a current delta set number from the replication module 310 and inserts the current delta set number into the metadata of the snapshot. The current delta set number for the snapshot is all that the secondary needs to identify modifications that are made subsequent to the creation of the snapshot. In this fashion, any number of new remote copies can be created at various times during operation of the replication module, with the snapshot process operating concurrently and virtually independent of the replication module. For example, whenever synchronization of a remote copy is lost, for example due to a prolonged disruption of network traffic from the primary site to the remote site, a new remote copy can be created to replace the unsynchronized remote copy.

Once the snapshot copy 309 is accessible, the command interpreter 306 initiates execution of an instance of the IP-FS copy send-thread 304. The instance of the IP-FS copy send-thread 304 reads data from the snapshot copy 309 and calls upon the volume multicast layer 303 to multicast the remote copy data to all of the secondary data movers where the remote copies are to be created. This can be a copy by extent, so there is no copying of invalid or unused data blocks. For example, the volume multicast layer 303 is given a copy command (@vol., length) specifying a volume and an extent to be copied, and may also specify a group of destinations (an RCP group). The snapshot copy 309 of the primary file system identifies the next valid block to be copied, and the number of valid contiguous blocks following the next block. These blocks are copied at the logical level, so it does not matter what physical structure is used for storing the secondary file system at the secondary site. The copying is done locally, or by remote copy, for example by transporting the data block over IP. The volume multicast layer 303 invokes the RCP layer 302 to transport each data block.

During the remote copy process, whenever a modification is made to a block of the primary file system volume 307, the replication module 310 logs an indication of the modified block in a log 314 and later assembles the modification into a delta set chunk written to a primary save volume 311. The replication module 310 logs the indications in the log 314 on a priority or foreground basis as data is written to the primary file system volume 307, and also logs boundaries between delta sets. The replication module 310 later reads the log 314 to read the indicated modifications from the primary file system volume 307, assemble the indicated modifications into delta set chunks on a background basis, and store the delta set chunks in a save volume chunk area of the save volume 311. For example, the log is in the form of a queue of two bit-map tables, a new one of the tables being written to coincident with write operations upon the primary file system volume 307, and an old one of the tables being read to determine blocks to copy from the primary file system to create a new delta set in the save volume 311. When the delta set chunks become available for distribution from the save volume 311, the replication module 310 updates the save volume mailbox area 312 by storing each delta set chunk definition (@vol., length).

The IP-replication send-thread instance 305 polls the save volume mailbox area 312 to see if any delta set chunks have been stored in the save volume chunk area 313. If so, then the thread instance calls upon the volume multicast layer 303 to multicast the delta set chunks to the data movers that manage the storage of the respective remote file system copies. For example, for each delta set chunk, the IP-replication send-thread instance 305 issues a volume multicast command to the volume multicast layer 303. When the chunk multicast is completed, the IP-replication send-thread instance 305 updates its context on the save volume 311 in the mailbox area 312. At reboot after an interruption of multicast of a chunk, the IP-replication send-thread instance is able to restart the multicast of the chunk. The IP-replication send-thread instance also is responsible for retrying transmission of the chunk whenever the connection with the secondary is interrupted.

Figure 9:
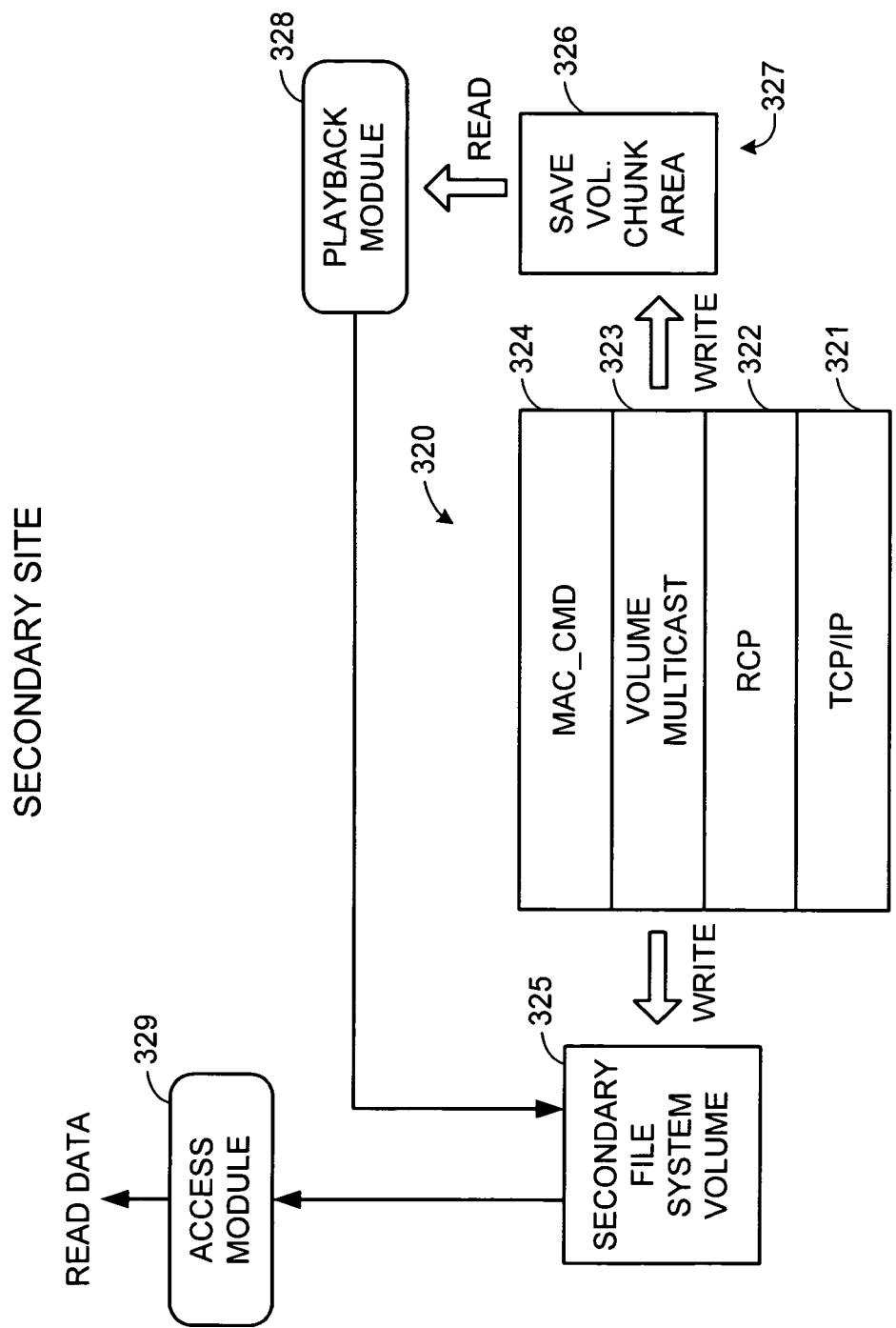
FIG. 9 is a block diagram of a secondary site, including layered programming in a secondary data mover.

FIG. 9 shows the layered programming 320 for a secondary data mover. The programming includes a TCP/IP layer 321, an RCP layer 322, a volume multicast layer 323, and a management and configuration command interpreter (MAC_CMD) 324. During creation of a new remote copy in a secondary file system volume 325, the volume multicast layer 323 writes remote copy data from the primary data mover to the secondary file system volume 325, and concurrently writes modifications (delta set chunks) from the primary data mover to a save volume chunk area 326 of a secondary save volume 327.

A header for the changes in a next version of the delta set is sent last, because there is no guarantee of the order of receipt of the IP packets. The header of the delta set includes a generation count, the number of delta blocks for the next version of the delta set, a checksum for the header, and a checksum for the data of all the delta blocks. The receiver checks whether all of the changes indicated in the header have been received.

Once a complete remote snapshot copy has been reconstructed in the secondary file system volume 325, a playback module 328 is activated to read the modifications from the save volume chunk area 326 and integrates them into the secondary file system volume 325. From each delta-set chunk in the save volume area 326, the playback module 328 gets the block address and number of contiguous blocks to be written to the secondary file system volume. An access module 329 provides read-only access to a consistent view of the secondary file system in the secondary file system volume 325.

Figure 10:
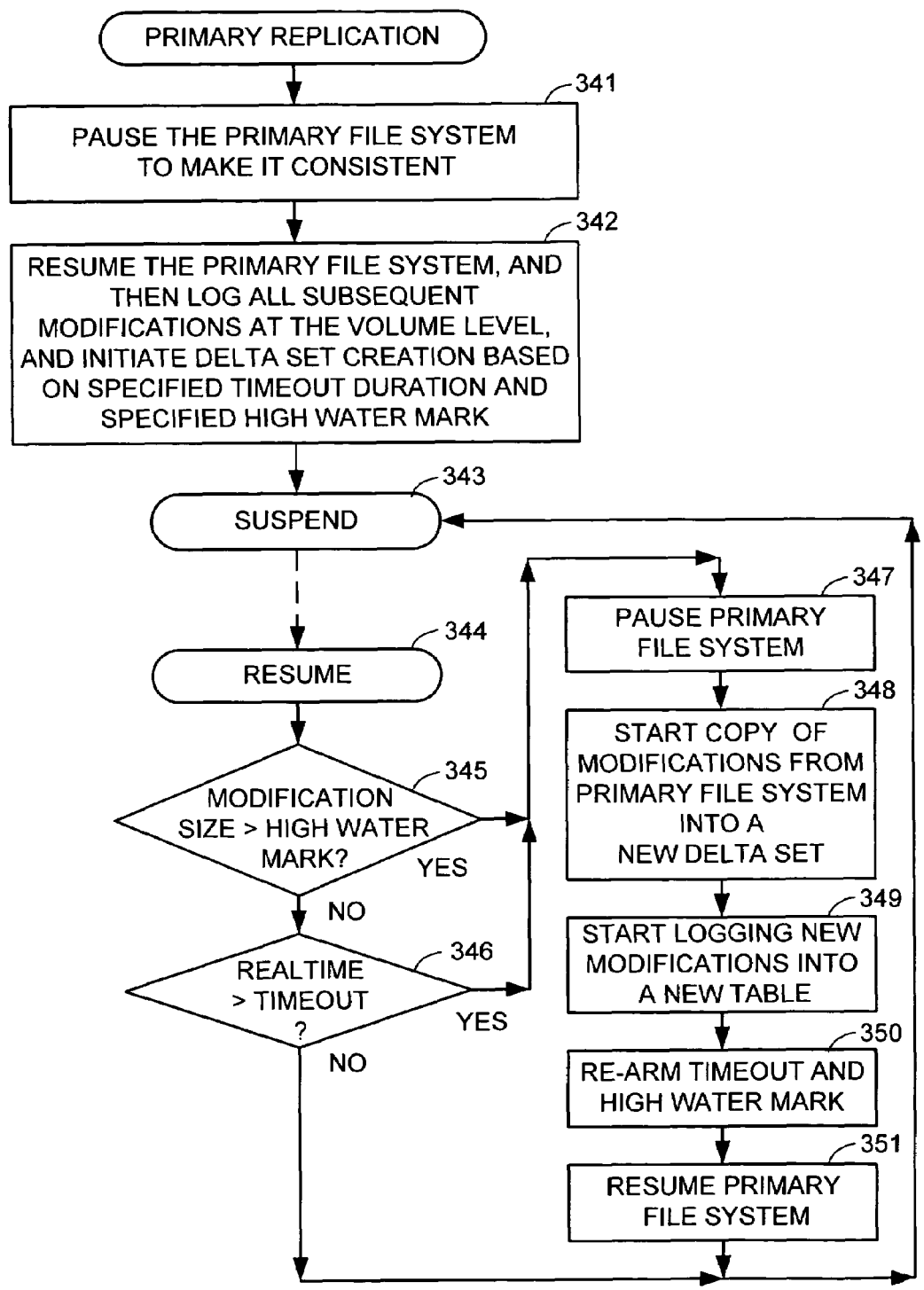
FIG. 10 is a flowchart of a process of replication at the primary site of FIG. 8.

FIG. 10 shows a procedure executed by the primary site of FIG. 8 to perform replication of the primary file system. When replication is started in a first step 341, the primary file system is paused to make it consistent. Migration of the primary file system to the secondaries can then be started using a remote copy facility or snapshot manager. Then, in step 342, concurrent write access to the primary file system is resumed, and all modifications made on the primary file system are logged at the volume level on a priority or foreground basis when each modification is made. In addition, a background process of delta-set creation is initiated.

Two configurable triggers specify the rate of delta set creation: a timeout parameter and a high water mark parameter. Whenever delta set creation is initiated, the current time, as indicated by a real-time clock, is added to a configurable timeout interval to produce the timeout parameter. The high water mark specifies an amount of modified data, in megabytes. The first trigger that occurs will trigger the creation of a delta set. The replication module creates the delta set by pausing the primary file system, copying the modified blocks from the primary file system to the delta set volume, and then resuming the primary file system. By logging indications of the modified blocks and later copying the modified blocks, multiple modifications to the same block are represented and transported once during a single delta set.

In step 343, the background process of delta set creation is temporarily suspended, for example, by placing the process on a task queue that is periodically serviced. In step 344, execution of the delta set creation process is resumed. In step 345, the modification size is compared to the high water mark. If the high water mark is not exceeded, then execution continues to step 346. In step 346, the present value of the real-time clock is compared to the timeout parameter. If the timeout parameter has not been exceeded, then execution loops back to step 343. Otherwise, execution continues to step 347. Execution also branches to step 347 from step 345 if the modification size is greater than the high water mark.

In step 347, the primary file system is paused. In step 348, a new delta set is created by starting the copying of modified blocks from the primary file system volume to the new delta set. In step 349, the logging of new modifications into a new table is started. In step 350, the time-out and high water mark is re-armed. In other words, a new value for the timeout parameter is computed as the current real time plus the configurable timeout interval, and the modification size is reset to indicate the size of the new modifications. In step 351, the primary file system is resumed. Execution loops from step 351 back to step 343 to suspend the background process of delta set creation.

To maintain the consistency of the delta set created in the primary save volume, the primary file system could remain paused and not resumed in step 351 until the copy process begun in step 348 is completed: Preferably, however, the copy process begun in step 348 is a snapshot copy process, so that write access to the primary file system may resume in step 351 before the copy process has been completed. For the example of the modification log being a queue of two bit-map tables, when a write access to a block in the primary file system is requested, the old bit map is accessed on a priority basis. If the corresponding bit in the old bit map indicates a modified block in the primary file system volume not yet copied to the save volume, then it is copied on a priority basis to the save volume before the new write data is written to the primary file system volume. As soon as a modified block has been copied from the primary file system volume to the save volume, the corresponding bit in the old bit map is cleared. In this fashion, at the completion of the copy process, the entire old table will be in a reset state, ready to be used as the next new table.

When the copy process started in step 348 is completed, the replication module sets the save volume mailbox area to show that a new delta set is ready for transmission. Upon polling the mailbox area, the IP-replication send-thread finds that the new delta set is ready for transmission, and invokes the volume multicast layer to transmit the delta set to the secondary sites. After step 351, execution loops back to step 343.

Figure 11:
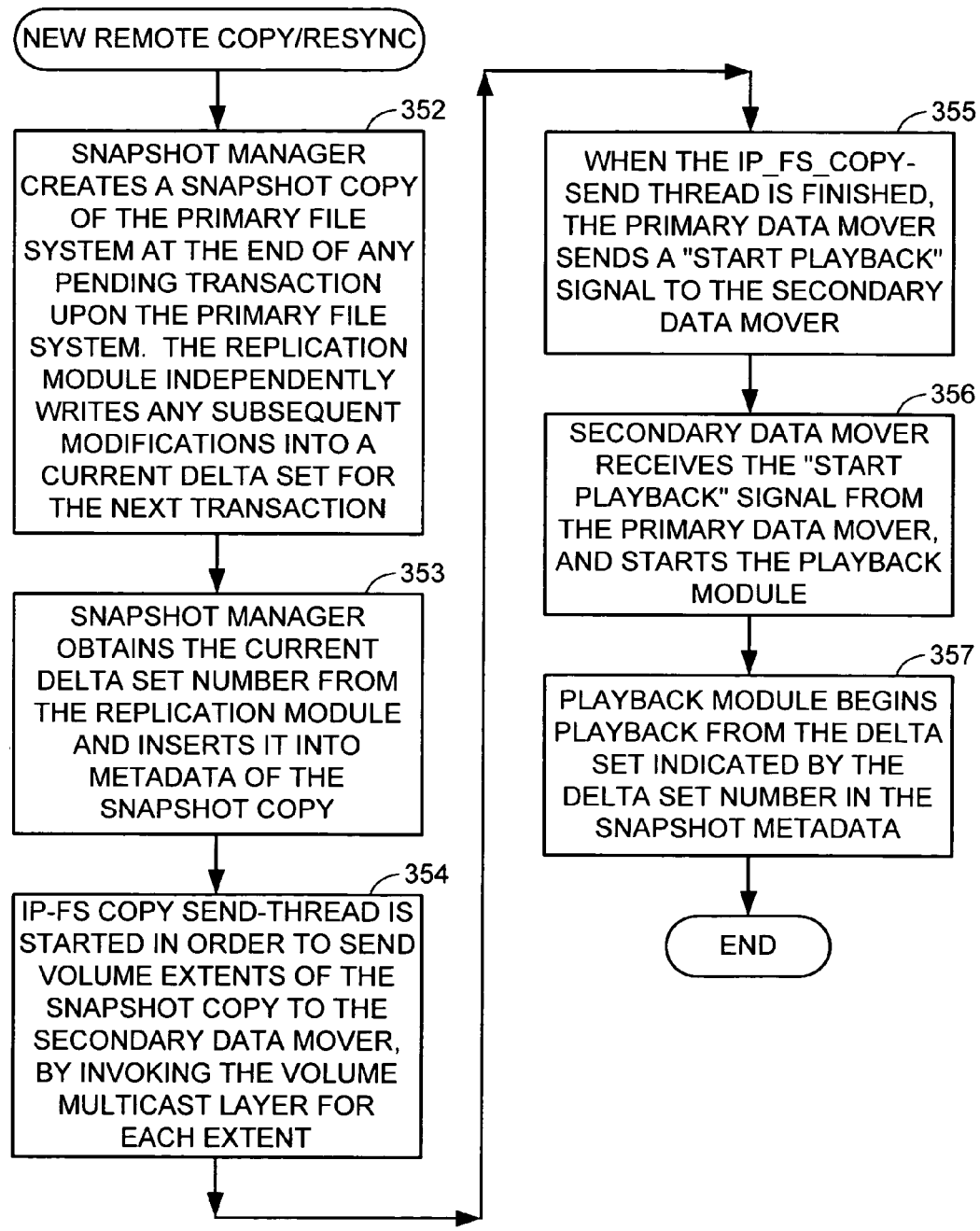
FIG. 11 is a flowchart of a procedure for producing a new remote copy of a primary file system concurrent with ongoing replication and multicasting of modifications to the primary file system.

FIG. 11 shows a flow chart of the overall procedure of creating a new remote copy, either for the first time at a secondary site or as a replacement for a remote copy that needs to be resynchronized with the primary file system. In a first step 352, the snapshot manager creates a snapshot copy of the primary file system at the end of any pending transaction upon the primary file system (e.g., when the primary file system becomes consistent after it is paused in step 341 of FIG. 10 or in step 347 of FIG. 10.) The replication module independently writes any subsequent modifications into a current delta set for the next transaction.

In step 353, the snapshot manager obtains the current delta set number from the replication module and inserts it into metadata of the snapshot copy. In step 354, the IP-FS copy send-thread is started in order to send volume extents of the snapshot copy to the secondary data mover, by invoking the volume multicast layer for each extent.

In step 355, when the IP-FS copy send-thread is finished, the primary data mover sends a "start playback" signal to the secondary data mover. In step 356, the secondary data mover receives the "start playback" signal from the primary data mover, and starts the playback module. In step 357, playback module begins playback from the delta set indicated by the delta set number in the snapshot metadata.

The playback module (328 in FIG. 23) at the secondary site integrates the delta set modifications into secondary file system. Each time that a new delta set appears in the secondary save volume, the modifications can be integrated into the secondary file system, for example, by pausing the secondary file system, copying the modifications from the secondary save volume into the secondary file system, and resuming the secondary file system. Alternatively, a timeout interval and a high water mark value can be configured for the secondary site, so that the modifications may be integrated into the secondary file system at a rate less frequent than the rate at which the new delta sets appear in the secondary save volume. In this case, the modifications from the secondary save volume would not be integrated into the secondary file system until the timeout time is reached unless the amount of modifications in the save volume reaches the high water mark. As described above, the integration of the modifications can be performed concurrently with read-only access to a consistent view of the secondary file system.

Figure 12:
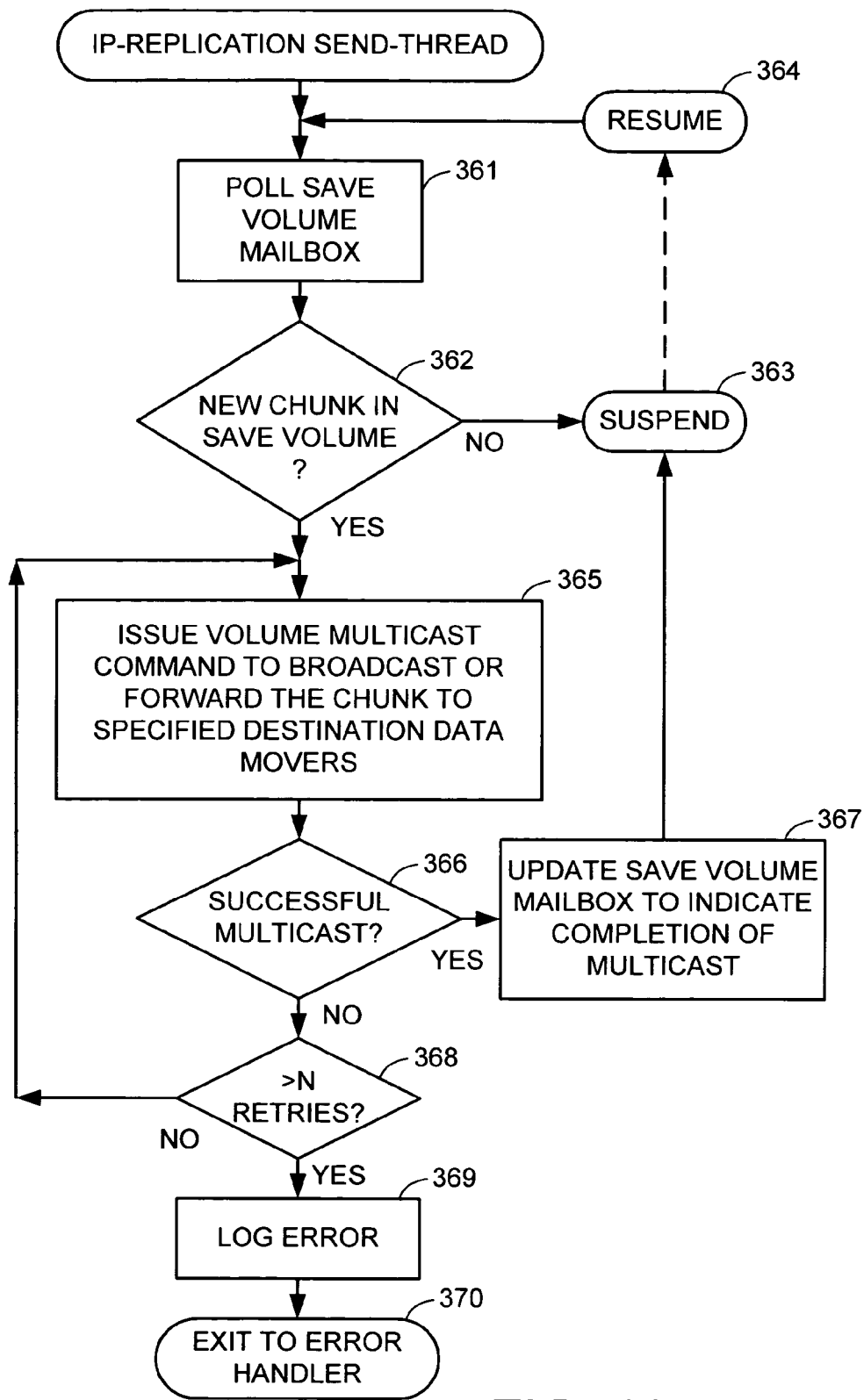
FIG. 12 is a flowchart of an IP-replication send-thread introduced in FIG. 8.

FIG. 12 shows a flowchart of the IP-replication send-thread (305 in FIG. 8). In a first step 361, the thread polls the primary save volume mailbox area. If the mailbox area indicates that there is not a new delta set chunk in the primary save volume area, then the thread is finished for the present task invocation interval. Execution of the thread is suspended in step 363, and resumed in step 364 at the next task invocation interval.

If the mailbox area indicates that there is a new delta set chunk in the primary save volume, then execution continues from step 362 to step 365. In step 365, the IP-replication send-thread issues a volume multicast command to broadcast or forward the delta set chunk to specified destination data movers. In step 366, if the multicast has been successful, then execution branches to step 367. In step 367, the IP-replication send-thread updates the primary save volume mailbox to indicate completion of the multicast, and execution continues to step 363 to suspend execution of the thread until the next task invocation interval.

In step 366, if the multicast is not successful, then execution continues to step 368 to test whether more than a certain number (N) of retries have been attempted. If not, then execution loops back to step 365 to retry the multicast of step 365. If more than N retries have been attempted, then execution continues from step 368 to step 369. In step 369, the IP-replication send-thread logs the error, and then in step 370, passes execution to an error handler.

Figure 13:
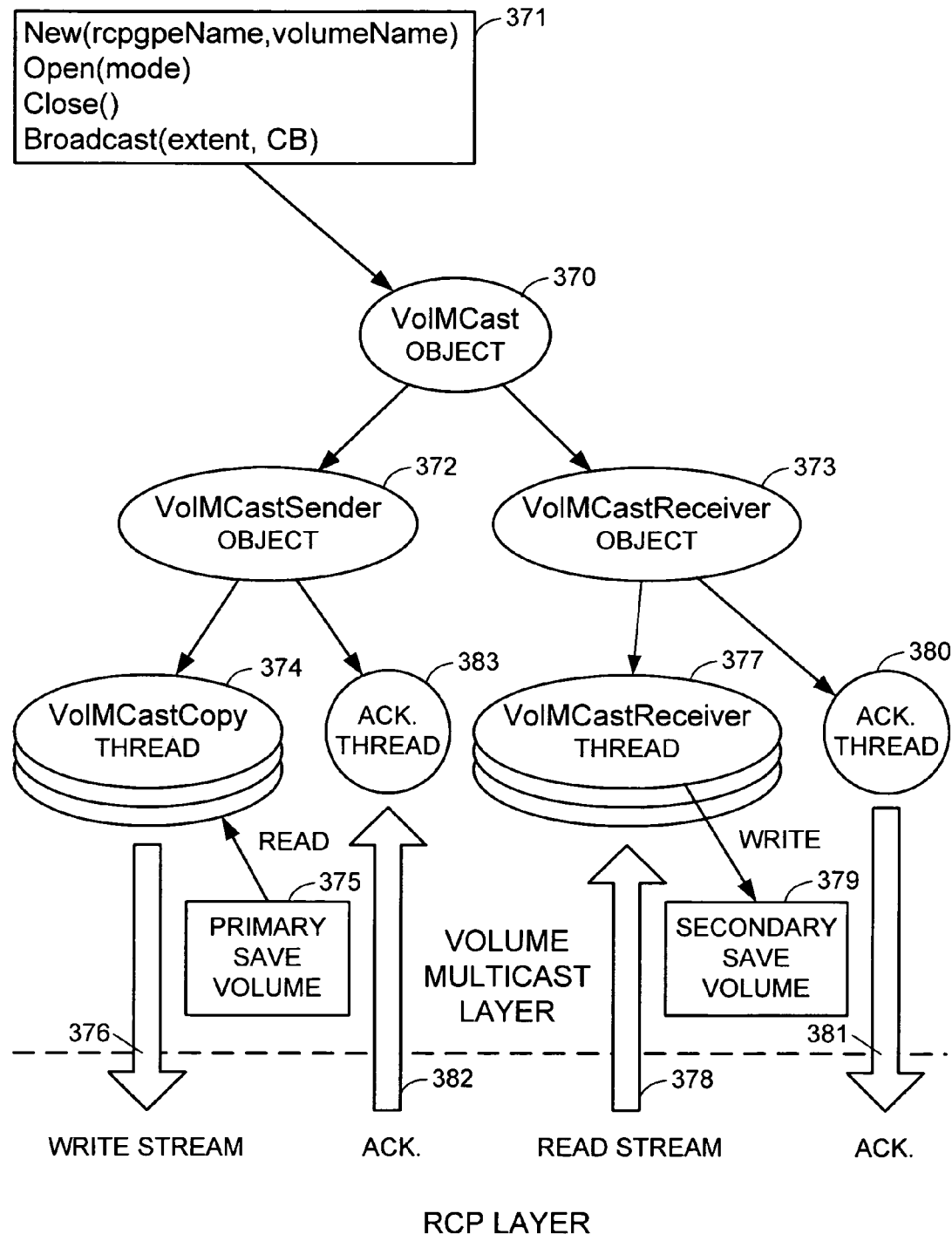
FIG. 13 is a block diagram of a volume multicast level in the data mover programming of FIG. 8 and FIG. 9.

FIG. 13 shows various objects defined by the volume multicast layer. The volume multicast layer provides multicast service to instances of a VolMCast object 370 representing a volume multicast relationship between a respective primary file system volume specified by a volume name (volumeName) and a respective group of secondary data movers specified by an RCP group name (rcpgpeName). For example, at configuration time, one or more RCP groups are defined in response to configuration commands such as:

.RCP_config <server_name> add <IP>

This configuration command adds the IP address (IP) of a specified destination data mover (server_name) to an RCP group.

Also at configuration time, a specified data mover can be defined to be a primary data mover with respect to the RCP group (a relationship called a MultiCastNode) in response to a configuration command such as:

.server_config <server_name> rep <groupname> add <IP> where "server_name" is the name for the primary data mover, "groupname" is the name of a configured RCP group, and "IP" is the IP address of the primary data mover. When configuration of the MultiCastNode object is finished, the MultiCastNode object will have its own name, a name for the primary data mover, an RCP group name, and a list of IP addresses to which the primary server should broadcast in order to transmit IP packets to all the secondary data movers in the RCP group.

The VolMCast object can then be built on top of a MultiCastNode object. The additional information required for the VolMCast object is, on the sender side, the primary or source file system volume and on each receiver side, the secondary or destination file system volume. For flexibility, it is permitted to specify a different volume name on each secondary data mover. By specifying the destination volume names during creation of the VolMCast object, it is not necessary to specify the destination volume names at each copy time. For example, the VolMCast object is defined by configuration commands to the primary data mover such as:

.server_config <server_name> "volmcast MultiCast-NodeName> [-src|-dest] volume"

where <server_name> is the name of the MultiCast Node.

Once the VolMCast object has been defined, an IP-replication service can be configured for the object upon the primary data mover. Then the primary data mover will respond to commands for starting the replication service and stopping the replication service upon the VolMCast object. When replication is stopped on a secondary, the secondary file system is left in a consistent state. In other words, if a replay was in progress, the stop will complete when the replay is finished.

The primary data mover may respond to additional commands for create a new delta set on demand, updating the replication policy (high water mark and timeout interval parameters) on the primary file system or secondary file systems, and defining persistency of the replication process upon remount or reboot of the primary file system or any one of the secondary file systems. For example, at reboot the replication service is re-started on the primary file system and the secondary file system in the state it was at unmount or shutdown. A recovery of the replication context happens at reboot or on remount. The replica recovery is executed before the primary and secondary file systems are made available for user access. This allows all modifications during the recovery of the primary file system to be logged by the replication service.

As shown in FIG. 13, the volume multicast layer is responsive to a number of commands 371 from higher layers in the protocol stack. In addition to the configuration commands for defining a new VolMCast object relating a specified primary file system volume to a specified RCP group, an existing VolMCast object can be opened for either a sender mode or a receiver mode. An opened VolMCast object can be closed. Once a VolMCast object has been opened in a sender mode, it can be called upon to broadcast a control block (CB) to the secondary volumes of the VolMCast object, such as a control block specifying a remote copy of a specified extent of the primary volume.

Control blocks may specify various operations upon the secondary volumes of the VolMCast object, such as cluster file system commands for performing operations such as invalidations, deletions, renaming, or other changes in the configuration of the objects of the file system upon all copies (local or remote) of the file system. In this case, RCP is used for the broadcast or forwarding of the cluster file system commands to all the data movers that are to operate upon the local or remote copies of the file system, and for returning acknowledgement of completion of the operations upon all of the copies of the file system.

With reference to FIG. 13, the volume multicast layer defines a VolMCastSender object 372 instantiated when a VolMCast instance is opened in the sending mode, and a VolMCastReceiver object 373 instantiated when a VolMCast instance is opened in a receiving mode. The VolMCastSender object class and the VolMCastReceiver object class inherit properties of the VolMCast object class. When the volume multicast layer is called upon in a primary data mover to maintain remote copies of a specified extent of a VolMCastSender instance, an instance of a VolMCastCopy thread 374 is created and executed. The VolMCastCopy thread instance accesses the delta sets from a primary save volume 375 to produce a write stream 376 of blocks sent down to the RCP layer. At the secondary data mover, an instance of a VolMCastReceiver thread 377 is instantiated and executed to receive a read stream 378 of blocks and write the copied delta sets into a secondary save volume 379. An instance of an acknowledgement thread 380 returns an acknowledgement 381 of completion of copying of a delta-set for an extent to the secondary file system. The acknowledgement is sent down to the RCP layer of the secondary data mover. At the primary, the RCP layer sends the acknowledgement 382 to an instance of an acknowledgement thread 383.

RCP is a session-layer protocol, for replication from one primary to multiple secondary sites. Control is initiated by the primary, except when recovering from aborted transfers. RCP uses TCP between the primary and secondary for control and data. Network distribution is by an application-level multicast (ALM) using the RCP as a forwarder. Port sharing with HTTP is used for crossing firewalls.

RCP may support other replication applications in addition to 1-to-N IP-based replication for wide-area distribution of read-only data. These other applications include 1-to-N volume mirroring, cluster file system commands, remote file system replication, and distribution and replication of other commands that may be recognized by the data movers.

The 1-to-N volume mirroring is a simplification of to 1-to-N IP-based replication for wide-area distribution of read-only data, because the volume mirroring need not synchronize a remote volume with any consistent version of the primary volume until the remote volume needs to be accessed for recovery purposes.

Remote file system replication also uses RCP for broadcast or forwarding an application command to a remote data mover to initiate a replication of a file system managed by the remote data mover. In a similar fashion, RCP may broadcast or forward other commands recognized by data movers, such as iSCSI or remote-control type commands for archival storage. For example, RCP could broadcast or forward remote control commands of the kind described in Dunham, U.S. Pat. No. 6,353,878 issued Mar. 5, 2002 entitled "Remote Control of Backup Media in a Secondary Storage Subsystem Through Access to a Primary Storage Subsystem," incorporated herein by reference.

The RCP forwarder is composed of two RCP sessions, an outbound session at the primary, and an inbound session at the secondary. The inbound RCP session receives a group name and looks up the group in a routing table. If routes for the group exist in the routing table, then an RCP forwarder is created at the secondary, including a data path by pointer passing from an "in" session to an "out" session.

An RCP group may be configured to include application-level multicast (ALM) topology. For example, ALM route configuration commands begin with an identifier number for the network file server ("cel") that contains the forwarder data mover, and an identifier number ("ser") for the forwarder data mover in the network server. The configuration commands end with a "nexthop" specification of an immediate destination data mover:

cel1-ser2: rcproute add group=g1 nexthop=cell2-ser2
cel2-ser2: rcproute add group=g1 nexthop=cell2-ser3
cel2-ser2: rcproute add group=g1 nexthop=cell2-ser4

In effect, the forwarder data mover adds the "nexthop" specification to an entry for the RCP group in the routing table in the forwarder data mover. This entire entry can be displayed by the following configuration command:

cel2-ser2: rcproute display

The entry is displayed, for example, as a list of the "nexthop" destination data movers. The entry can be deleted by the following configuration command:

cel2-ser2: rcproute delete

Each immediate destination data mover may itself be configured as a forwarder in the RCP group. In this case, RCP commands and data will be forwarded more than once, through a chain of forwarders. The set of possible RCP routes from a primary or forwarder in effect becomes a tree or hierarchy of destinations.

The ALM commands may also include commands for creating sessions and sending control blocks or data. For example, the following ALM command creates a session and sends application data to all destinations in group "g1" from cell1-ser2 from a file (named "filename") using a test application (named "rcpfiletest").

cel1-ser2: rcpfiletest data=filename group=g1

Figure 14:
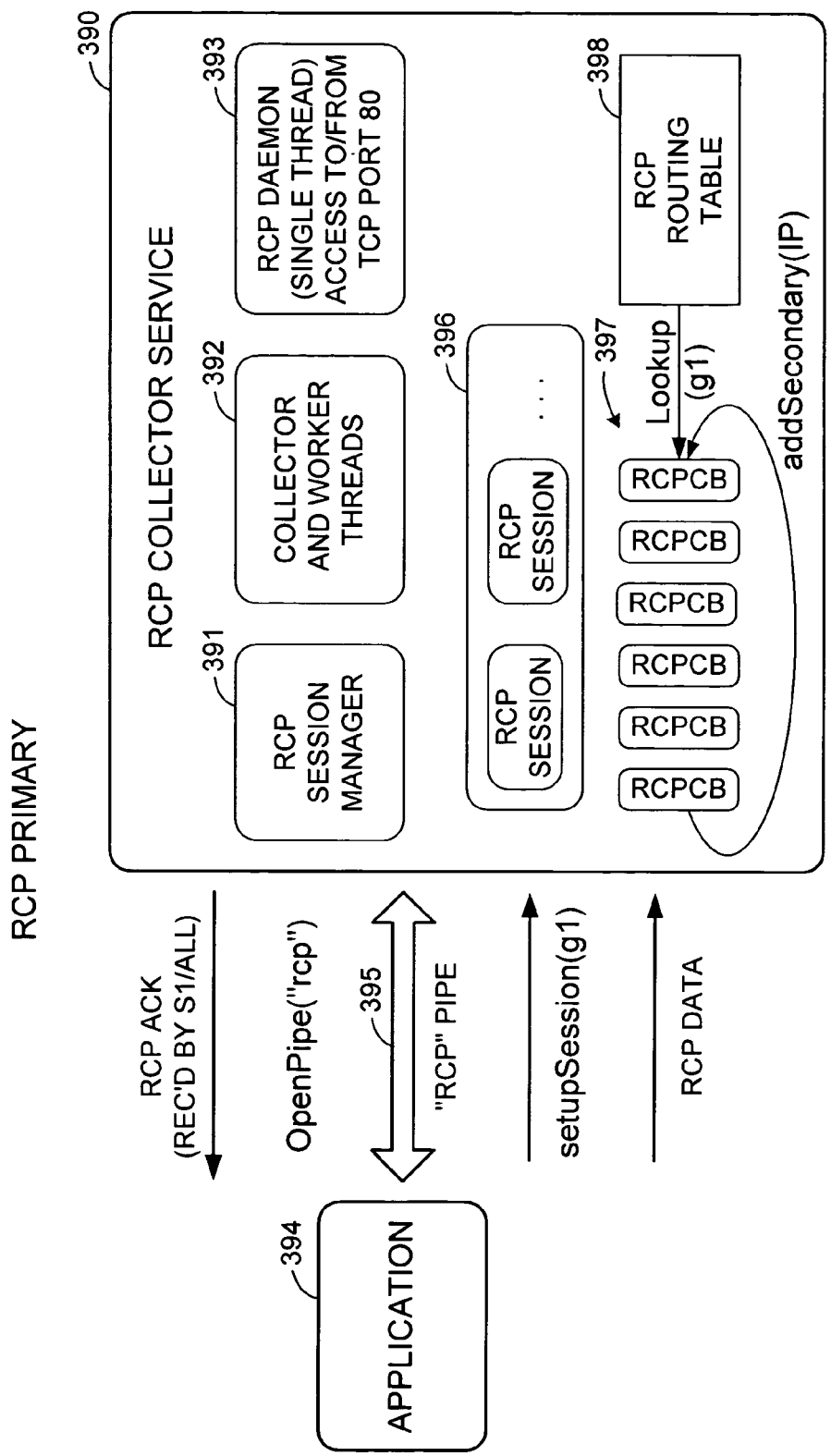
FIG. 14 is a block diagram of a replication control protocol (RCP) level in the primary data mover programming of FIG. 8.

FIG. 14 shows the RCP collector service 390 at a primary site. The programming for the RCP collector service includes an RCP session manager 391, collector and worker threads 392, and a single-thread RCP daemon 393. The RCP session manager 391 responds to requests from higher levels in the protocol stack, such as a request from an application 394 to open an RCP pipe 395 between the application 394 and the RCP collector service 390. The application 394 may then send to the session manager 391 requests to setup sessions with RCP groups. A session queue 396 stores the state of each session, and a control block queue 397 keeps track of control blocks sent via TCP/IP to the secondary data movers in the RCP groups. An RCP routing table 398 identifies the immediate destinations of each RCP group to which the TCP/IP messages from the RCP collection service are to be sent, as well as any other destinations to which the messages will be forwarded. For communication of the TCP/IP messages between the RCP service and the network, TCP port: 80 is opened in both directions (i.e., for input and output). The single thread RCP daemon 393 is used for interfacing with this TCP port: 80.

Figure 15:
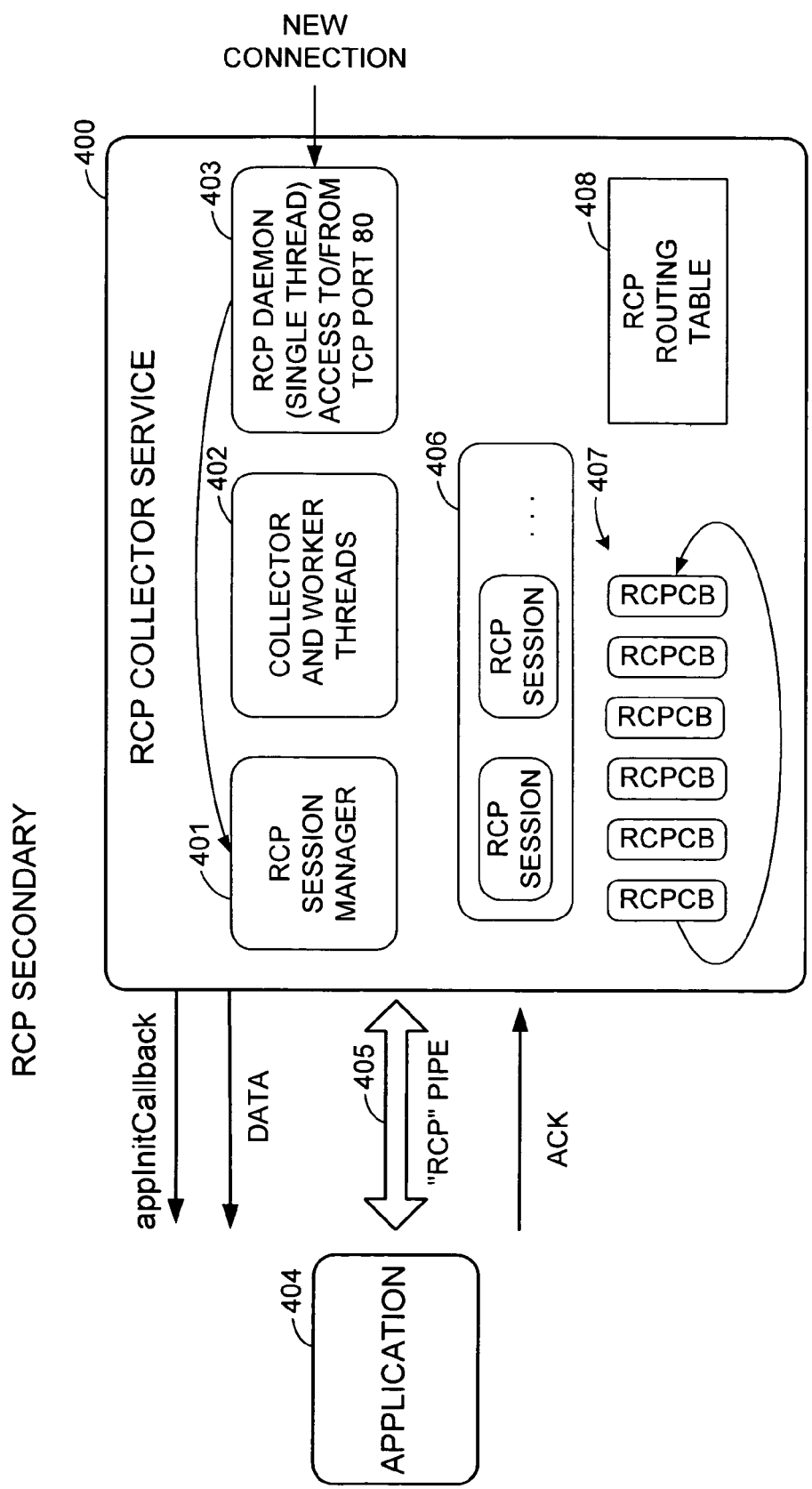
FIG. 15 is a block diagram of the RCP level in the secondary data mover programming of FIG. 9.

FIG. 15 shows the RCP collector service 400 at a secondary site. The RCP collector service at the secondary site is similar to the RCP collector service at the primary site, in that it includes an RCP session manager 401, collector and worker threads 402, a single thread RCP daemon 403 for access to/from TCP port: 80, an RCP session state queue 406, an RCP control block queue 407, and an RCP routing table 408. The primary difference between the RCP collector service at the secondary site from the RCP collector service at the primary site is in the collector and worker threads 402. At the RCP secondary, the RCP commands and data are received from the TCP port: 80 instead of from the application 404. The application 404 is the consumer of the RCP data, instead of a source for RCP data. The RCP collector service 400 at the secondary site may also serve as a forwarder for RCP commands, and therefore the RCP collector service and worker threads 402 at the secondary site include a forwarder thread that does not have a similar or complementary thread in the RCP collector service at the primary site.

In operation, an application 404 can initialize the RCP collector service so that the RCP collector service will call back the application upon receipt of certain RCP commands from TCP port: 80. For example, if a new connection command is received from TCP port: 80, then the RCP daemon 403 forwards the new connection command to the RCP session manager. The RCP session manager 401 recognizes that this connection command is associated with an application 404 at the secondary site, opens an RCP pipe 405 to this application, and calls the application 404 indicating that the RCP pipe 405 has been opened for the RCP session. (The volume multicast receiver thread 377 of FIG. 13 is an example of such an application.) The application 404 returns an acknowledgement. If the new connection is for a new RCP session, then the session manager creates a new RCP session, and places state information for the new session on the RCP session queue 406. RCP control blocks and data may be received for the session from the TCP port: 80. The data may be forwarded to the application, or to a file specified by the application. RCP control blocks to be executed by the RCP collector service 400 may be temporarily placed on the control block queue 407. RCP control blocks or data intended for other secondary site may be forwarded to the intended secondary sites.

Figure 16:
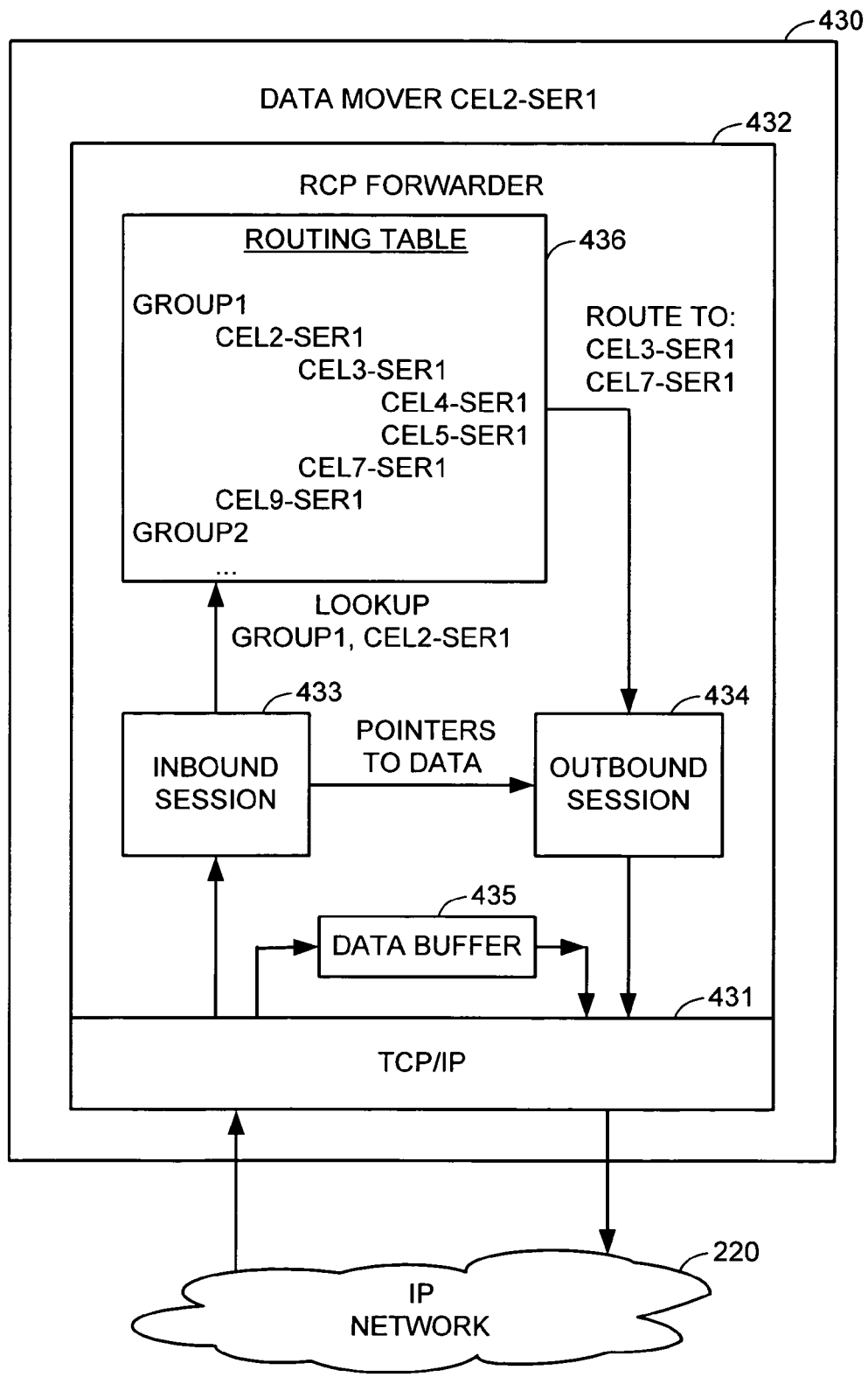
FIG. 16 is a block diagram of a RCP forwarder at the RCP level in a forwarder data mover.

FIG. 16 shows further details of the forwarding of RCP commands and data by a data mover 430 identified as Cel2-Ser1. The data mover 430 is programmed with a TCP/IP layer 431 for communication with the IP network 220, and an RCP layer 432 over the TCP/IP layer. For forwarding the RCP commands and data, the RCP layer 432 creates an inbound session 433 and an outbound session 434. The inbound session 433 receives RCP commands from the TCP/IP layer 431. The TCP/IP data stream is retained in a data buffer 435. When an RCP command calls for the forwarding of RCP commands or data to another data mover in a specified RCP group, the inbound session 433 performs a lookup for the group in a routing table 436.

In the example of FIG. 16, the routing table 436 includes a copy of all of the routing information for each group of which the data mover 430 is a member. In this case, for GROUP1, the primary data mover sends RCP commands to at least data movers CEL2-SER1 and CEL9-SER1. CEL2-SER1 (i.e., the data mover 430) forwards the RCP commands and RCP data to data movers CEL3-SER1 and CEL7-SER1. In particular, the inbound session 433 creates an outbound session 434 and creates a TCP/IP data path from the inbound session 433 to the outbound session 434 by passing pointers to the data in the data buffer. The outbound session 434 invokes the RCP/IP layer 431 to multicast the TCP data stream in the data buffer 435 over the IP network 220 to the data movers CEL3-SER1 and CEL7-SER1.

The data mover CEL3-SER1 in succession forwards the RCP commands to data movers CEL4-SER1 and CEL5-SER1. Normally, the data mover CEL2-SER1 (430) does not need to know that the data mover CEL3-SER1 forwards the RCP commands to data movers CEL4-SER1 and CEL5-SER1, but if the data mover CEL2-SER1 (430) would fail to receive an acknowledgement from CEL3-SER1, then the data mover CEL2-SER1 could minimize the impact of a failure of CEL3-SER1 by forwarding the RCP commands to CEL4-SER1 and CEL5-SER1 until the failure of CEL3-SER1 could be corrected.

Figure 17:
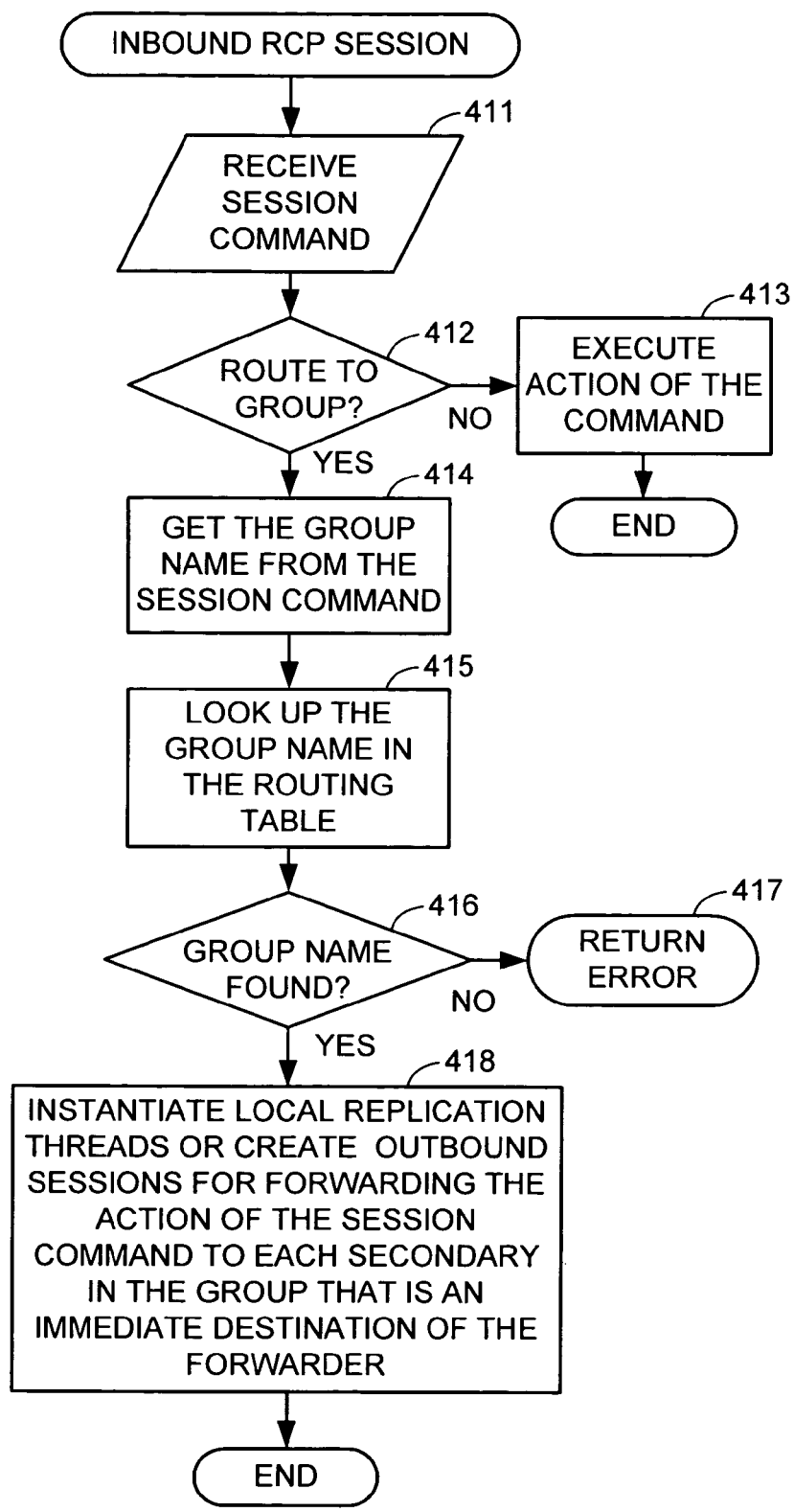
FIG. 17 is a flowchart of an inbound RCP session in the secondary data mover.

FIG. 17 shows a flowchart of how the RCP collector service at the secondary site processes an inbound RCP session command. In a first step 411, the RCP collector service receives a session command. In step 412, if this session command is not a command to be forwarded to other secondary sites, then execution branches to step 413 to execute the action of the command, and the processing of the session command is finished.

In step 412, if the session command is a command to be forwarded to other secondary sites, then execution continues from step 412 to step 414. In step 414, the RCP collector service gets the RCP group name from the session command. Then, in step 415, the RCP collector service looks up the group name in the RCP routing table (408 in FIG. 15). If the group name is not found, then execution branches from step 416 to step 417. In step 417, the RCP collector service returns an error message to the sender of the session command.

In step 416, if the group name is found in the RCP routing table, then execution continues from step 416 to step 418. In step 418, the RCP collector service forwards the action of the session command to each secondary in the group that is an immediate destination of the forwarder (i.e., the data mover that is the secondary presently processing the RCP session command). This is done by instantiating local replication threads or creating outbound sessions for forwarding the action of the session command to each secondary in the group that is an immediate destination of the forwarder. After step 418, processing of the RCP session command is finished.

Figure 18:
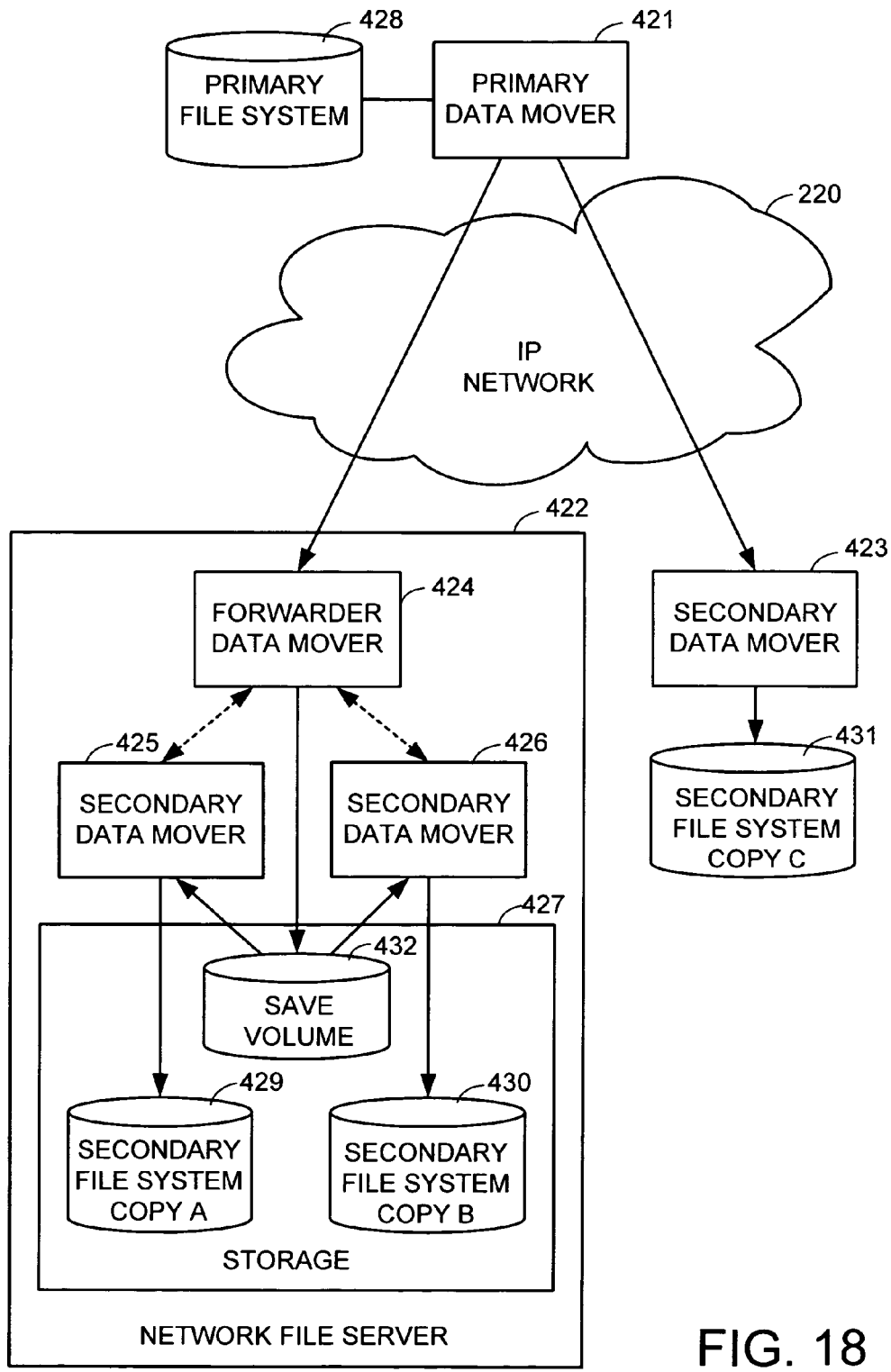
FIG. 18 is a block diagram showing a forwarder data mover performing local replication.

FIG. 18 shows an example of forwarding and local replication. In this example, the IP network 220 connects a primary data mover 421 to a network file server 422 and a secondary data mover 423. The network file server 422 includes three data movers 424, 425, and 426, and storage 427. The primary data mover manages network access to a primary file system 428. The data mover 424 functions as a forwarder data mover. The data mover 425 functions as a secondary data mover managing access from the network to a secondary file system (copy A) 429. The data mover 426 functions as a secondary data mover managing access from the network to a secondary file system (copy B) 430. The data mover 423 manages network access to a secondary file system (copy C) 431.

In operation, when the primary data mover 421 updates the primary file system 428, it multicasts the modified logical blocks of the file system volume over the IP network 220 to the forwarder data mover 424 and to the secondary data mover 423. The forwarder data mover 424 receives the modified blocks, and performs a local replication of the blocks to cause the secondary data mover 425 to update the secondary file system (copy A) 429 and the to cause the secondary data mover 426 to update the secondary file system (copy B) 430.

To perform the local replication, the forwarder data mover 424 has its volume multicast layer (323 in FIG. 9) save the modified blocks in a save volume 432 in the storage 427, and then the forwarder data mover 424 sends replication commands to the local secondary data movers 425 and 426. Each local secondary data mover 425, 426 has its playback module (328 in FIG. 9) replay the modifications from the save volume 432 into its respective secondary file system copy 429, 430.

Figure 19:
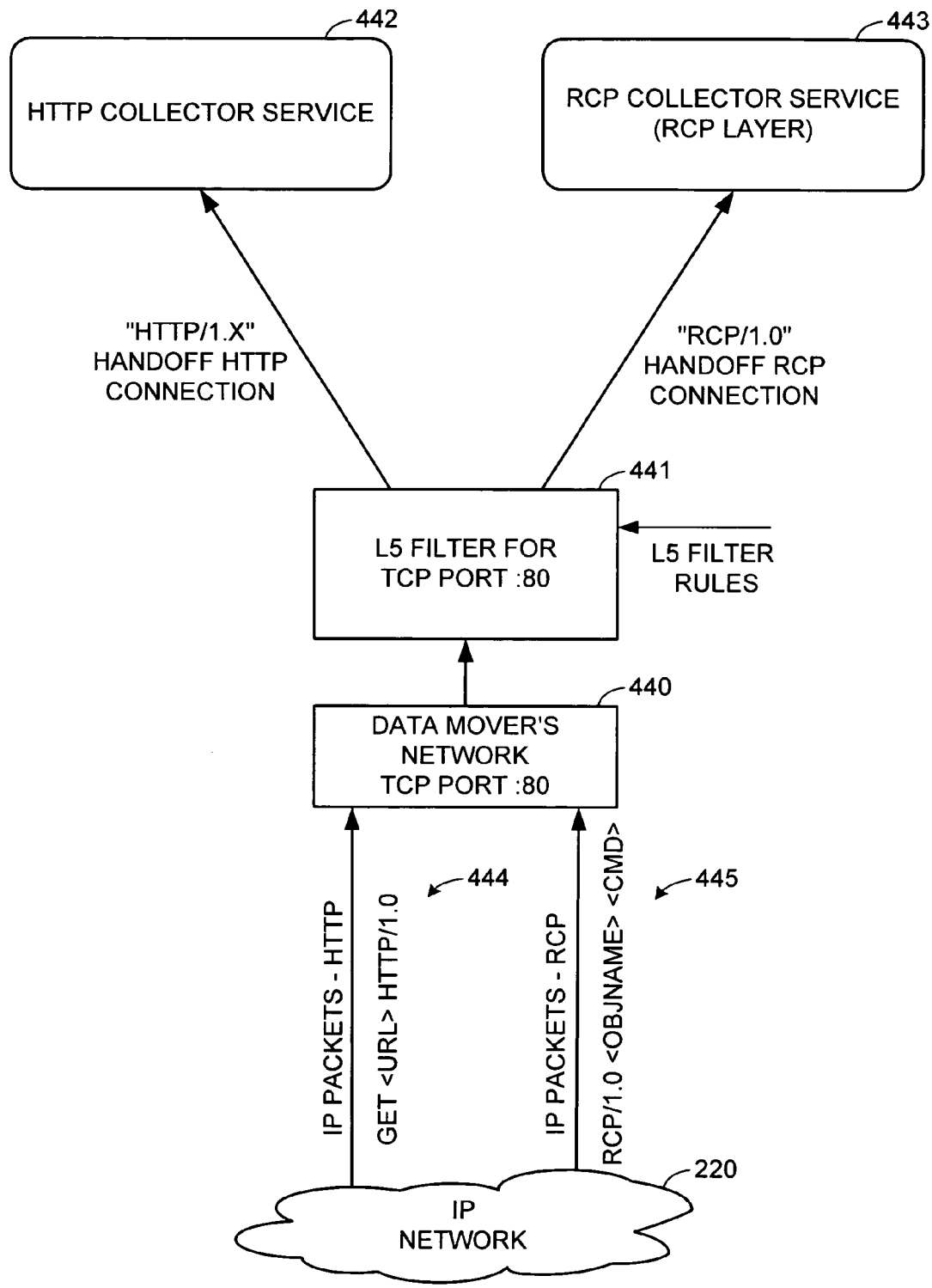
FIG. 19 is a block diagram showing the sharing of a data mover's single TCP port for RCP connections with Hypertext Transfer Protocol (HTTP) connections.

FIG. 19 shows the sharing of the data mover's network TCP port: 80 (440) between HTTP and RCP. This configuration is used in all data movers having the RCP collector service; i.e., primary, secondary, or forwarder. The TCP data channel from TCP port: 80 (440) provides an in-order byte stream interface. IP packets 444 for HTTP connections and IP packets 445 for RCP connections from the network 220 are directed to the data mover's TCP port: 80 (440). The TCP port: 80 (440) is opened in both directions (i.e., input and output). In the input direction, the data mover uses a level (L5) filter 441 for demultiplexing the IP packets for the HTTP connections from the IP packets for the RCP connections based on an initial segment of each TCP connection. The L5 filter hands the TCP connection off to either a HTTP collector service 442 or an RCP collector service 443. (The RCP collector service 443 is the collector service 390 in the RCP primary of FIG. 14 or the RCP collector service 400 in an RCP secondary of FIG. 15.) For example, if the initial segment of a TCP connection contains "HTTP/1.X", then the L5 filter 441 directs the IP packets for the connection to the HTTP collector service 442. If the initial segment of the TCP connection contains "RCP/1.0", then the IP packets for the TCP connection are directed to the RCP collector service 443. (In an alternative arrangement, the connection could be split as is done in a conventional stand-alone IP switch.)

Data Recovery with Internet Protocol Replication with or without Full Resync

Figure 20:
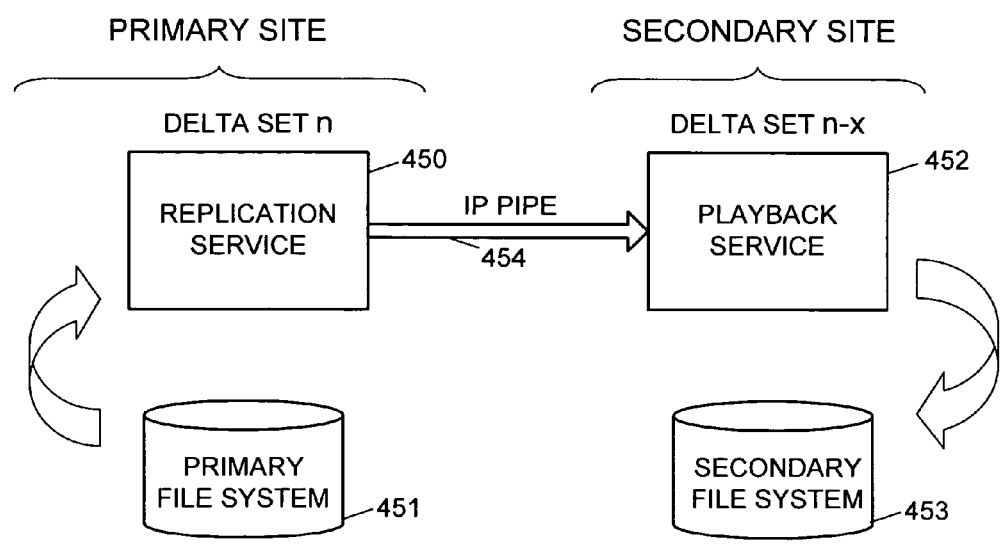
FIG. 20 is a block diagram showing the state of a remote replication system before a disaster at the primary site.

A remote replication system may protect against data loss resulting from a disaster. For example, FIG. 20 shows the state of a remote replication system before a disaster. The remote replication system copies data in an asynchronous fashion from a primary data storage system at the primary site to a secondary data storage system at a secondary site. The primary and secondary data storage systems could be file servers, for example as shown in FIG. 1.

As shown in FIG. 20, the primary site includes a replication service 450 replicating changes made to a primary file system 451, and the secondary site includes a playback service 452 writing the changes into a secondary file system 453. The replication service 450 transfers the changes in "delta sets" sent over an IP pipe 454 to the playback service 452. The disaster occurs at the primary site during this transfer. At this time, the playback service 452 is a few delta sets behind the replication service 450; for example, the playback service is playing back delta set (n-x) when the replication service 452 is replicating delta set (n).

Once the disaster causes the primary site to go down, the secondary site can be activated to service client read/write requests. When the primary site comes back up, it can be re-synchronized to the secondary site, in many cases without making a full copy of the file system. Then replication can be re-established as it was before the disaster. This recovery process has been designed to minimize data loss and the down time of both the primary and secondary site.

Figure 21:
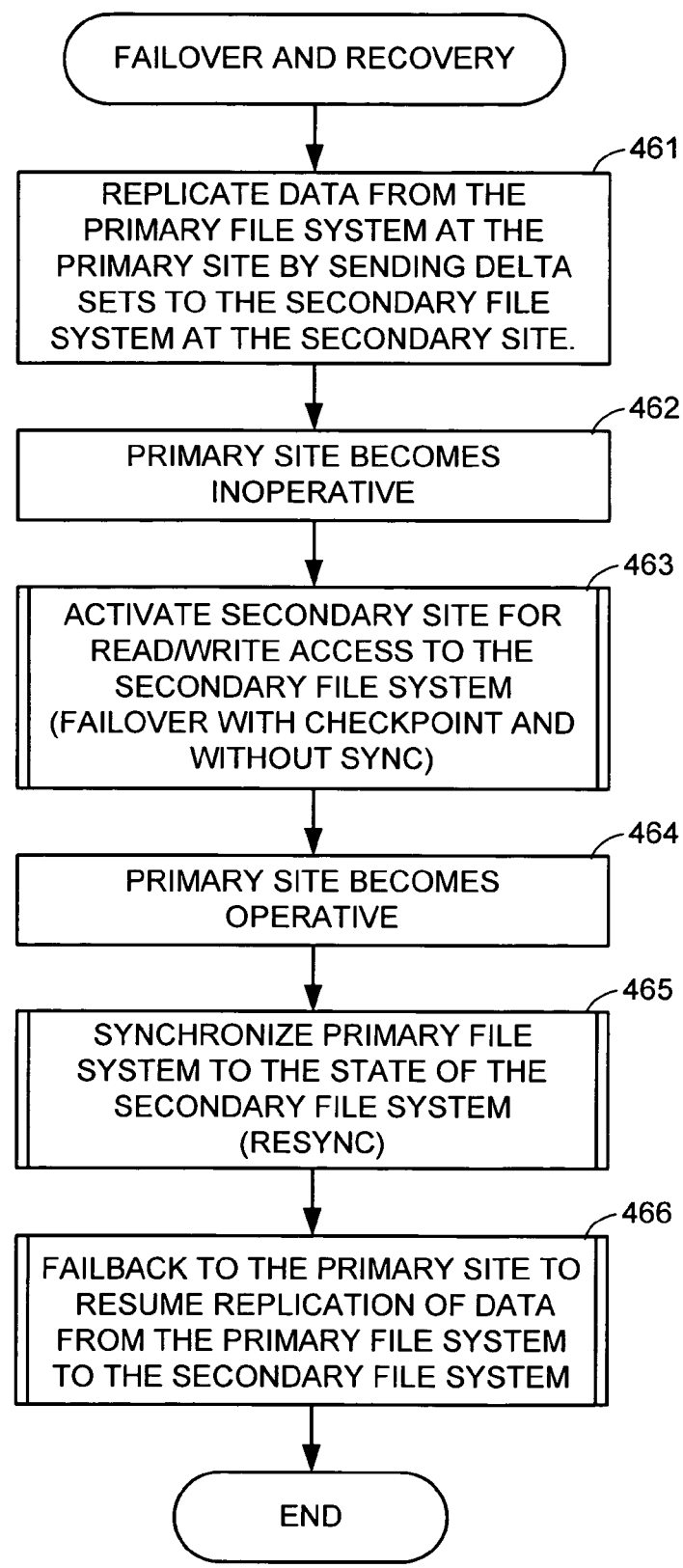
FIG. 21 is a flowchart of a failover and recovery method performed upon the remote replication system of FIG. 20 in order to recover from the disaster at the primary site.

FIG. 21 is a flowchart of the preferred recovery process. Initially, in step 461, data is replicated from the primary file system at the primary site by sending delta sets to the secondary file system at the secondary site. Then in step 462, the primary site becomes inoperative. In response, in step 463, the secondary site is activated for read/write access to the secondary file system. This is done by a subroutine for failover with a checkpoint and without sync, as further described below with respect to FIG. 23. Eventually, in step 464, the primary site becomes operative. In response, in step 465, the primary file system is synchronized to the state of the secondary file system, as further described below with respect to FIG. 28. Then in step 466, read/write access to the primary file system and replication of data from the primary file system to the secondary file system is resumed in a failback operation, as further described below with reference to FIG. 30.

Figure 22:
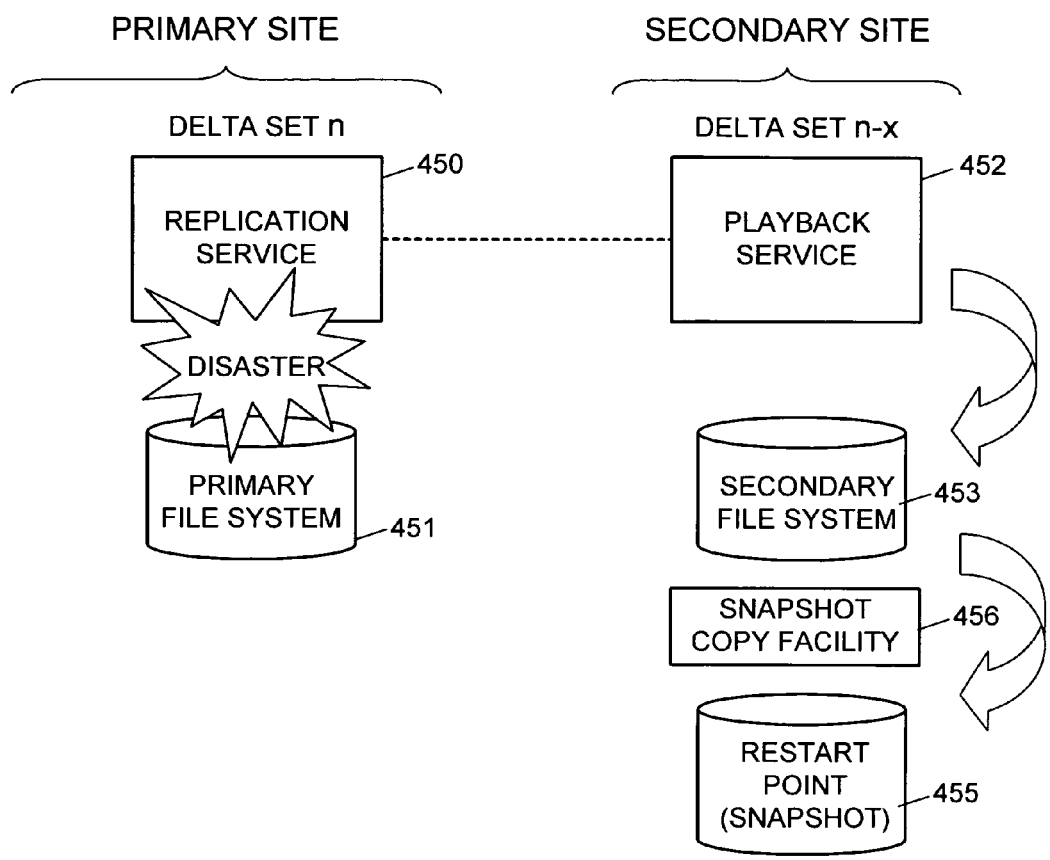
FIG. 22 is a block diagram showing the state of the remote replication system of FIG. 20 after failover from the primary site to the secondary site.

FIG. 22 shows the state of the remote replication system of FIG. 20 during the failover operation. The (n-x) deltasets are played back into the secondary file system 453, to put the secondary file system 453 into a state called a "restart point". A snapshot copy facility 456 creates a snapshot 455 of the "restart point" in order to facilitate synchronization of the primary file system with the secondary file system once the primary site becomes operative. The playback service 452 is stopped, and the secondary file system 453 is remounted as read/write. The snapshot copy facility 456 keeps a record of changes made to the secondary file system 453 after the "restart point."

Figure 23:
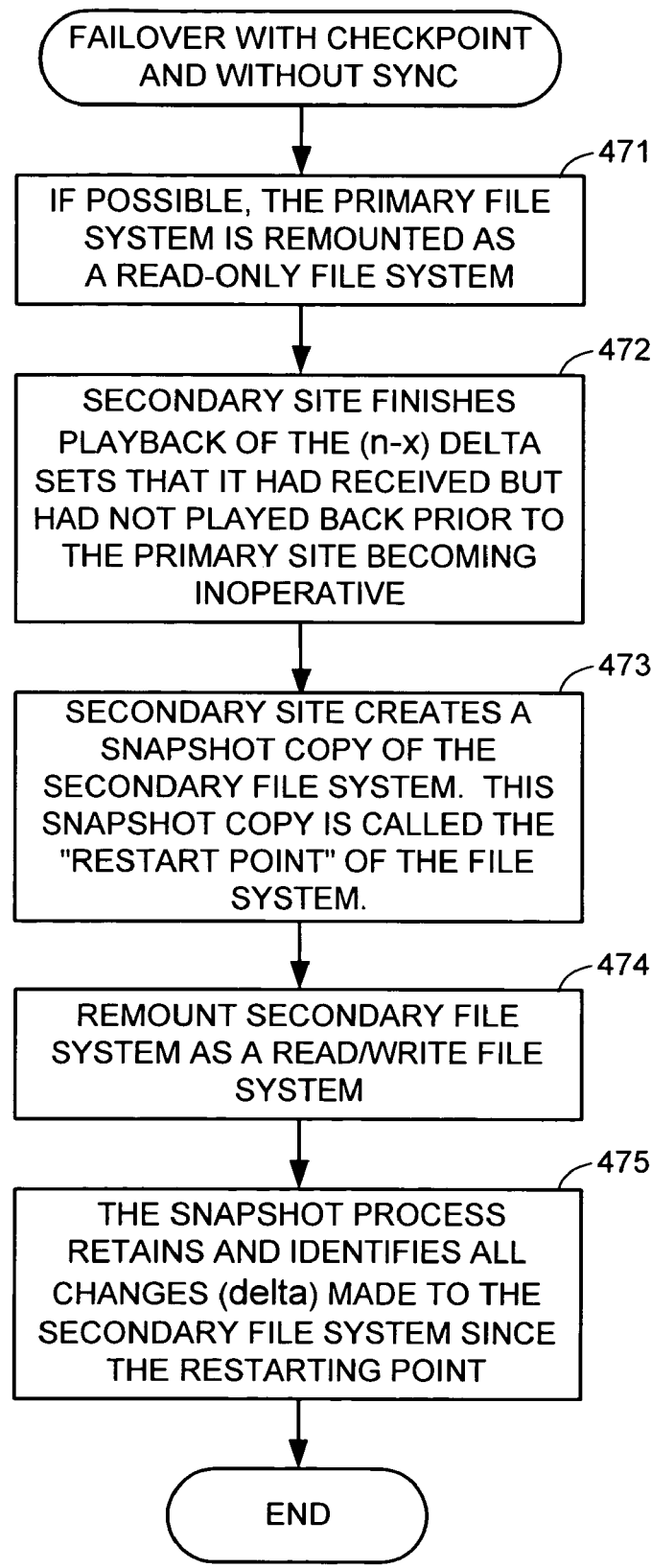
FIG. 23 is a flowchart of a subroutine of failover with a checkpoint and without sync, as used in the flowchart of FIG. 21.

FIG. 23 shows a flowchart of the failover operation. In step 471, if possible, the primary file system is remounted as a read-only file system. Next, in step 472, the secondary site finishes playback of the (n-x) delta sets that it had received but had not played back prior to the primary site becoming inoperative. In step 473, the secondary site creates a snapshot copy of the "restart point" of the secondary file system. This snapshot is stamped with the last delta set having been replayed into the secondary file system prior to the creation of the snapshot. In other words, an identifier of this last delta set is stored as an attribute of the snapshot. In general, whenever a snapshot is made of a file system during playback of delta sets into the file system, the snapshot is stamped with the last delta set having been replayed. In step 474, the secondary file system is remounted as a read/write file system. In step 475, the snapshot process retains and identifies all changes (delta) made to the secondary file system since the restarting point.

Figure 24:
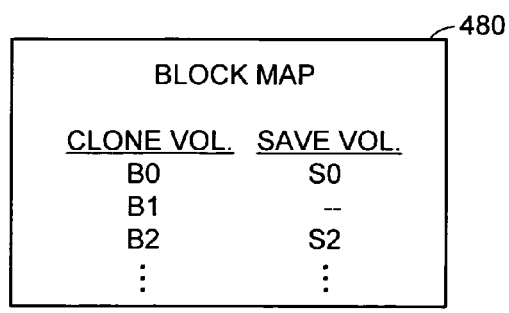
FIG. 24 shows a block map that can be used to create a snapshot copy of the secondary file system at a restart point during the failover of FIG. 23.

Preferably the snapshot copy facility 456 retains and identifies the changes at a logical volume level of data storage. For example, the present state of the secondary file system is stored in a "clone volume," and old versions of the logical blocks that have been changed in the clone volume are saved in a "save volume". In order to conserve storage, the logical blocks of the save volume are dynamically allocated to the old versions of the changed blocks as the changes are made to the clone volume. As shown in FIG. 24, for each logical block that has been changed in the clone volume, a block map 480 identifies the logical block address ($S_i$) of the old version of the block in the save volume and the corresponding logical block address ($B_i$) of the changed block in the clone volume.

Figure 25:
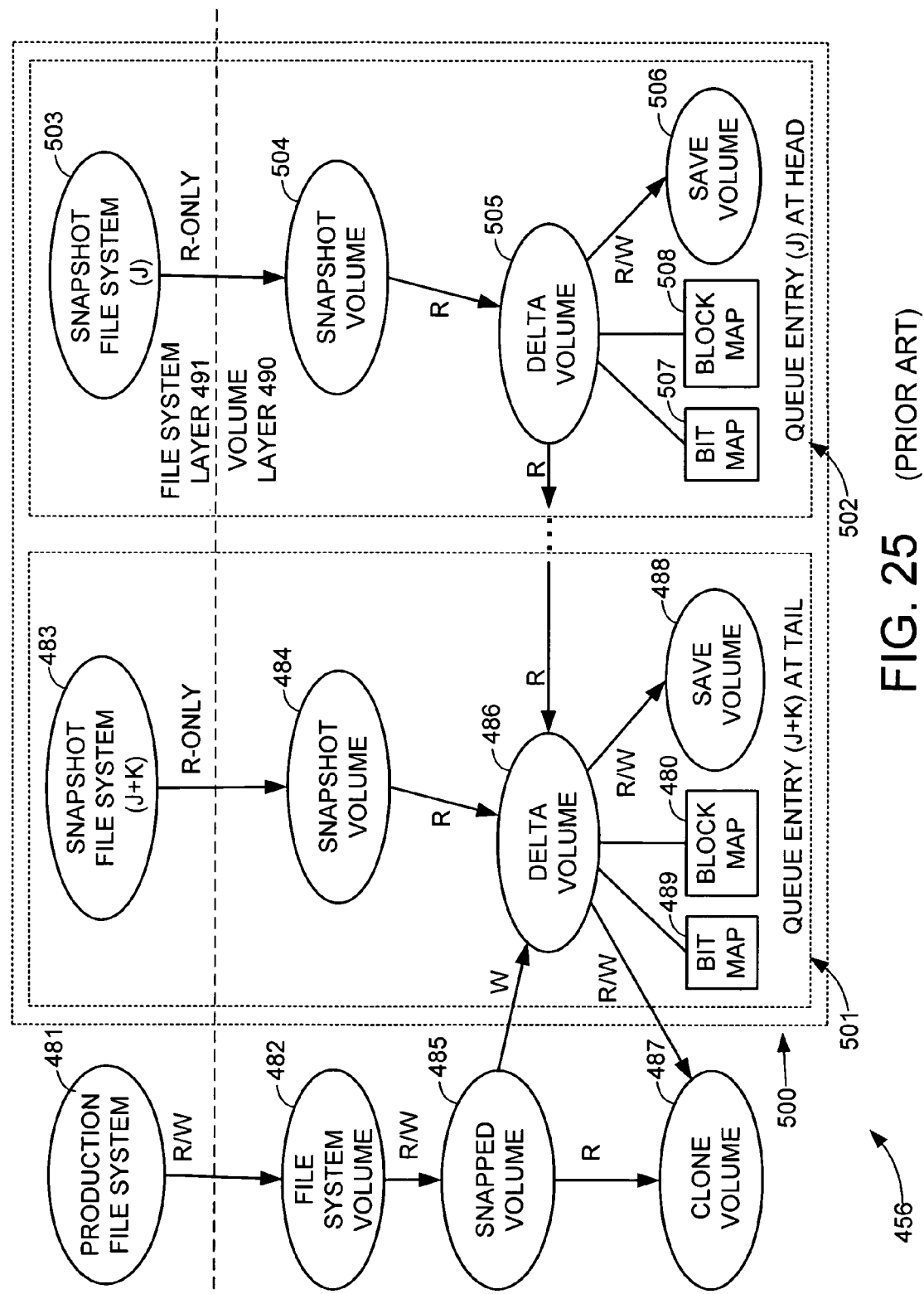
FIG. 25 shows a snapshot copy facility that can be used to create the snapshot copy of the secondary file system at the restart point during the failover of FIG. 23.

FIG. 25 shows details of the preferred snapshot copy facility 456, which provides multiple snapshots 483, 503 of a production file system 481. (Two successive snapshots of the secondary file system are used, for example, in the resync subroutine further described below with reference to FIG. 28.) The content of each snapshot file system 483, 503 is the state of the production file system 481 at a particular point in time when the snapshot was created. The snapshot copy facility 456 provides a hierarchy of objects in a volume layer 490 supporting the file systems in a file system layer 491. The production file system 481 is supported by read/write access to a file system volume 482. Each snapshot file system 483, 503 provides read-only access to a respective snapshot volume 484, 504.

Additional objects in the volume layer 490 of FIG. 25 permit the content of each snapshot file system to be maintained during concurrent read/write access to the production file system 481. The file system volume 482 is supported by a snapped volume 485 having read access to a clone volume 487 and write access to a delta volume 486. The delta volume 486 has read/write access to the clone volume 487 and read/write access to a save volume 488.

In the organization of FIG. 25, the actual data is stored in blocks in the clone volume 487 and a respective save volume 488, 506 in storage for each snapshot. The delta volume 486 also accesses information stored in a bit map 489 and the block map 480. The bit map 489 indicates which blocks in the clone volume 487 have prior versions in the save volume 488. In other words, for read-only access to the snapshot file system, the bit map 489 indicates whether the delta volume should read each block from the clone volume 487 or from the save volume 488. For example, the bit map is stored in memory and it includes a bit for each block in the clone volume 487. The bit is clear to indicate that there is no prior version of the block in the save volume 488, and the bit is set to indicate that there is a prior version of the block in the save volume 488.

Consider, for example, a production file system 481 having blocks a, b, c, d, e, f, g, and h. Suppose that when the snapshot file system 483 is created, the blocks have values a0, b0, c0, d0, e0, f0, g0, and h0. Thereafter, read/write access to the production file system 481 modifies the contents of blocks a and b, by writing new values a1 and a2 into them. At this point, the following contents are seen in the clone volume 487 and in the save volume 488:

Clone Volume: a1, b1, c0, d0, e0, f0, g0, h0
Save Volume: a0, b0

From the contents of the clone volume 487 and the save volume 488, it is possible to construct the contents of the snapshot file system 483. When reading a block from the snapshot file system 483, the block is read from the save volume 488 if found there, else it is read from the clone volume 487.

FIG. 25 further shows that a snapshot queue 500 maintains respective objects supporting multiple snapshot file systems 483, 503 created at different respective points in time from the production file system 481. In particular, the snapshot queue 500 includes a queue entry (J+K) at the tail 501 of the queue, and a queue entry (J) at the head 502 of the queue. In this example, the snapshot file system 483, the snapshot volume 484, the delta volume 486, the save volume 488, the bit map 489, and the block map 480 are all located in the queue entry at the tail 501 of the queue. The queue entry at the head of the queue 502 includes similar objects; namely, the snapshot file system (J) 503, a snapshot volume 504, a delta volume 505, a save volume 506, a bit map 507, and a block map 508.

The snapshot copy facility 456 may respond to a request for another snapshot of the production file system 481 by allocating the objects for a new queue entry, and inserting the new queue entry at the tail of the queue, and linking it to the snapped volume 485 and the clone volume 487. In this fashion, the save volumes 488, 506 in the snapshot queue 500 are maintained in a chronological order of the respective points in time when the snapshot file systems were created. The save volume 506 supporting the oldest snapshot file system 503 resides at the head 502 of the queue, and the save volume 488 supporting the youngest snapshot file system 483 resides at the tail 501 of the queue.

Figure 26:
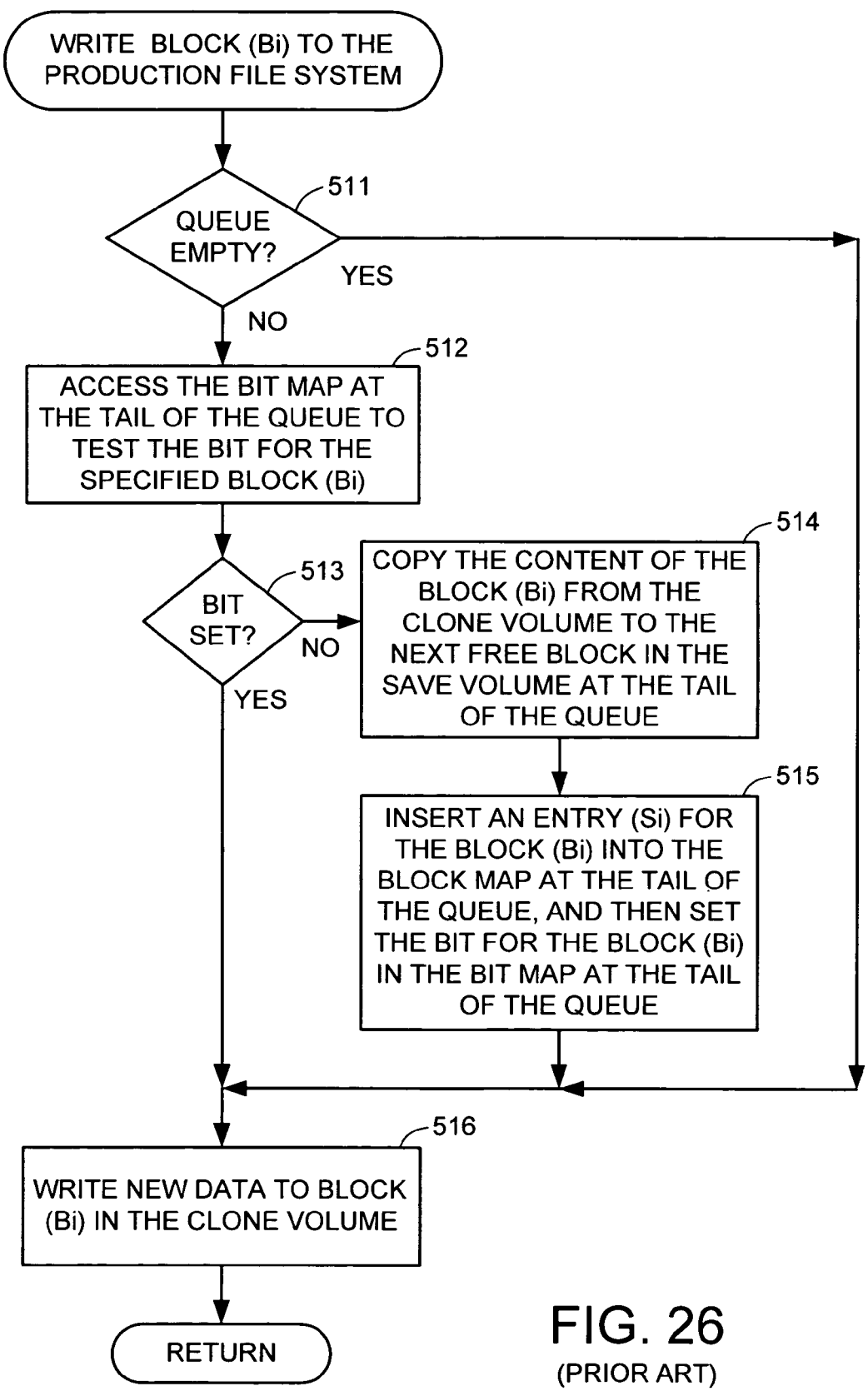
FIG. 26 is a flowchart of a procedure for writing a block of data to a production file system in the snapshot copy facility of FIG. 25.

FIG. 26 shows a procedure performed by the snapshot copy facility for writing a specified block ($B_i$) to the production file system. In step 511, if the snapshot queue is not empty, execution continues to step 512. In step 512, the bit map at the tail of the snapshot queue is accessed in order to test the bit for the specified block ($B_i$). Then in step 513, if the bit is not set, execution branches to step 514. In step 514, the content of the specified block ($B_i$) is copied from the clone volume to the next free block in the save volume at the tail of the snapshot queue. Execution continues from step 514 to step 515. In step 515, the save volume block address ($S_i$) of the free block is inserted into the entry for the block ($B_i$) in the block map at the tail of the queue, and then the bit for the block ($B_i$) is set in the bit map at the tail of the queue. After step 515, execution continues to step 516. Execution also continues to step 516 from step 513 if the tested bit is found to be set. Moreover, execution continues to step 516 from step 511 if the snapshot queue is empty. In step 516, new data is written to the specified block ($B_i$) in the clone volume, and then execution returns.

Figure 27:
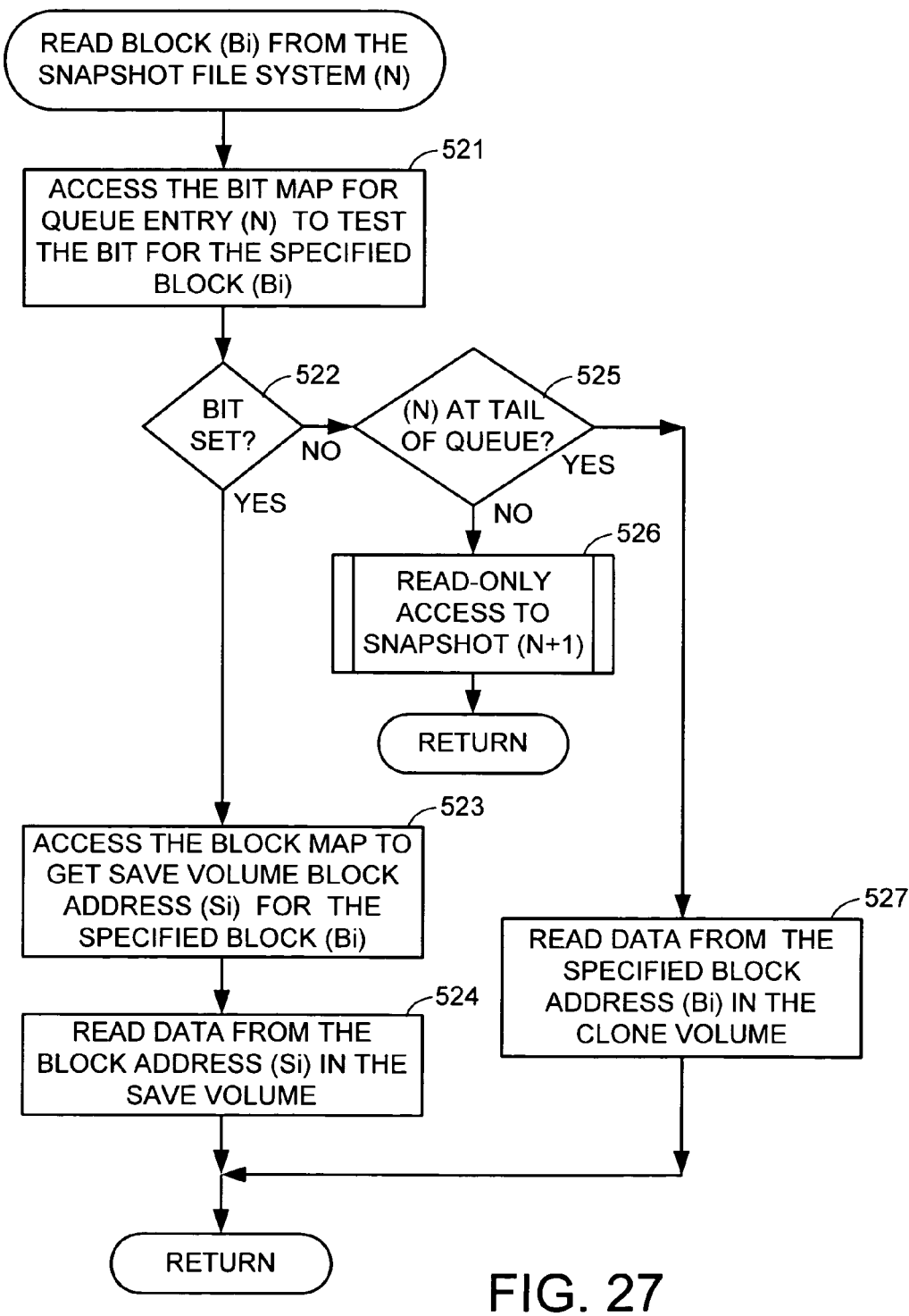
FIG. 27 is a flowchart of a procedure for reading a block of data from a snapshot file system in the snapshot copy facility of FIG. 25.

FIG. 27 shows a procedure performed by the snapshot copy facility for reading a specified block ($B_i$) from a specified snapshot file system (N). In the first step 521, the bit map is accessed for the queue entry (N) to test the bit for the specified block ($B_i$). Then in step 522, if the tested bit is set, execution continues to step 523. In step 523, the block map is accessed to get the save volume block address ($S_i$) for the specified block ($B_i$). Then in step 524 the data is read from the block address ($S_i$) in the save volume, and then execution returns.

If in step 522 the tested bit is not set, then execution branches to step 525. In step 525, if the specified snapshot (N) is not at the tail of the snapshot queue, then execution continues to step 526 to perform a recursive subroutine call upon the subroutine in FIG. 27 for read-only access to the snapshot (N+1). After step 526, execution returns.

If in step 525 the snapshot (N) is at the tail of the snapshot queue, then execution branches to step 527. In step 527, the data is read from the specified block ($B_i$) in the clone volume, and execution returns.

Figure 28:
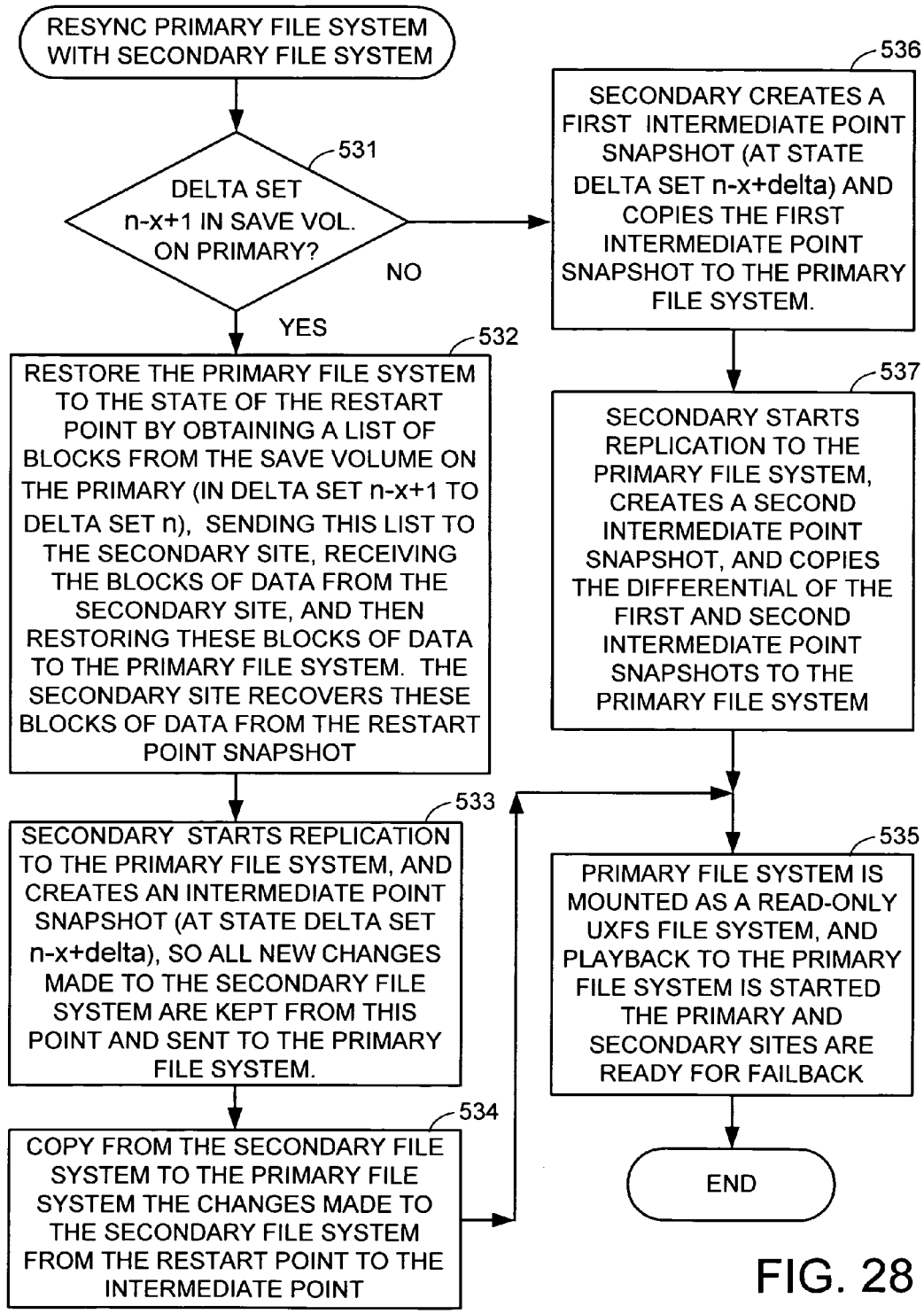
FIG. 28 is a flowchart of a subroutine to resync the primary file system with the secondary file system, as used in the flowchart of FIG. 21.

FIG. 28 shows the subroutine to resync the primary file system with the secondary file system, as used in the flowchart of FIG. 21. In a first step 531 in FIG. 28, the delta set identifier (n-x) for the restart point is read from the delta set attribute of the restart point snapshot, and it is incremented by one to compute (n-x+1). The save volume at the primary site is searched for the delta set (n-x+1). Execution continues from step 531 to step 532 if the delta set n-x+1 is found in the save volume at the primary site. In this case, the primary site should also have all of the delta sets from delta set n-x+1 to delta set n, and the primary file system can be restored to the state of the restart point in step 532 by an "undo" of the data blocks of these delta sets. The primary file system is restored with "before images" of these data blocks in order to "undo" the changes. The delta sets n-x+1 to n contain "after images" of these data blocks. The "before images" of these data blocks are stored in the secondary site in the snapshot of the secondary file system at the restart point. Therefore, to restore the primary file system to the state of the restart point, the snapshot copy facility at the secondary site reads the "before images" from the "restart point" snapshot, and the secondary site executes a remote copy of these "before images" to the primary file system.

In step 532, the primary site restores the primary file system to the state of the restarting point by obtaining a list of blocks from the save volume at the primary site, including the blocks in delta set n-x+1 to delta set n. The primary site sends this list to the snapshot copy facility at the secondary site. The secondary site retrieves the data of these blocks from the snapshot at the restart point, and returns the data to the primary site. The primary site receives these blocks of data and restores them to the primary file system.

In step 533, the snapshot copy facility starts replication to the primary file system, and creates an intermediate point snapshot (at state delta set n-x+δ), so all new changes made to the secondary file system since the intermediate point are kept and sent to the primary file system. However, they are not yet played back into the primary file system. At this point, the primary file system is mounted as a "raw" file system, so it is not accessible to users.

In step 534, the changes made to the secondary file system from the restart point to the intermediate point are copied from the secondary file system to the primary file system. These changes are maintained by the snapshot copy facility at the secondary site. For the snapshot copy facility as shown in FIG. 25, for example, assume that the restart point is the snapshot J and the intermediate point is the snapshot J+K where K is one. In this case, the changed blocks are identified in the bit map 507, and the data of the changed data blocks are found by reading from the intermediate point snapshot file system. To retrieve these changes, the snapshot copy facility scans the bit map 507 to find any set bit indicating a change in the save volume, and if the bit is set, the snapshot copy facility notes the block address ($B_i$). The snapshot copy facility then reads the snapshot file system (J+K) 483 at this block address ($B_i$). The snapshot copy facility continues this process until it has finished scanning the bit map 507.

In FIG. 28, after step 534, execution continues to step 535. In step 535, the primary file system is mounted as a read-only UxFS file system, and playback to the primary file system is started. At this point, the resync is finished, and the primary and secondary sites are ready for failback.

In step 531, if the delta set n-x+1 cannot be found in the save volume from before failover (459 in FIG. 29) at the primary site (for example, because the save volume was destroyed during the disaster), then execution branches from step 531 to step 536. In this case, the secondary file system is migrated to the primary file system, and a warning message is logged and displayed to the system administrator to signal that the full copy was required. In step 536, the secondary creates a first intermediate point snapshot (at state delta set n-x+δ), and copies the first intermediate point snapshot to the primary file system. At this time, read/write access to the secondary file system is permitted on a priority basis. Then in step 537, the secondary starts replication to the primary file system, and creates a second intermediate point snapshot, so all new changes made to the secondary file system since the second intermediate point are kept and sent to the primary file system by the replication process. However, these new changes are not yet played back into the primary file system. At this point, the primary file system is mounted as a "raw" file system, so it is not accessible to users. Moreover, in step 537, the differential of the first and second intermediate point snapshots (i.e., the changes made to the secondary file system from the first intermediate point snapshot to the second intermediate point snapshot) are copied to the primary file system. Then execution continues to step 535, to mount the primary file system as a read-only UxFS file system, and to start playback to the primary file system. Also in step 535, the restart snapshot and the intermediate snapshot can be deleted.

The migration method of steps 536 to 537 is used in order to reduce the likelihood that read/write access to the secondary file system and replication to the primary file system would be interrupted by the primary and secondary save volumes (274, 275 in FIG. 5) becoming full. Each save volume functions as a wrap-around buffer. The primary save volume will store updates received in step 537 from the secondary site until playback to the primary file system is started in step 535. If the primary save volume would become full in step 537, a TCP flow control signal is sent from the primary site to the secondary site to suspend transmission of further updates. When transmission of further updates is suspended, the further updates can be stored in the secondary save volume (275 in FIG. 5) until the secondary save volume would become full. If the secondary save volume would become full, then read/write access to the secondary file system and replication to the primary file system would be suspended until playback to the primary file system is started in step 535 and updates are removed from the primary and secondary save volumes.

Figure 29:
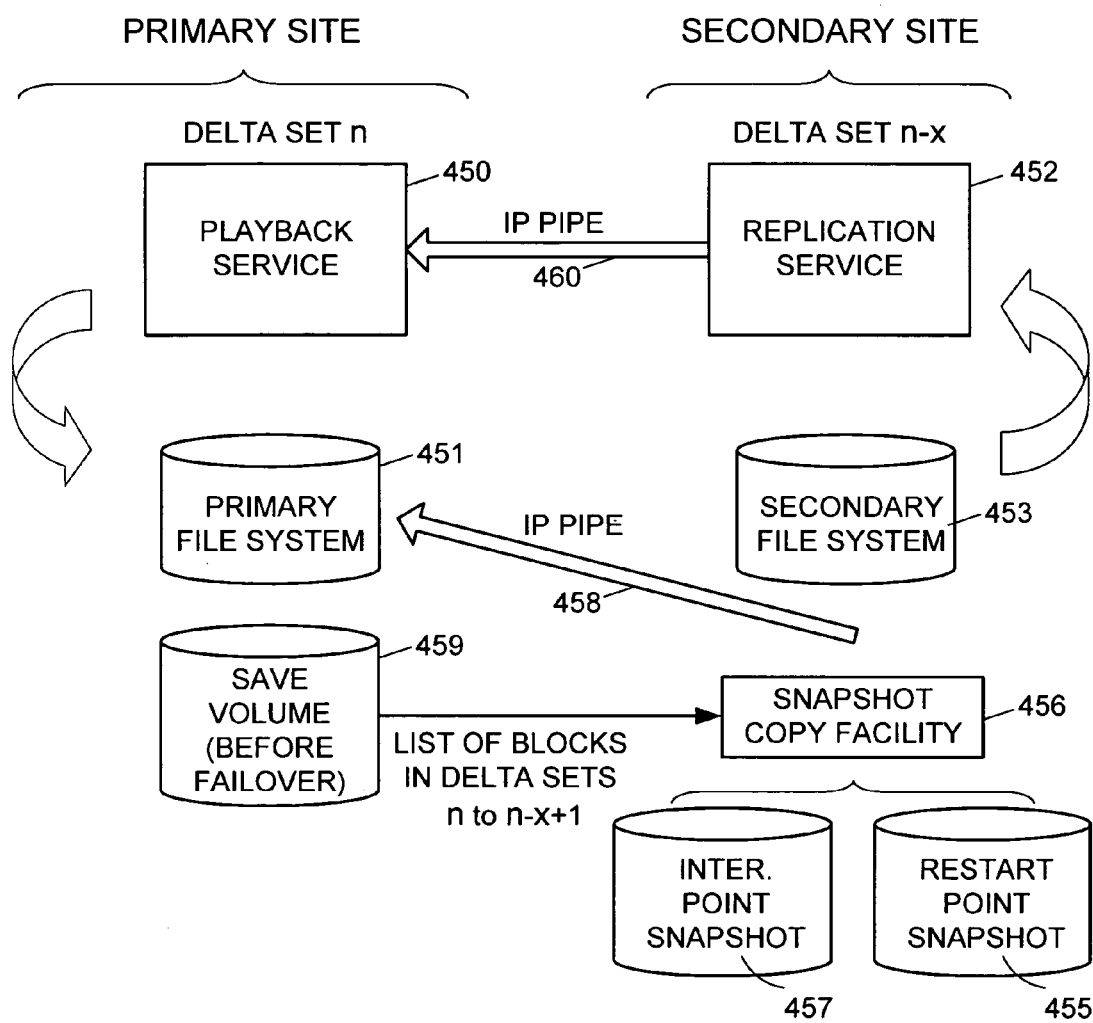
FIG. 29 shows the state of the remote replication system of FIG. 20 during the resync procedure.

FIG. 29 shows the state of the remote replication system of FIG. 20 during the resync procedure. At the secondary site, the snapshot copy facility 456 has created the intermediate point snapshot 457. A list of blocks in the delta sets n to n-x+1 is obtained from the save volume 459 at the primary site and sent to the snapshot copy facility 456 at the secondary site. The snapshot copy facility 456 returns "before images" of the requested blocks over an IP pipe 458 to the primary file system 451 to restore the primary file system to the state of the restart point snapshot, and then sends the changes from the restart point to the intermediate point. The replication service 452 at the secondary site is replicating changes to the secondary file system since the intermediate point, and is sending these changes over the IP pipe 460 to the playback service 450. Transmission of these changes since the intermediate point over the IP pipe 460 is concurrent with transmission of changes prior to the intermediate point over the IP pipe 458. Once the primary file system 451 has been synchronized to the intermediate point 457, the playback service 450 at the primary site is activated to play these changes into the primary file system 451. If the primary site should crash during the copy process of steps 534 or 536, then the copy process can be restarted automatically.

Figure 30:
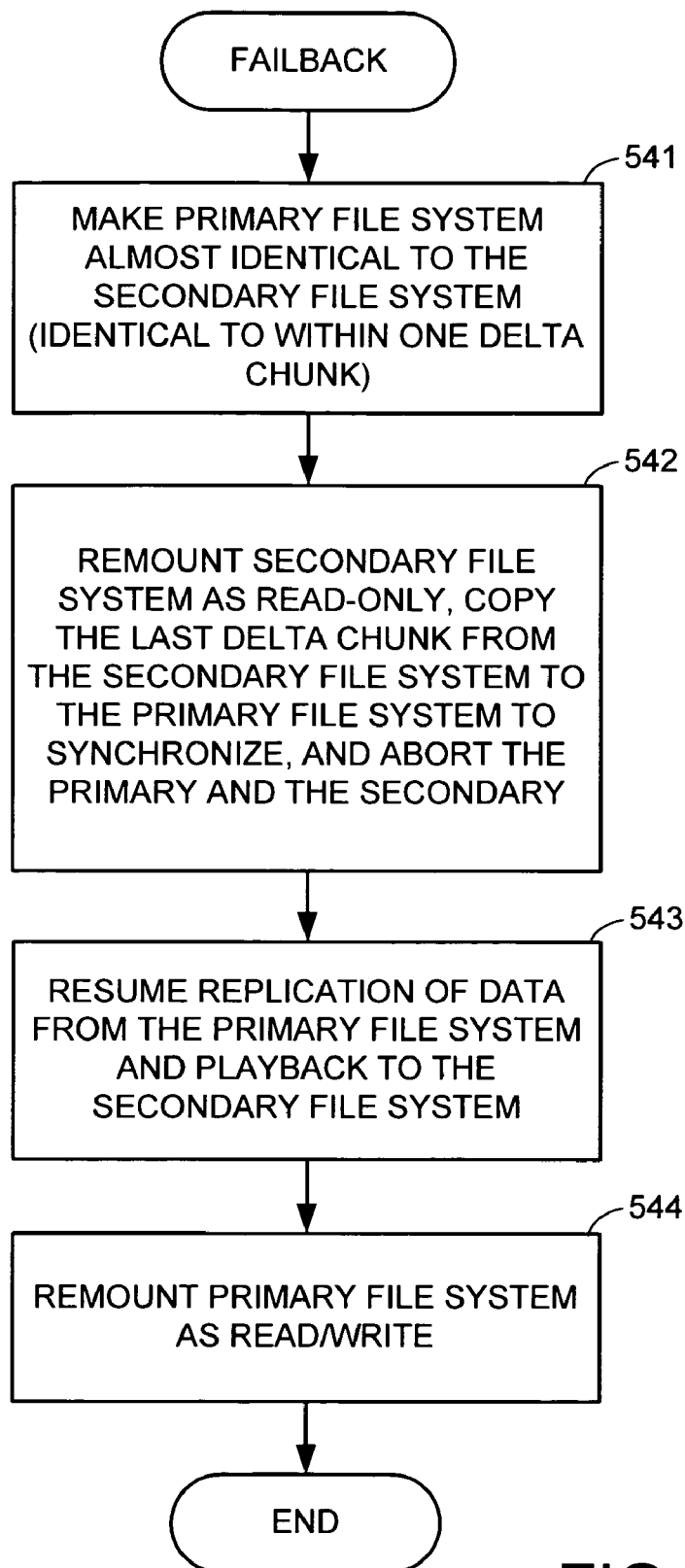
FIG. 30 is a flowchart of a subroutine to failback to the primary file system, as used in the flowchart of FIG. 21.

FIG. 30 is a flowchart of the subroutine to failback to the primary file system. In a first step 541, the primary file system is made almost identical to the secondary file system by the replication process. For example, when the primary file system is within one delta chunk of the secondary file system, execution continues to step 542. In step 542, the secondary file system is re-mounted as read-only, and the last delta chunk is copied from the secondary file system to the primary file system in order to synchronize the primary file system from the secondary file system. Once synchronized, the primary and secondary are aborted, in order to terminate the processes of replication from the secondary, playback to the primary, and copying from the secondary to the primary. At this point, the primary file system contains all the data that the secondary file system had before the disaster and the additional data that the secondary file system had accumulated after the disaster. Then in step 543, there is a resumption of the replication of data from the primary file system and playback to the secondary file system. Then in step 544, the primary file system is remounted as read/write. Therefore, the recovery process permits replication to be restarted as it was before the disaster. Some data might have been lost at failover time since replication is asynchronous. This is dependent on the number "x" of delta sets that the secondary file system was behind the primary file system when the disaster occurred at the primary. The less the number "x" of delta sets the closer the final recovered file system would be to the original file system.

A number of commands have been devised for conducting the above recovery procedure when network file servers (such as shown in FIGS. 1 and 5) are used at the primary and secondary sites. These commands include a $fs_replicate-failover command, a $fs_replicate-resync command, a $fs_replicate-status command, $fs_replicate-failback command, and a $fs_copy-start command.

The $fs_replicate-failover command has the following format:

$fs_replicate-failover <pfs>:cel=<server> <sfs> [-sync] [-now]

where <pfs> is the primary file system, <server> is the server of the primary file system, <sfs> is the secondary file system, [-sync] is an option that is set when the user wants the failover to happen when both the primary file system and the secondary file system are "in sync" (i.e., identical state), and [-now] is an option to specify immediate failover. The $fs_replicate-failover command is executed on the control station for the secondary file system.

When the [-sync] option is not set, this command will internally stop the replication and playback of <sfs>, making sure that all of the delta sets available on secondary site are re-played. Then it will try to stop the replication on <pfs> as well, unless the [-restartpoint] option is set. Then <sfs> will be remounted "rw". If possible, <pfs> is remounted "ro". No [-sync] option should be specified if the primary control station or server is down. In this case, after failover, some data could be lost.

When the [now] option is set, the playback of <sfs> is immediately stopped, without replaying any of the delta sets available on the secondary site.

When the [-sync] option is specified, the primary control station and the server must be up, else the command will fail. The primary file system <pfs> is re-mounted as read-only and a last delta set is created. Once the last delta set is played back to the secondary, the replication process is stopped on the <sfs>/<pfs>. The secondary file system <sfs> now contains all the data that the <pfs> had before the failover. The secondary file system <sfs> is now mounted "rw".

Figure 31:
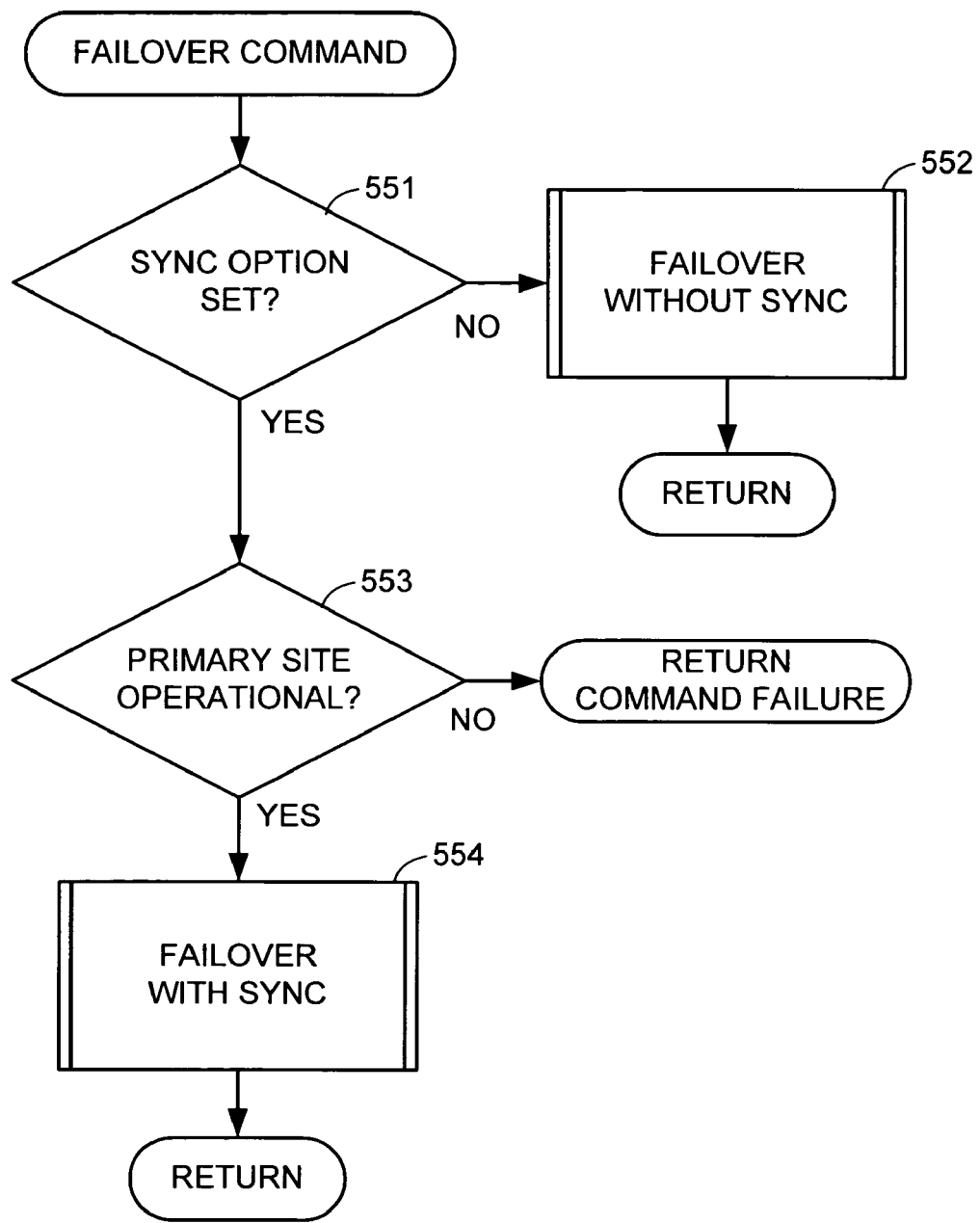
FIG. 31 is a flowchart of execution of a failover command having a sync option and a checkpoint option.

FIG. 31 shows a flowchart of execution of the $fs_replicate-failover command. In a first step 551, if the sync option is not set, then execution branches to step 552 to perform a failover without sync procedure, as described below with reference to FIG. 32. After step 552, execution is finished. In step 551, if the sync option is set, then execution continues to step 553. In step 553, if the primary site is not operational, execution returns reporting a command failure. Otherwise, if the primary site is operational, execution continues to step 554, to perform a failover with sync procedure, as described below with reference to FIG. 33.

Figure 32:
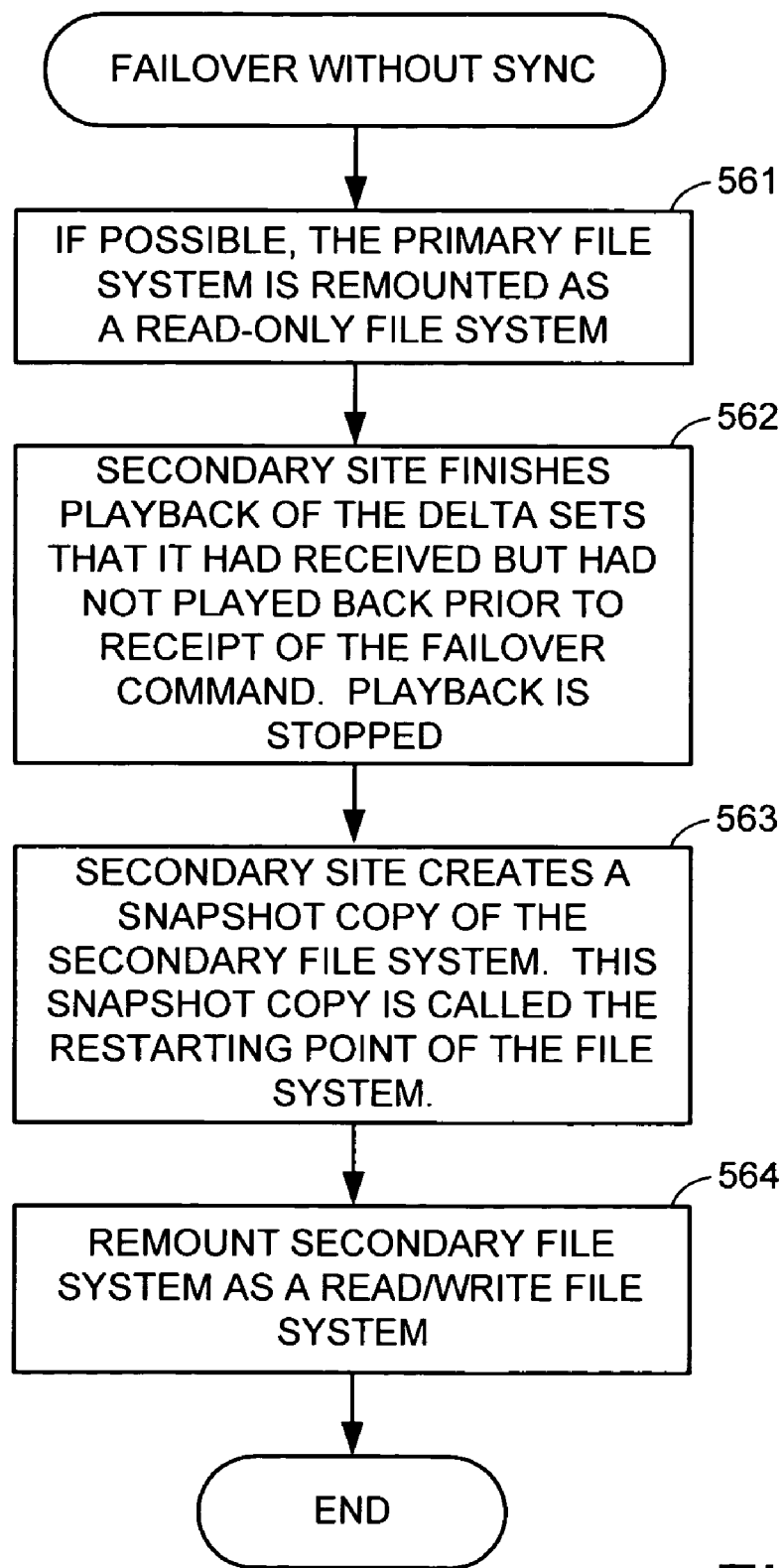
FIG. 32 is a flowchart of a subroutine for failover without sync, as used in the flowchart of FIG. 31.

FIG. 32 shows a flowchart of the failover without sync procedure. In step 561, if possible, the primary file system is remounted as a read-only file system. Then in step 562, the secondary site finishes playback of the delta sets that it had received but had not played back prior to receipt of the failover command. In step 563, the secondary site creates a snapshot copy of the secondary file system. This snapshot is called the restarting point of the file system. In step 564, the secondary file system is remounted as a read/write file system, and execution of the failover command is finished.

Figure 33:
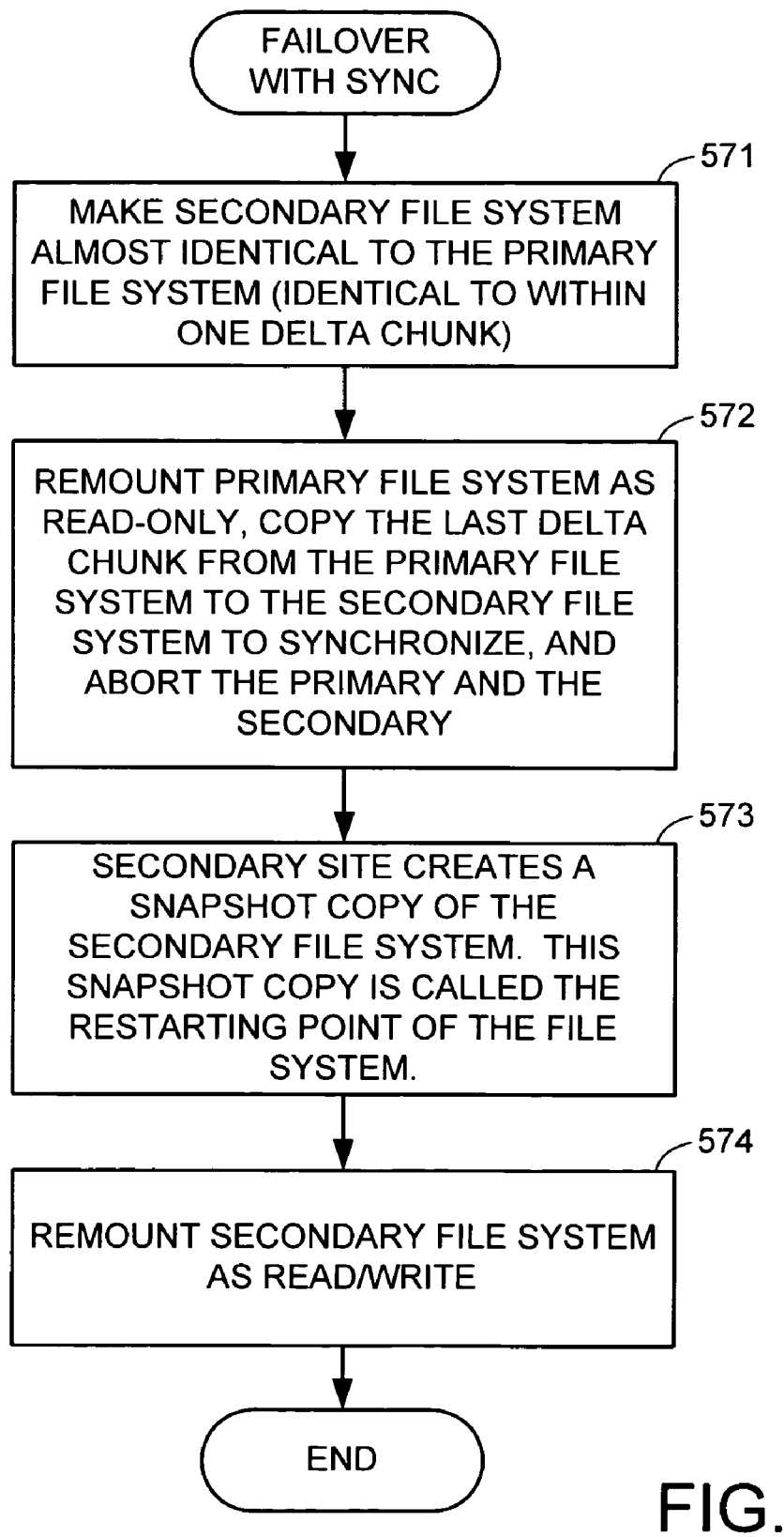
FIG. 33 is a subroutine for failover with sync, as used in the flowchart of FIG. 31.

FIG. 33 shows a flowchart of the failover with sync procedure. In a first step 571, the secondary file system is made almost identical to the primary file system by the replication process. For example, once the secondary file system is within one delta set chunk of the primary file system, execution continues to step 572. In step 572, the primary file system is remounted as read-only, the last delta chunk is copied from the primary file system to the secondary file system in order to synchronize the secondary file system to the primary file system, and then the primary and secondary are aborted to terminate the processes of replication from the primary, playback to the secondary, and copying from the primary to the secondary. Then in step 573, the secondary site creates a snapshot copy of the secondary file system. This snapshot copy is called the restarting point of the file system. Finally, in step 574, the secondary file system is remounted as read/write.

The $fs_replicate-resync command has the following format:

$fs_replicate-resync sfs pfs:cel=server1 where sfs is the secondary file system (this is now the source file system), pfs is the primary file system (this is the file system to be restored, a raw file system mounted on a server which has its IP interfaces configured), server1 is the site where a disaster occurred, and <ckpt_name> is the restart point name.

The $fs_replicate-status command has the following format:

$fs_replicate-status <pfs> <sfs>:cel=<remote_server> where <pfs> is the primary file system, <sfs> is the secondary file system, and <remote_server> is the server of the secondary site. This command can be used on the control station for the primary site, and also on the control station for the secondary site. Typically this command is used on the primary site when the user wants to check the status of the replication process, to determine when it is reasonable to failback. It is considered reasonable to failback when the difference between the primary file system and the secondary file system is very small. To assist the user, the primary site responds to this command by providing an indication of the number of blocks that are different between the primary file system and the secondary file system.

Following is an example of the information provided when the $fs_replicate-status command is executed:

file system, which runs playback, will then run replication and vice-versa for the secondary file system). This command can also be used to change the direction of replication, in the absence of any failure or disruption.

The $fs_replicate-failback command is executed on the site that the replication service is running (i.e., the site having the file system that is mounted as read/write). Typically, the $fs_replicate-failback command is executed on the primary site after it has been rebuilt. Then the primary file system is a raw file system that is restored from the secondary file system. The secondary file system is re-mounted read write. Replication is stopped on the secondary and playback is stopped on the primary. After the primary file system and the secondary file systems are in sync, the

| [nasadmin@cel_sfs nasadmin]$ fs_replicate - info sfs10 −v 128 | |
|---|---|
| id = | 59 |
| name = | sfs10 |
| type = | replication |
| current_delta_set = | 16 |
| current_block_number = | 1088 |
| current_transfer_rate = | 17.0667 blocks/second |
| avg_transfer_rate = | 25.7444 blocks/second |
| id = | 31 |
| name = | pfs10:cel_ip2 |
| type = | playback |
| current_delta_set = | 16 |

| outstanding delta sets: | | |
|---|---|---|
| Delta | Source_create_time | Blocks |
| 15 | 11/26 20:11:56 | 1 |

| | Source | | | Destination | | | |
|---|---|---|---|---|---|---|---|
| Delta | create Time | Dur | Blocks | Playback Time | Dur | Blocks | Dsin Group |
| 15 | 11/26 20:11:56 | 0 | 1 | | | | |
| 14 | 11/26 20:01:56 | 0 | 1 | | | | |
| 13 | 11/26 19:51:56 | 0 | 1 | 11/26 21:08:48 | 0 | 1 | 2 |
| 12 | 11/26 19:41:56 | 0 | 1 | | | | |
| 11 | 11/26 19:31:56 | 0 | 1 | 11/26 20:48:48 | 0 | 1 | 2 |
| 10 | 11/26 19:21:56 | 0 | 1 | | | | |
| 9 | 11/26 19:11:56 | 0 | 1 | 1/26 20:28:28 | 0 | 1 | 2 |
| 8 | 11/26 18:52:40 | 0 | 1 | 11/26 20:08:09 | 0 | 1 | 1 |
| 7 | 11/26 18:42:40 | 0 | 1 | | | | |
| 6 | 11/26 18:32:40 | 0 | 1 | 11/26 19:48:09 | 0 | 1 | 2 |
| 5 | 11/26 18:22:39 | 0 | 1 | | | | |
| 4 | 11/26 18:12:39 | 0 | 1 | 11/26 19:28:08 | 0 | 1 | 2 |
| 3 | 11/26 18:02:39 | 0 | 4 | 11/26 19:07:23 | 0 | 4 | 1 |

The $fs_replicate-failback command has the following format:

$fs_replicate-failback <pfs> <sfs>:cel=<remote_server> where <pfs> is the primary file system (a UxFS file system mounted as "ro"), and <sfs> is a secondary file system. This command is used when the user wants to failback to the primary site (after re-build phase). No data is lost and the replication will continue but it will be reversed (the primary primary file system is converted to a UxFS file system and re-mounted as read/write. Replication is turned back on and the flow of data is now from the primary file system to the secondary file system. Playback is started on the secondary file system. This command can be used to "swap" primary and secondary without having to do a full copy and without having to restart replication. On error, it should be possible to re-issue the fs_replicate-failback command and proceed if the error condition has been cleared.

The $fs_copy-start command has the following format:
$fs_copy-start <fs_ckpt2 > <sfs>:cel=<remote_server>-fromfs <fs_ckpt1> where <fs_ckpt1> is the primary file system ckpt1, <fs_ckpt2> is the primary file system ckpt2, <sfs> is the secondary file system, and <remote_server> is the server of the secondary site. This command is used internally by the fs_replicate-resync command. It could also be used for other purposes, for example, as described below with reference to FIGS. 36-38. This command copies the delta from fs_ckpt1 to fs_ckpt2 over to the secondary file system, knowing that the state of the secondary file system was equal to fs_ckpt1.

The following is an example of how the commands can be used to recover from a disaster.

1. After the disaster, decide the option to use for failover.
2. $fs_replicate-failover pfs:cel=cel_pfs sfs
3. Verify that sfs can accept read/write operation.
4. Initialize replication from sfs to pfs:
    On PFS control station:
        server_mount server_2-o ro pfs/pfs
    On SFS control station:
        $fs_replicate-resync pfs:cel=cel_pfs sfs
5. Verify that replication from sfs to pfs is running without a problem.
6. $fs_replicate-failback sfs pfs:cel=cel_pfs
7. Verify that replication from pfs to sfs is running without a problem.

Replication of Snapshots using IP File System Copy Differential

As described above with reference to steps 534 and 537 of FIG. 28, a file system copy differential was used to replicate an intermediate point snapshot during recovery of a file system from a disaster. A general-purpose file system copy differential command ($fs_copy-start) was also introduced.

Figure 34:
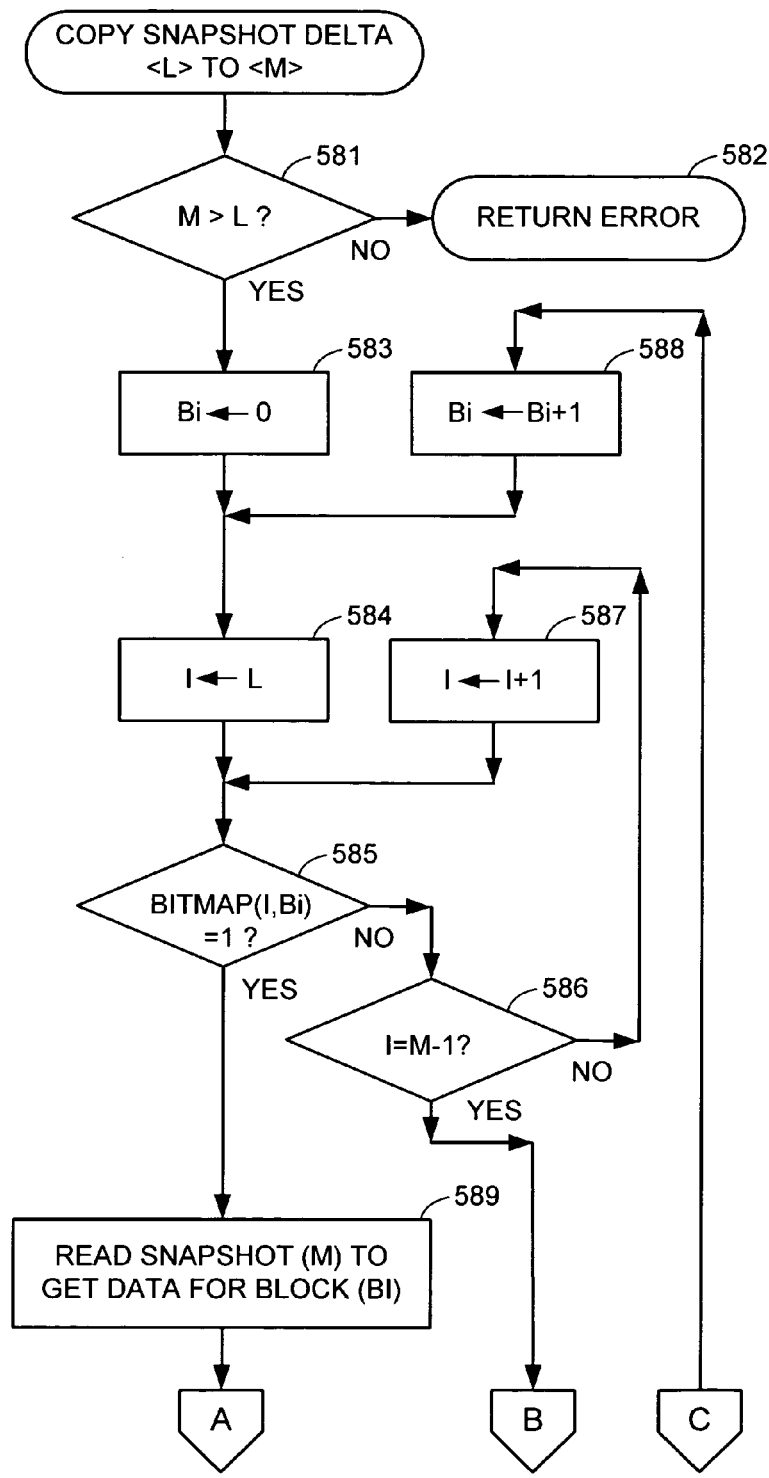
FIGS. 34 and 35 comprise a flowchart of a procedure for copying snapshot delta for snapshots L to M.

FIG. 34 shows a flowchart of a procedure for the $fs_copy-start command. Here L is the index of the snapshot fs_ckpt1, and M is the index of the snapshot fs_ckpt2. In a first step 581, M is compared to L, and execution branches to step 582 to return an error if M is not greater than L. Otherwise, execution continues to step 583.

The following steps execute the $fs_copy-start command by scanning one or more of the bit maps of the snapshot copy facility of FIG. 25. Each bit map indicates whether or not each block of a respective snapshot changed from the snapshot to the next snapshot. Therefore, by examining the bit maps for the snapshots L to M−1, it is determined whether or not each block has changed from snapshot L to M. If so, the new value of the block is read from the snapshot M. The bit maps are scanned in block order so that the new blocks are read from the snapshot M of the primary (i.e., the source) file system and transmitted to the secondary (i.e., the destination) file system in the order of their block indices ($B_i$).

In step 583, the block index ($B_i$) is set to zero. In step 584, a snapshot index (I) is set to L. In step 585, the bit map for the snapshot (I) is indexed with the block index ($B_i$) to determine whether or not the block was changed between snapshot (I) and snapshot (I+1). If in step 585 the bit for the block ($B_i$) is not set in the bit map for the snapshot (I), then no such change occurred, and execution continues to step 586. In step 586, if the snapshot index I is not equal to M−1, then execution continues to step 587. In step 587, the snapshot index I is incremented by one. After step 587, execution loops back to step 585. In step 585, if the bit for the block ($B_i$) is set in the bit map for the snapshot (I), then execution branches to step 589. In step 589, the snapshot (M) is read to get the new data for the block ($B_i$). Execution continues to step 590 of FIG. 35. In step 590, the block index ($B_i$) and the new data for the block ($B_i$) from the snapshot (M) are returned for copying into the secondary file system. Then in step 591, if the block index ($B_i$) is at the end of the production volume, then execution is finished. If not, execution loops back to step 588 of FIG. 34. In step 588, the block index ($B_i$) is incremented by one, and execution loops back to step 584, to continue scanning for the next value of the block index.

Figure 35:
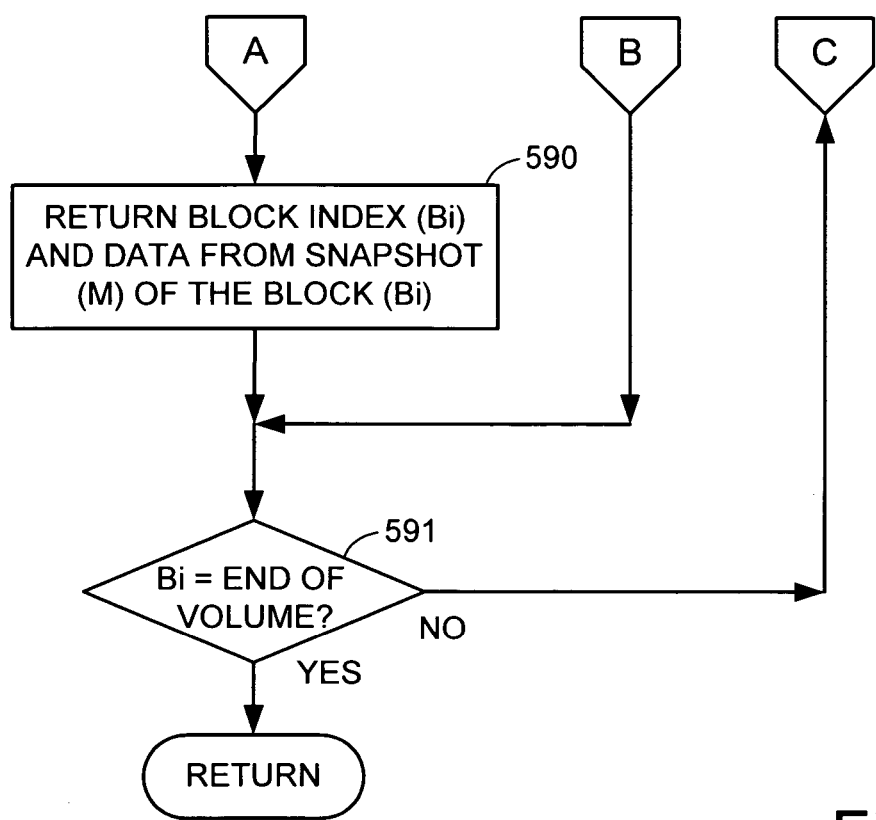

In step 586 of FIG. 34, if I is equal to M−1, then execution continues to step 591 of FIG. 35.

It should be understood that the flowchart of FIGS. 34-35 represents a program executed by at least one processor in a data storage system such as a network file server. The processor, for example, is a data mover computer (e.g., 232 in FIG. 1). The program, for example, is initially contained in a program storage device such as a floppy disk (e.g., 238 in FIG. 1) and down-loaded into storage of the data mover computer.

The program in the flowchart of FIGS. 34-35 has an inner loop including steps 585, 586, 587 that indexes the snapshots L to snapshot M−1. This sequence includes the snapshot L and the snapshots that are both younger than the snapshot L and older than the snapshot M. The program in the flowchart of FIGS. 34-35 has an outer loop including steps 584, 585, 586, 591, and 588 that indexes the blocks. When a bit in the indexed bit map is found to be set in step 585, the inner loop is exited to return the block index ($B_i$) and the data in the snapshot M for block ($B_i$).

The snapshot copy differential has been described above for facilitating recovery of a file system after a disaster. The snapshot copy differential can also be used for wide-area distribution of updates on an as-needed basis. This reduces network traffic for the case where a client has an old local version of a file system and needs a new version of the file system. A new local version of the file system can be constructed by copying the appropriate changes into the old local version of the file system.

Figure 36:
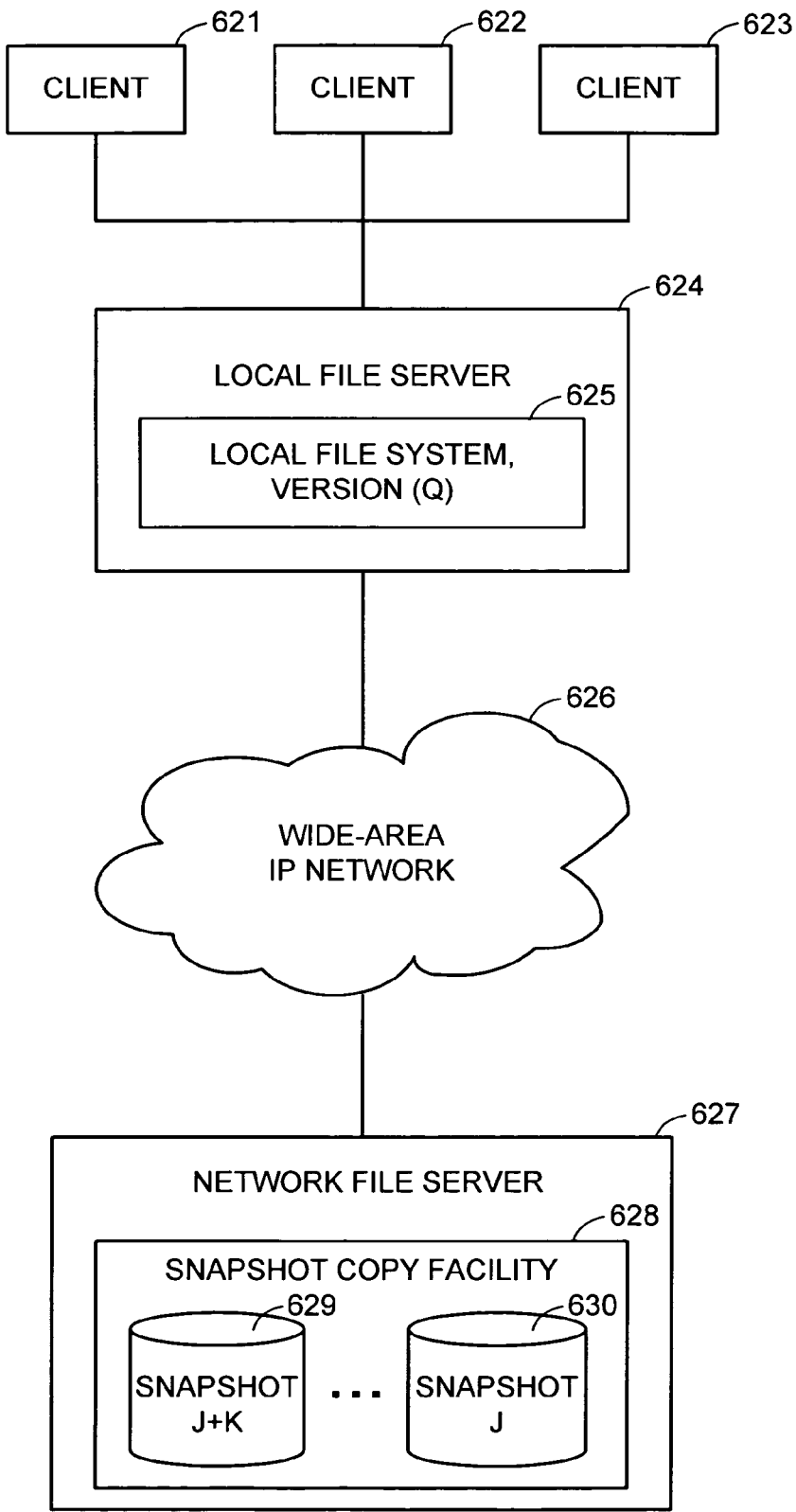
FIG. 36 shows a block diagram of a data network in which snapshot deltas are transmitted over a wide-area network from a network file server to a local file server in order to update the local file system as needed.

FIG. 36, for example, shows a block diagram of a data network in which snapshot deltas are transmitted over a wide-area network 626 from a network file server 627 to a local file server 624 in order to update a local file system 625 as needed. The local file server 624 services local clients 621, 622, and 623. When a client needs a more recent version of the file system, and the local file system 625 is not the most recent version, then the local file server may request a specified version from the network file server 627, or the client may request the most recent version available.

The network file server 627 has a snapshot copy facility 628 storing multiple snapshots 629, 630. If the local file system 625 in the local file server 624 is one of the multiple snapshots, then the network file server 627 may respond to a request from the local file server 624 by obtaining from the snapshot copy facility 628 a snapshot copy differential that would contain all of the updates necessary to convert the local file system 624 to a more recent snapshot of the file system. In the usual case, the local file server 624 would request all of the updates necessary to convert the local file system 625 to the most recent snapshot copy. However, it is also possible for the local file server 624 to request the updates for a specified version that would not necessarily be the most recent snapshot copy.

Figure 37:
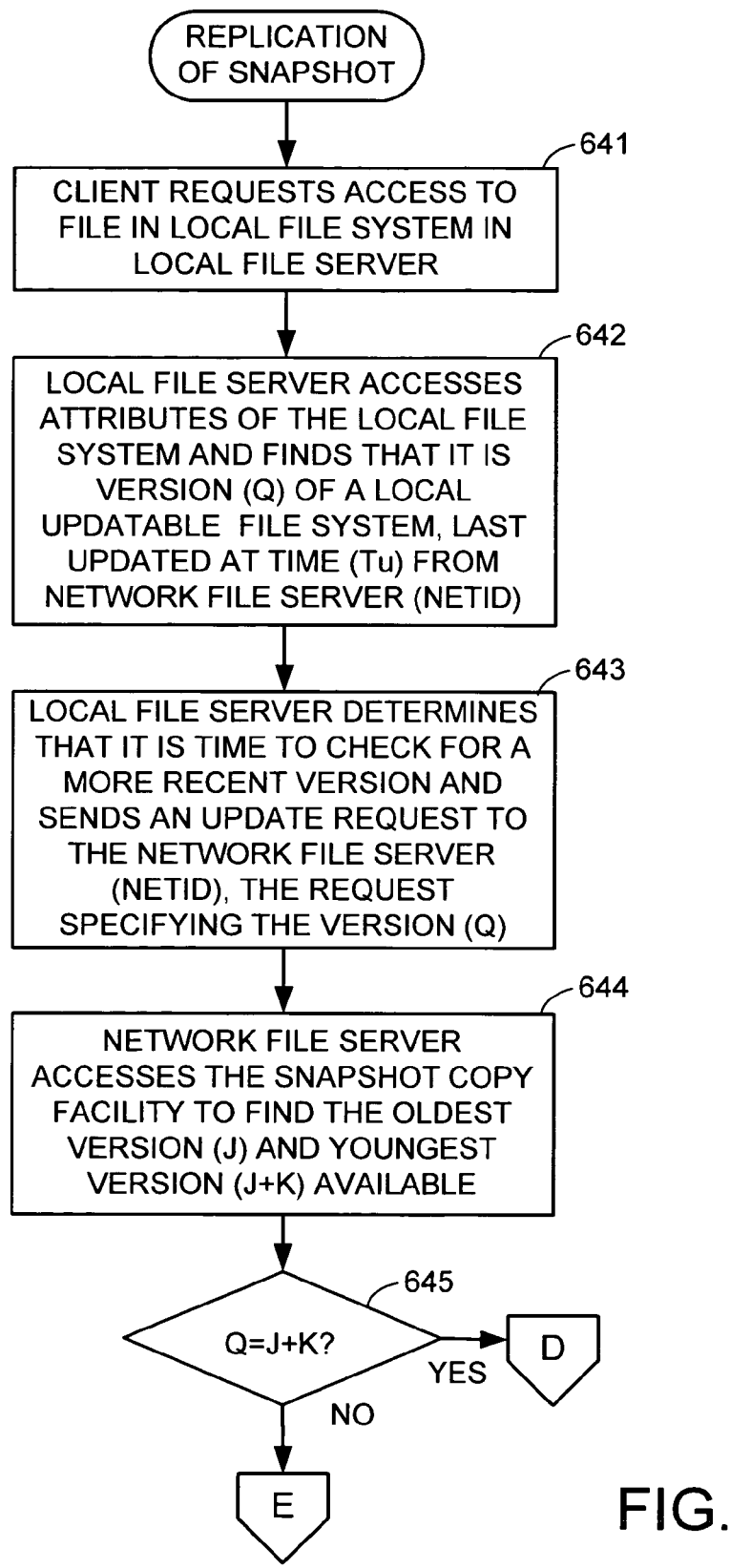
FIGS. 37 and 38 comprise a flowchart of a procedure for replicating snapshots in the data network of FIG. 36.
Figure 38:
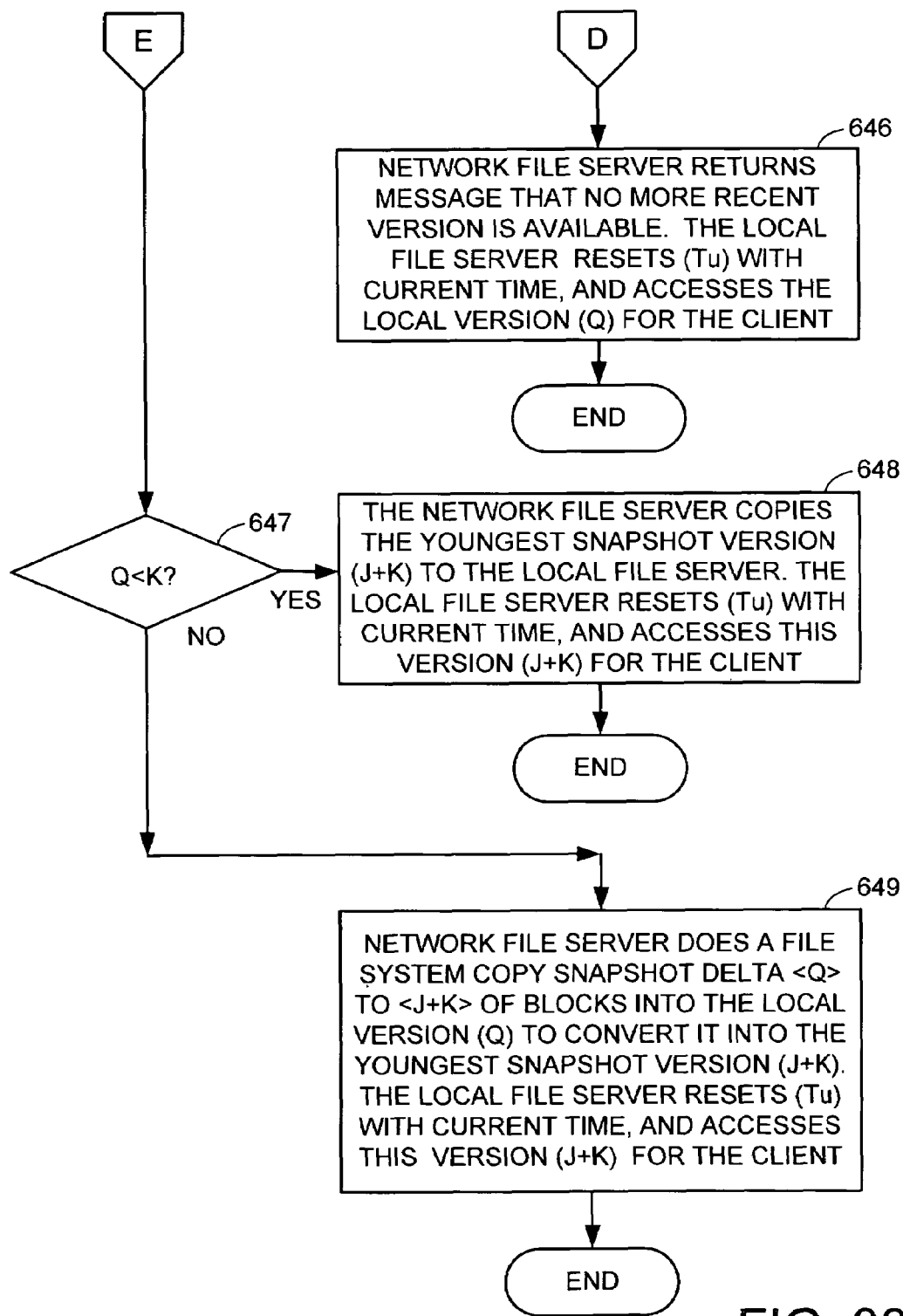

FIGS. 37 and 38 show a flowchart of a procedure for the replication of the most recent snapshot in the system of FIG. 36 using the snapshot copy differential. In a first step 641, the client requests access to the file in the local file system in the local file server. In step 642, the local file server accesses attributes of the local file system and finds that it is version (Q) of a local updatable file system, last updated at time (Tu) from a network file server having a network identifier (NETID). The local file server uses the time of last update (Tu) to determine that it is time to check for a more recent version, and sends an update request to the network file server (NETID). For example, the file system has an attribute specifying a minimum update interval (Tmin), and it is not time to request an update unless the minimum update interval has elapsed since the time of the last update. The request specifies the version (Q) already in the local file server. In response, the network file server accesses the snapshot copy facility to find the oldest version (J) and the youngest version (J+K) stored in the network file server. In step 645, Q is compared to J+K. If Q=J+K, then execution branches to step 646 of FIG. 38. In step 646, the network file server returns a message that no more recent version is available. The local file server resets the time of last update (Tu) to the current time, and accesses the local version (Q) for the client. Upon completion of step 646, the snapshot replication process is finished.

If in step 645 Q is not equal to J+K, then execution continues to step 647 of FIG. 38. In step 647, Q is compared to K. If Q is less than K, then execution branches to step 648. In this case, the version (Q) is not a snapshot in the snapshot copy facility because the version (Q) is too old. In step 648, the network file server copies the youngest snapshot version (J+K) to the local file server. The local file server replaces the local version (Q) with the new version (J+K), resets the time of last update (Tu) to the current time, and accesses the new local version (J+K) for the client. Upon completion of step 648, the snapshot replication process is finished.

In step 647, if Q is not less than K, then execution continues to step 649. In step 649, the network file server does a file system copy snapshot delta <Q> to <J+K> of blocks into the local version (Q) to convert it into the youngest snapshot version (J+K). The local file server resets the time of last update (Tu) to the current time, and accesses this local snapshot version (J+K) for the client. Upon completion of step 649, the snapshot replication process is finished.

In a preferred snapshot copy facility, as described below with reference to FIGS. 41 to 46, there is kept a meta bit map for each snapshot copy for indicating blocks of the production file system that are not used in the snapshot copy. Further details of such a snapshot copy facility are described in Philippe Armangau, et al., "Data Storage System Having Meta Bit Maps for Indicating Whether Data Blocks are Invalid in Snapshot Copies," U.S. patent application Ser. No. 10/213,241 filed Aug. 6, 2002, incorporated herein by reference. The snapshot copy facility maintains the meta bit maps in order to store the "before image" of a block in the save volume at the tail of the snapshot queue only when the block is being written to and the "before image" is needed for responding to any request for reading a snapshot copy. This reduces the number of blocks that are stored in the save volumes. However, in this case, the bit map for each snapshot (L) indicates whether or not a block has been stored in the save volume for the snapshot (L), and no longer will indicate all of the blocks that have been changed after snapshot (L) and before snapshot (L+1). In particular, if a block was not in use for snapshot (L), and was written to after snapshot (L) and before snapshot (L+1), then the "before image" of the block will not be written into the save volume for snapshot (L).

When it is known that a block is not used in the snapshot copy (M), then there is no need for the snapshot copy facility to return the block when responding to a request for the snapshot delta of snapshot <L> to snapshot <M>. Therefore, for the preferred snapshot copy facility, it is desirable to modify the procedure of FIG. 34 in order use the information in the meta bit map for the snapshot <M>. In this case, the procedure of FIG. 34 should also be modified to account for the fact that the save volumes no longer store the "before images" for all of the blocks that may have changed between the successive snapshot copies.

Figure 39:
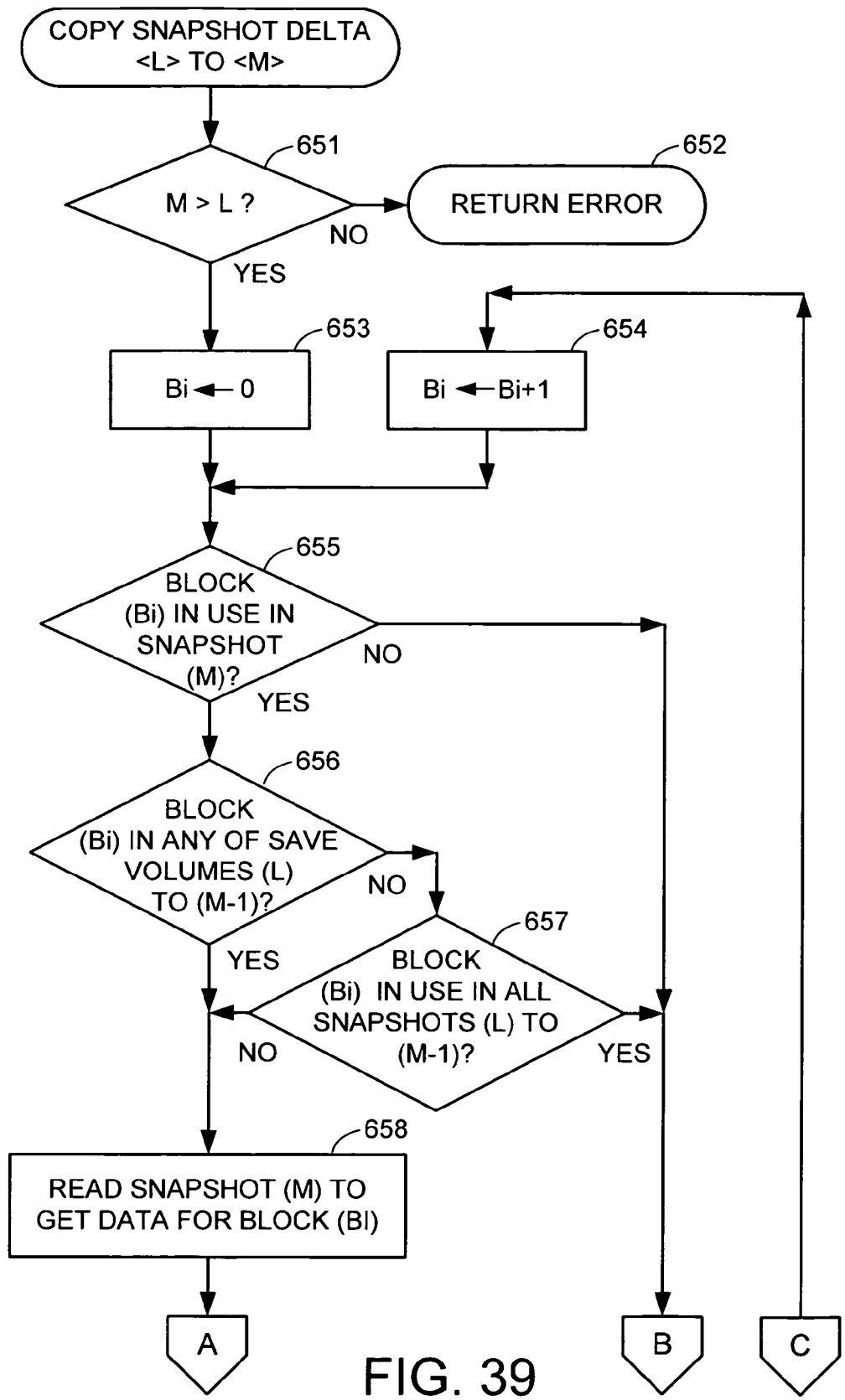
FIG. 39 is a modified version of the flowchart of FIG. 34, showing how to copy a snapshot delta from a snapshot copy facility that keeps track of blocks of a production file system that are not in use in the snapshot copies of the production file system.

FIG. 39 shows how the flowchart of FIG. 34 can be modified for use with the preferred snapshot copy facility of FIGS. 41 to 46. Steps 651, 652, and 653 of FIG. 39 are similar to steps 581, 582, and 583 of FIG. 34. Step 654 of FIG. 39 is similar to step 588 of FIG. 34, and step 658 of FIG. 39 is similar to step 589 of FIG. 34.

In FIG. 39, after step 653 or step 654, execution continues to step 655. In step 655, if the block ($B_i$) is not in use in the snapshot (M), then execution branches to step 591 of FIG. 35. Therefore, a block not in use in the snapshot (M) is not returned in response to the command to copy the snapshot delta <L> to <M>. If the block ($B_i$) is in use in the snapshot (M), then execution continues from step 655 to step 656. In step 656, if the block ($B_i$) is in any of the save volumes (L) to (M−1), then execution continues to step 658 to read the block ($B_i$) from the snapshot (M) in order to return this version of the block ($B_i$) in response to the command to copy the snapshot delta <L> to <M>. In step 656, if the block ($B_i$) is in any of the save volumes (L) to (M−1), then execution branches to step 657. In step 657, if the block ($B_i$) is in use in all of the snapshots (L) to (M−1), then execution branches to step 591 of FIG. 35. In this case, the block ($B_i$) did not change from snapshot (L) to snapshot (M), because if it did, a "before image" would have been stored in one of the save volumes (L) to (M−1). In step 657 of FIG. 39, if it is not true that the block ($B_i$) is in use in all of the snapshots (i.e., it is true that the block ($B_i$) is not in use in at least one of the snapshots (L) to (M−1)), then execution continues from step 657 to step 658 to read the block ($B_i$) from the snapshot (M) in order to return this version of the block ($B_i$) in response to the command to copy the snapshot delta <L> to <M>. In this case, it is possible that the block changed from snapshot (L) to snapshot (M) despite the fact that the block ($B_i$) in not in any of the save volumes (L) to (M−1).

Figure 40:
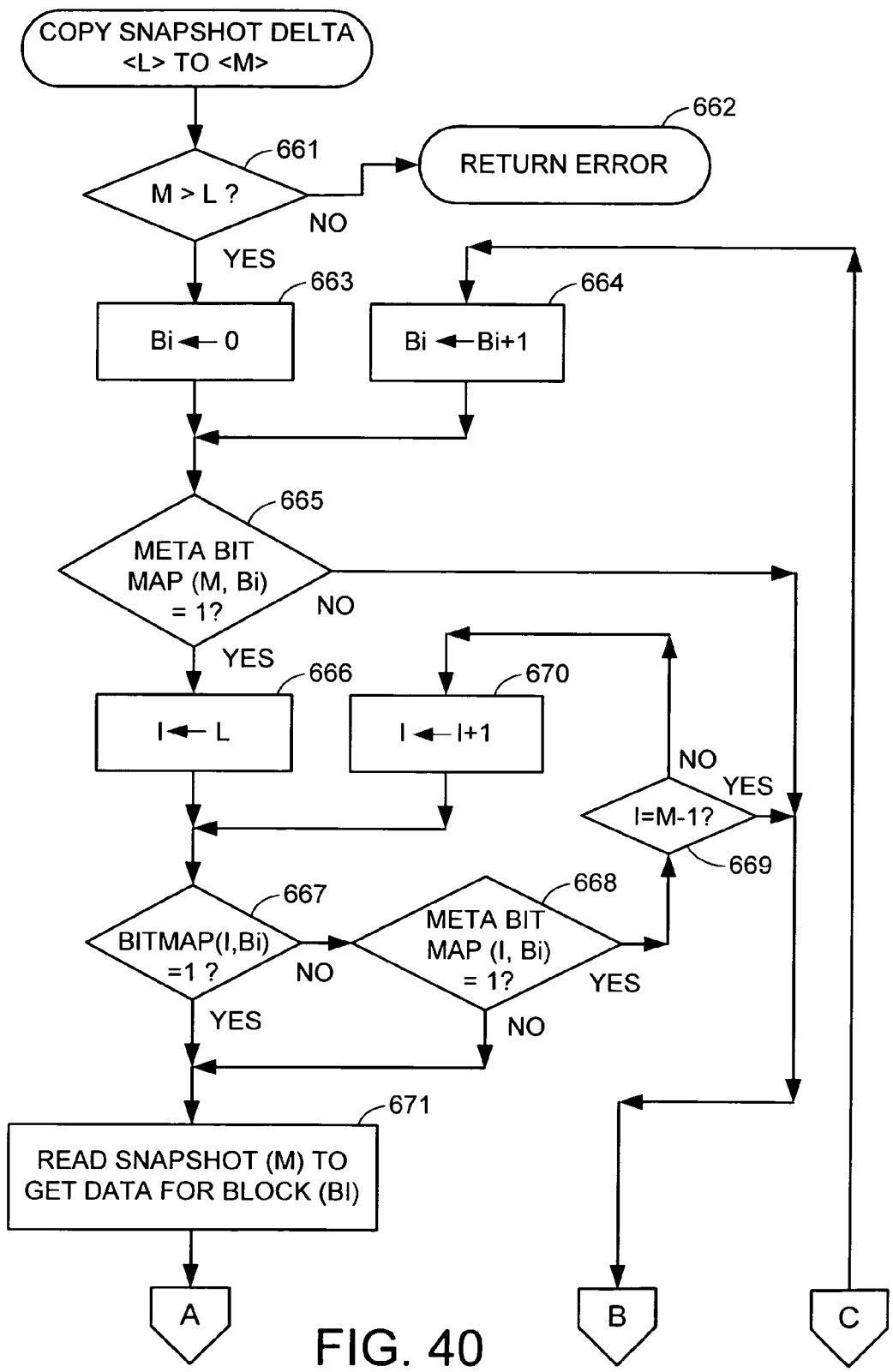
FIG. 40 shows a specific instance of the flowchart of FIG. 39 for a snapshot copy facility that uses respective meta bit maps for indicating the blocks in a production file system that are not used in the snapshot copies of the production file system.

FIG. 40 shows a preferred implementation of the procedure of FIG. 39. Steps 661 to 665 of FIG. 40 are similar to steps 651 to step 655 of FIG. 39. In step 665, the meta bit map for snapshot (M) has a value for the block ($B_i$) indicating whether or not the block ($B_i$) is in use for the snapshot (M). In particular, a value of 1 indicates that the block ($B_i$) is in use for the snapshot (M). Steps 666, 669, and 670 of FIG. 40 are similar to step 584, 586 and 587 of FIG. 34. From step 666 or step 670, execution continues to step 667.

In step 667, if the bit map for snapshot (I) has a value of 1 for the block ($B_i$), then execution continues to step 671 to read the snapshot (M) to get data for the block ($B_i$), in order to return the data in response to the command to copy the snapshot delta <L> to <M>. In this case, the save volume for block (I) includes a "before image" for the block ($B_i$). Otherwise, if the bit map for snapshot (I) does not have a value of 1 for the block ($B_i$), execution branches from step 667 to step 668. In step 668, if the meta bit map for the snapshot (I) does not have a value of 1 for the block ($B_i$), execution continues to step 671 to read the snapshot (M) to get data for the block ($B_i$), in order to return the data in response to the command to copy the snapshot delta <L> to <M>. In this case, the block ($B_i$) is not in use in the snapshot (I). Otherwise, if the meta bit map for the snapshot (I) has a value of 1 for the block ($B_i$), execution continues to step 669.

Maintenance of Meta Bit Maps in the Snapshot Copy Facility

In the above description of the snapshot copy process, and in particular with respect to FIG. 25, it was assumed that the original contents of a block of the production file system must be saved to the most recent save volume before the contents of the block are modified by a write access to the production file system. In practice, however, the original contents are often invalid, and therefore need not be saved. For example, many applications start with an empty file, and the file increases in size as data is written to the file. In some of these applications, the file rarely decreases in size. However, storage for the file may be released when the file is deleted from the file server, for example, when the file is transferred to archival storage. In some applications, the extent of a file may be dynamically decreased concurrent with read/write access to the file.

There are significant advantages to identifying when read/write access to the production file system is about to modify the contents of an invalid data block. If this can be done in an efficient manner, then there can be a decrease in the access time for write access to the production file system. A write operation to an invalid block can be executed immediately, without the delay of saving the original contents of the data block to the most recent save volume at the tail of the snapshot queue. Moreover, there is a saving of storage because less storage is used for the save volumes. There is also a decrease in memory requirements and an increase in performance for the operations upon the snapshot file systems, because smaller bit and block hash indices can be used, and the reduced amount of storage for the snapshots can be more rapidly restored to the production file system, or deallocated for re-use when snapshots are deleted.

An efficient way of identifying when read/write access to the production file system is about to modify the contents of an invalid data block is to use a meta bit map having a bit for indicating whether or not each allocated block of storage in the production file system is valid or not. For example, whenever storage is allocated to the production file system by the initial allocation or the extension of a clone volume, a corresponding meta bit map is allocated or extended, and the bits in the meta bit map corresponding to the newly allocated storage are initially reset.

Figure 41:
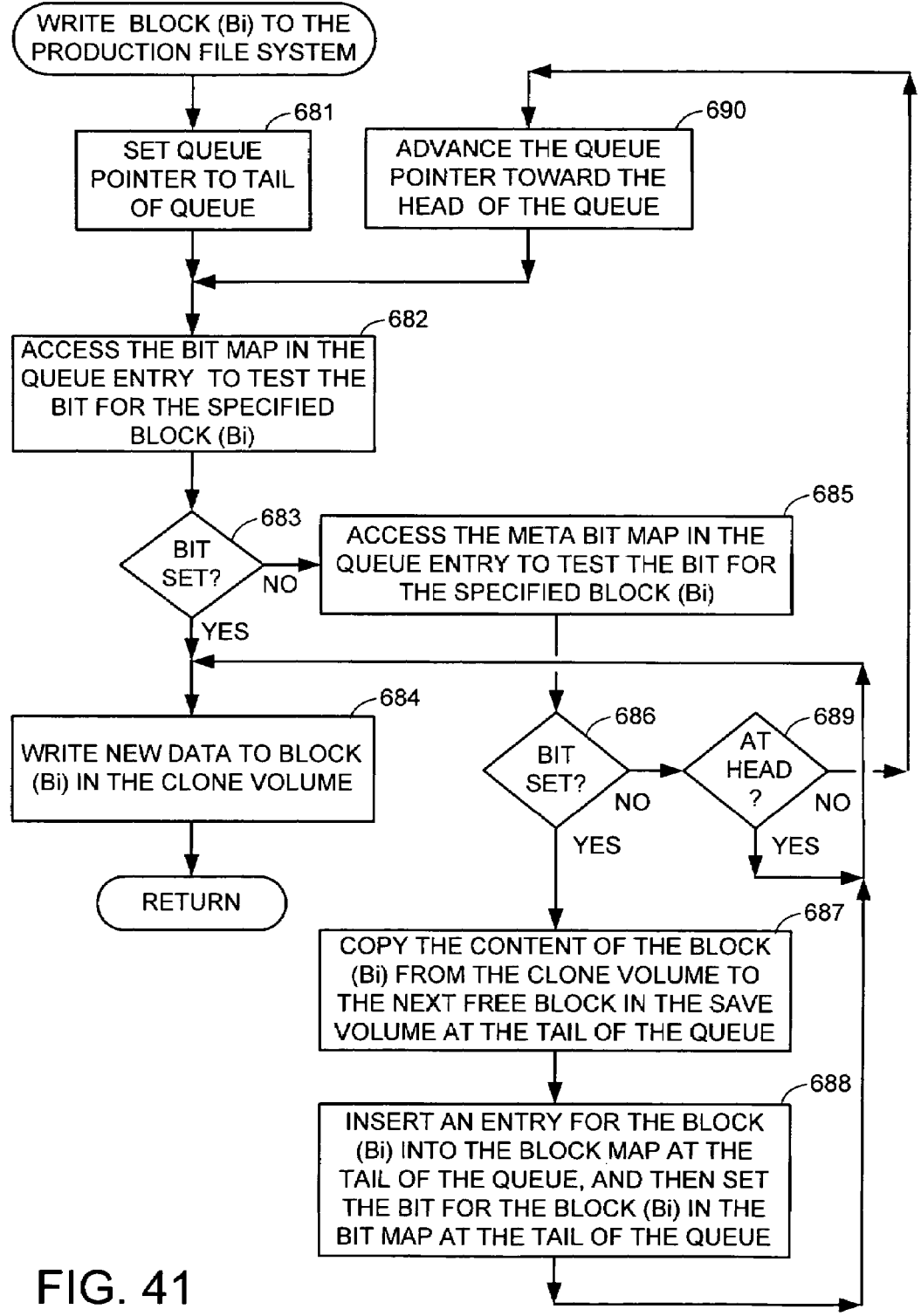
FIG. 41 is a flowchart for writing a specified data block to the production file system for a snapshot copy facility that uses a meta bit map for indicating the blocks in a production file system that are not presently in use.

FIG. 41 shows a procedure for writing a specified block (Bi) to the production file system when there is a meta bit map for indicating invalid data blocks in the production file system. In a first step 681, a queue pointer is set to point to the queue entry at the tail of the snapshot queue. Next, in step 682, the bit map in this snapshot queue entry is accessed to test the bit for the specified block (Bi). Next, in step 683, if the tested bit is found to be set, then execution continues to step 684. In step 684, new data is written to the specified block (Bi) in the clone volume, and then execution returns.

In step 683, if the bit in the bit map is not set, then execution branches to step 685. In step 685, the meta bit map in the snapshot queue entry is accessed to test the bit for the specified block (Bi). Then, in step 686, execution continues to step 687 if this bit is found to be set. In step 687, the content of the block (Bi) is copied from the clone volume to the next free block in the save volume at the tail of the snapshot queue. In step 688, an entry for the block (Bi) is inserted into the block map at the tail of the snapshot queue, and then the bit for the block (Bi) is set in the bit map at the tail of the snapshot queue. Execution continues from step 688 to step 684, to write new data to the block (Bi) in the clone volume.

In step 686, if the tested bit is found not to be set, then execution branches to step 689. If the queue pointer is pointing to the head of the queue, then execution branches to step 684, to write new data to the block (Bi) in the clone volume. Otherwise, if the queue pointer is not pointing to the head of the snapshot queue, then execution continues to step 690 to advance the queue pointer to the next snapshot queue entry toward the head of the snapshot queue. After step 690, execution loops back to step 682.

Figure 42:
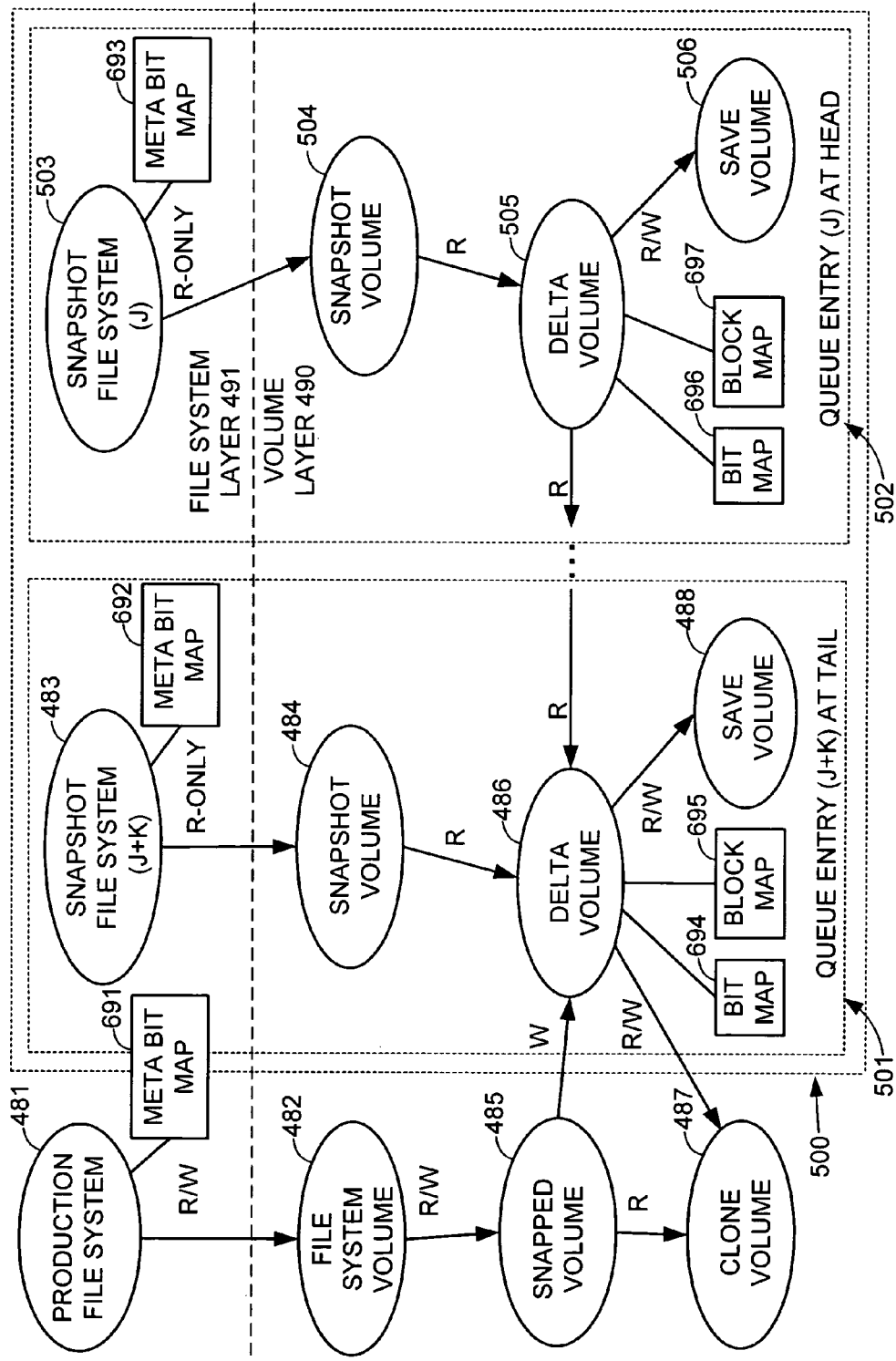
FIG. 42 is a diagram of a preferred organization of multiple snapshots in the snapshot copy facility.

FIG. 42 shows an organization of the snapshots in the network file server when a respective meta bit map 692, 693 is maintained for each snapshot in addition to the meta bit map 691 for the production volume. It is desired to maintain a respective meta bit map for each snapshot so that whenever the production file system is restored with a snapshot file system, the meta bit map for the production file system can be restored with the meta bit map for each snapshot. For example, a meta bit map of the production file system is included in the production file system, so that whenever a snapshot copy of the production file system is created, a snapshot copy of the meta bit map is also created. Consequently, when the production file system is restored with a snapshot, the meta bit map of the production volume is replaced with the meta bit map of the snapshot.

As shown in FIG. 42, a meta bit map 691 is linked to the production file system 481 for indicating invalid blocks in the production file system. Each entry in the snapshot queue 500 includes a respective meta bit map linked to the snapshot file system in the entry. For example, the queue entry (J+K) at the tail 501 of the queue has a meta bit map 692 linked to the snapshot file system 483, and the queue entry (J) at the head 502 of the queue includes a meta bit map 693 linked to the delta volume 505.

To reduce the memory and storage requirements for maintaining the bit maps 694, 696 and block maps 695, 697, the each bit map is organized as a set of pages indexed by a page table, and the each block map is organized as a set of hash lists indexed by a hash table. The bit maps and block maps 694, 695 at the queue entry (J+K) at the tail of the queue are initially created in a random access memory cache and written back to storage of the save volume 488 when a next snapshot of the production file system 481 is created. Thereafter the bit maps and block maps can be deallocated from the random access memory in order to free up cache memory, and later staged from storage to the cache memory when needed for read access to their respective snapshots.

Figure 43:
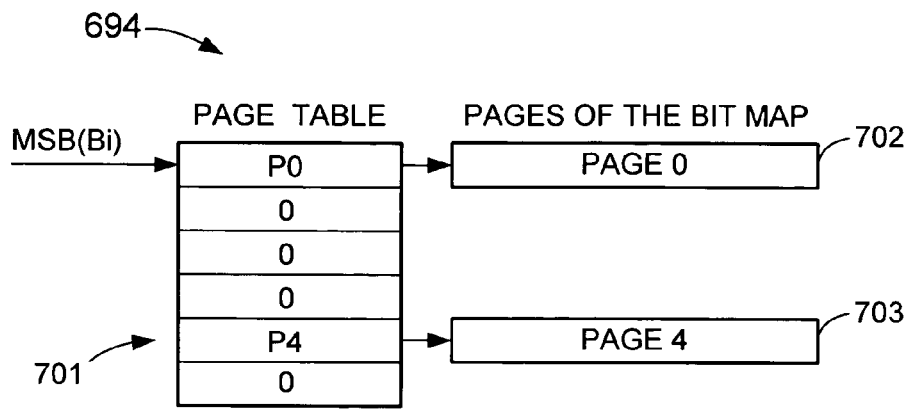
FIG. 43 shows a bit map including a page table and a set of pages, for use in the snapshot organization of FIG. 42.

FIG. 43 shows that the bit map 694 is organized as a page table 701 indexed by a set of most significant bits (MSB) of the block index (Bi), and pages 702 and 703 of the bit map linked to respective entries of the page table. The page table 701 includes a set of entries, each of which is either zero, indicating that the entire page is zero and therefore the page is not stored in storage or random access memory, or is a pointer to a page of the bit map.

Figure 44:
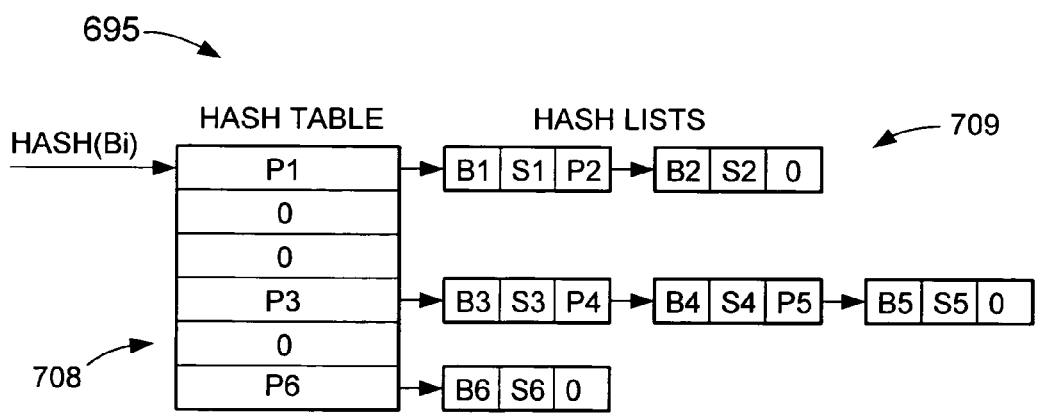
FIG. 44 shows a block map including a hash table and hash lists, for use in the snapshot organization of FIG. 42.

FIG. 44 shows that the block map 695 is organized as a hash table 708 indexed by a hashing of the block index (Bi), and a set of hash lists 709 linked to respective entries of the hash table 708. Each non-zero entry in the hash table 708 points to a respective one of the hash lists 709. Each entry in each hash list includes a block address ($B_i$) to a block in the clone volume, a corresponding block address ($S_i$) of the block in the save volume, and a value that is either zero indicating the end of the has list, or a pointer to the next entry in the list.

It is not necessary to retain the bit map 694 for the snapshot because the block map 695 can be accessed to provide the same information that is contained in the bit map 694. In particular, the block map 695 can be accessed simply to determine whether or not a specified block (Bi) is found in the block map, and therefore can be found in the save volume for the corresponding snapshot. However, the bit map 694 can be accessed more quickly to provide this information. Therefore, for applications such as backup where the snapshots would be accessed very infrequently, it may be desirable to conserve storage by discarding the bit map for the snapshot at the tail of the queue once the next snapshot is created. Otherwise, for an application such as described above with respect to FIGS. 36-38 where the snapshots would be accessed frequently, the bit map for the snapshot at the tail of the snapshot queue may be written to storage and maintained in a random access cache memory as needed.

Figure 45:
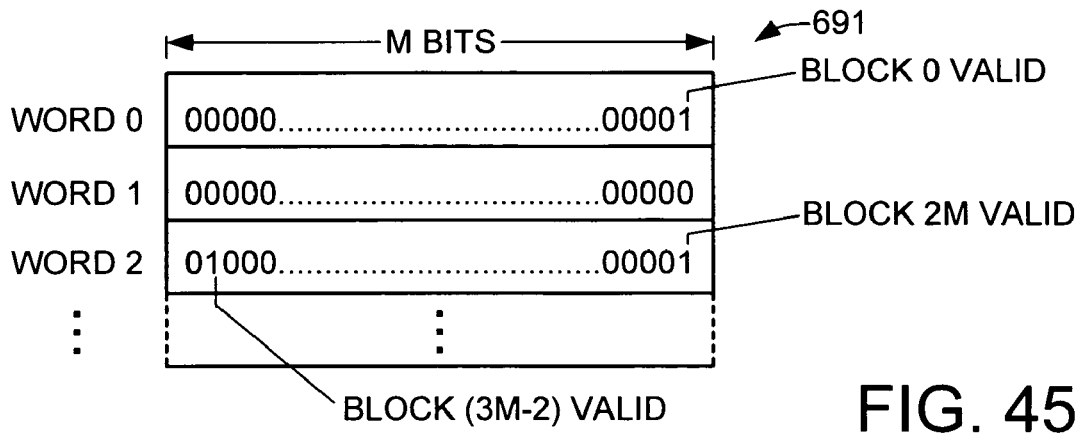
FIG. 45 shows a specific construction for and interpretation of a meta bit map for the production volume.

FIG. 45 shows that the meta bit map 691 has a respective bit corresponding to each block in the clone volume, and in this example, each bit in the meta bit map corresponds to one and only one block in the clone volume. The meta bit map 691 includes a series of words, each with a multiple of M bits. In this example, a bit having a value of zero indicates a corresponding block that is invalid, and a bit having a value of one indicates a corresponding block that is valid.

Figure 46:
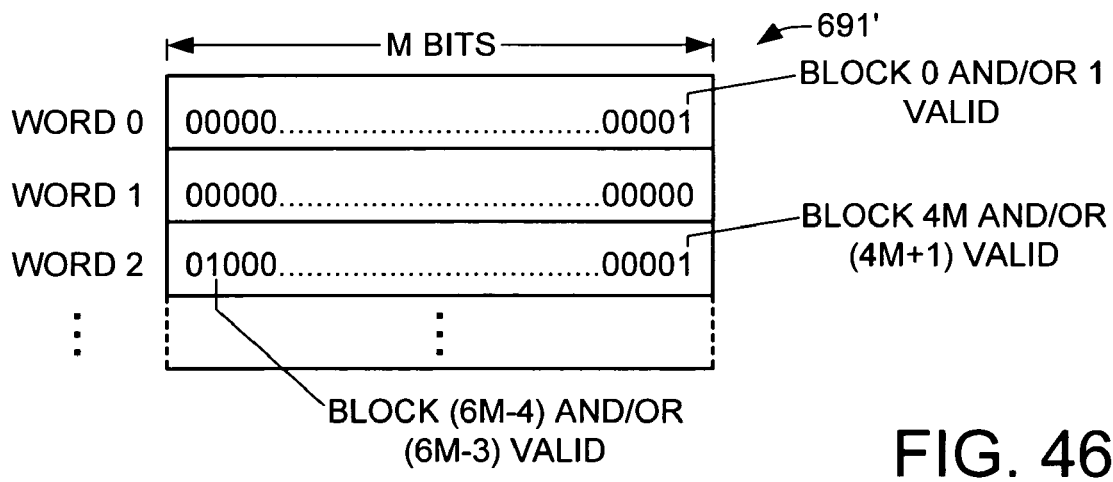
FIG. 46 shows an alternative interpretation of a meta bit map for the production volume.

The meta bit map, however, may have a granularity greater than one block per bit. For example, each bit in the meta bit map could indicate a range of block addresses, which may include at least some valid data. The benefit to the increased granularity is a reduced size of the meta bit map at the expense of sometimes saving invalid data to the save volume. For example, FIG. 46 shows the interpretation of a meta bit map 691' having a granularity of two blocks per bit. Each bit is set if any one of the two corresponding blocks is valid, or conversely, each bit is clear only if neither of the two corresponding blocks is valid. In this case, the block address can be converted to a bit address by an integer division by two, for example, by an arithmetic right shift of the block address by one bit position.

Read-only Remounting of the Production File System

If a replication session experiences connectivity or bandwidth difficulties during transfer of the delta sets from the primary site to the secondary site, it is possible for the save volume to run out of space. There are three options for handling this possibility. The first option is to terminate the replication session, so that a new file system copy would need to be performed to reestablish a replication session. The second option is to freeze the production file system until save volume space becomes available. This freeze would interrupt all user access to the production file system. The third option is to remount the production file system as read-only until the save volume has emptied enough to handle incoming changes to the production file system.

Virtual Servers and Virtual Data Movers

There have been described above various facilities for replicating file systems using the Internet Protocol. These facilities permit file systems to be replicated from an active site to a disaster recovery site in an IP data network. In the event of a disaster at the active site, the remote copy of the file system can be accessed at the disaster recovery site.

It is desired to provide disaster recovery of not only file systems but also the file servers that provide user access to the file systems. Aside from various attributes in a file system, a file server stores a good deal of additional information needed for enabling users to access the file system in accordance with a network file access protocol. For example, this additional information includes security credentials for authenticating the identity of users having permission to access the files in the file system, and mounting information for finding files on removable storage media or remote drives. By replicating this additional information from an active site to a disaster recovery site, it is possible to resume user access at the disaster recovery site in accordance with a network file access protocol after user access has been interrupted by a disaster at the active site.

For replication of file servers, it is desirable to separate the software of the file server into a set of files that define the functionality and user environment of the file server independent of the hardware of the file server, and a set of programs that are dependent on the hardware of the file server. The files that define the functionality and user environment of the file server independent of the hardware of the file server comprise a virtual file server. This virtual file server can be replicated over an IP network from an active site to a disaster recovery site by replication of all of the files of the virtual file server, and there is no need for the disaster recovery site to use the same server hardware as the active site.

In many cases, a single data mover computer of a network file server will contain a plurality of virtual file servers, and some configuration information will be the same for these virtual file servers. In this case, it is desirable for the virtual file servers to share certain files containing configuration information that is the same for the plurality of virtual file servers. The collection of shared files and the other files of the virtual file servers comprise a virtual data mover. The virtual data mover can be replicated from an active site to a disaster recovery site by replicating all of the files of the virtual data mover from the active site to the disaster recovery site.

Figure 47:
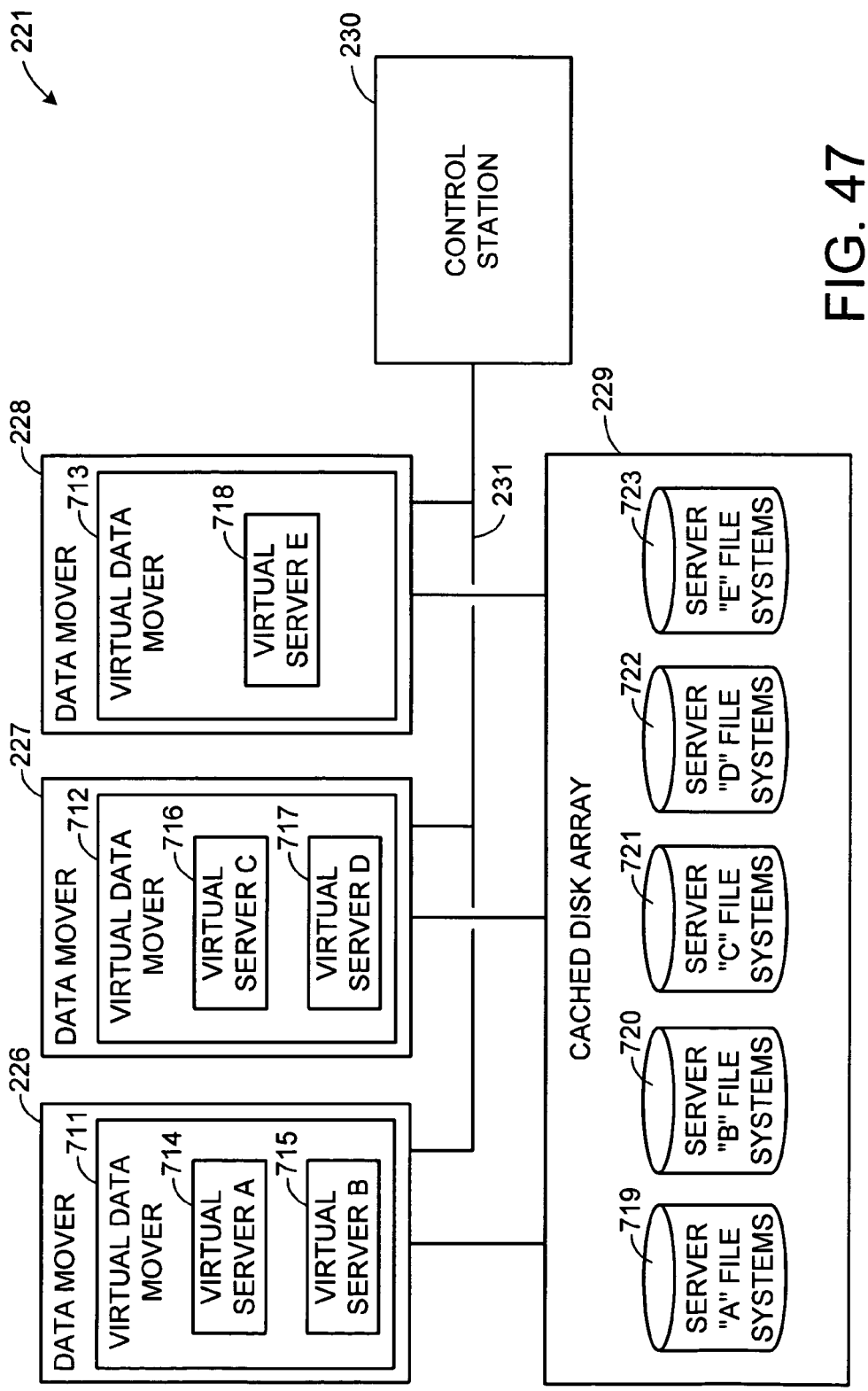
FIG. 47 shows virtual data movers and virtual servers in the network file server introduced in FIG. 1.

FIG. 47 shows virtual data movers and virtual servers in the network file server introduced in FIG. 1. The data mover 226 contains a virtual data mover 711 including a virtual server "A" 714 and a virtual server "B" 715. The data mover 227 contains a virtual data mover 712 including a virtual server "C" 716 and a virtual server "D" 717. The data mover 228 contains a virtual data mover 713 including a virtual server "E". The cached disk array 229 contains the respective file systems 719, 720, 721, 722, and 723 of the virtual servers.

Virtual servers have a number of advantages unrelated to disaster recovery. It is possible to replace a number of small file servers with a larger network file server as shown in FIG. 47 containing a respective virtual server for each of the small file servers. Each small file server can be replaced by a rather simple migration of the server's files into a respective virtual server. The virtual servers become consolidated into the larger network file server, yet each virtual server remains sufficiently isolated to retain its original identity with respect to the network administrator and network users.

In a network file server having multiple data mover computers, the virtual servers can be moved between the data mover computers to perform load balancing. A virtual server can be moved by simply unmounting a file system of all the virtual server's files from one data mover and mounting it on another data mover. It is also very easy to migrate a virtual server to a remote site by taking a snapshot copy of this file system and transmitting the snapshot copy to a remote site.

Figure 48:
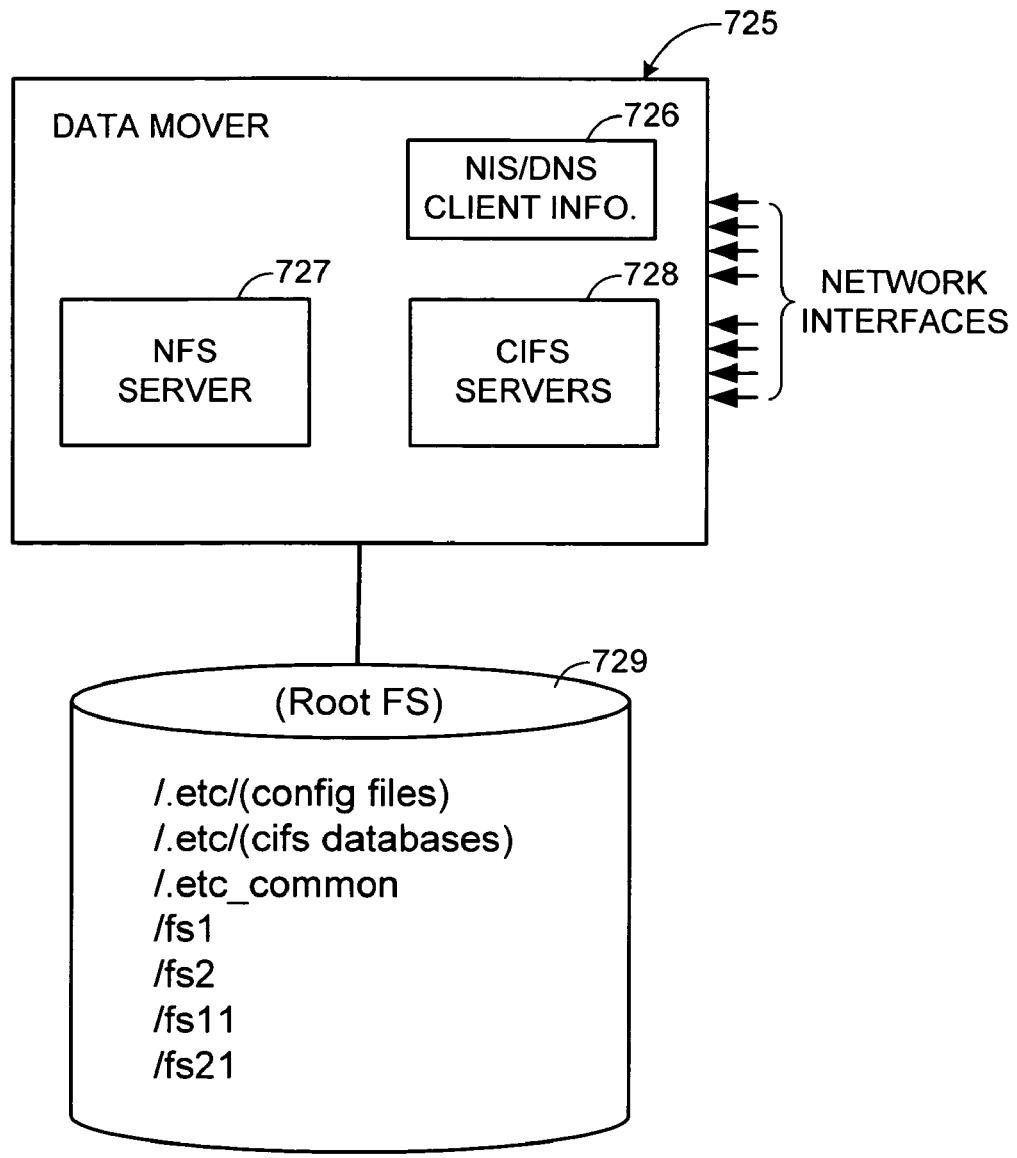
FIG. 48 shows a conventional configuration of a data mover and a file system for the data mover.

FIG. 48 shows various components of a data mover 725 prior to creation of a virtual data mover. The data mover 725 services a group of Network Information Service (NIS) and Domain Name Service (DNS) clients specified in a client database 726. The data mover 725 has an NFS server 727 and a number of CIFS servers 728. The NFS server 727 and the CIFS servers 728 share a plurality of network interfaces. Each of the servers has a global view of the resources in the data mover 725.

The data mover 725 has a root file system (FS) 729 shown in FIG. 48 to use a Unix file naming convention. All of the configuration and control data is stored in the root file system 729 of the data mover. In addition, all the event logs are global to all servers and are also stored in the root file system 72 of the data mover. The /.etc/(config) files include password, user group, virus checker configuration, Windows Group Policy Object (GPO), and Kerberos files. Kerberos is a standard authentication protocol characterized by mutual authentication of the client and server. The /.etc./(cifs databases) include local group database, home directory files, and shares and registry directories. The user file path names begin with "/fs" designating user file systems.

Figure 49:
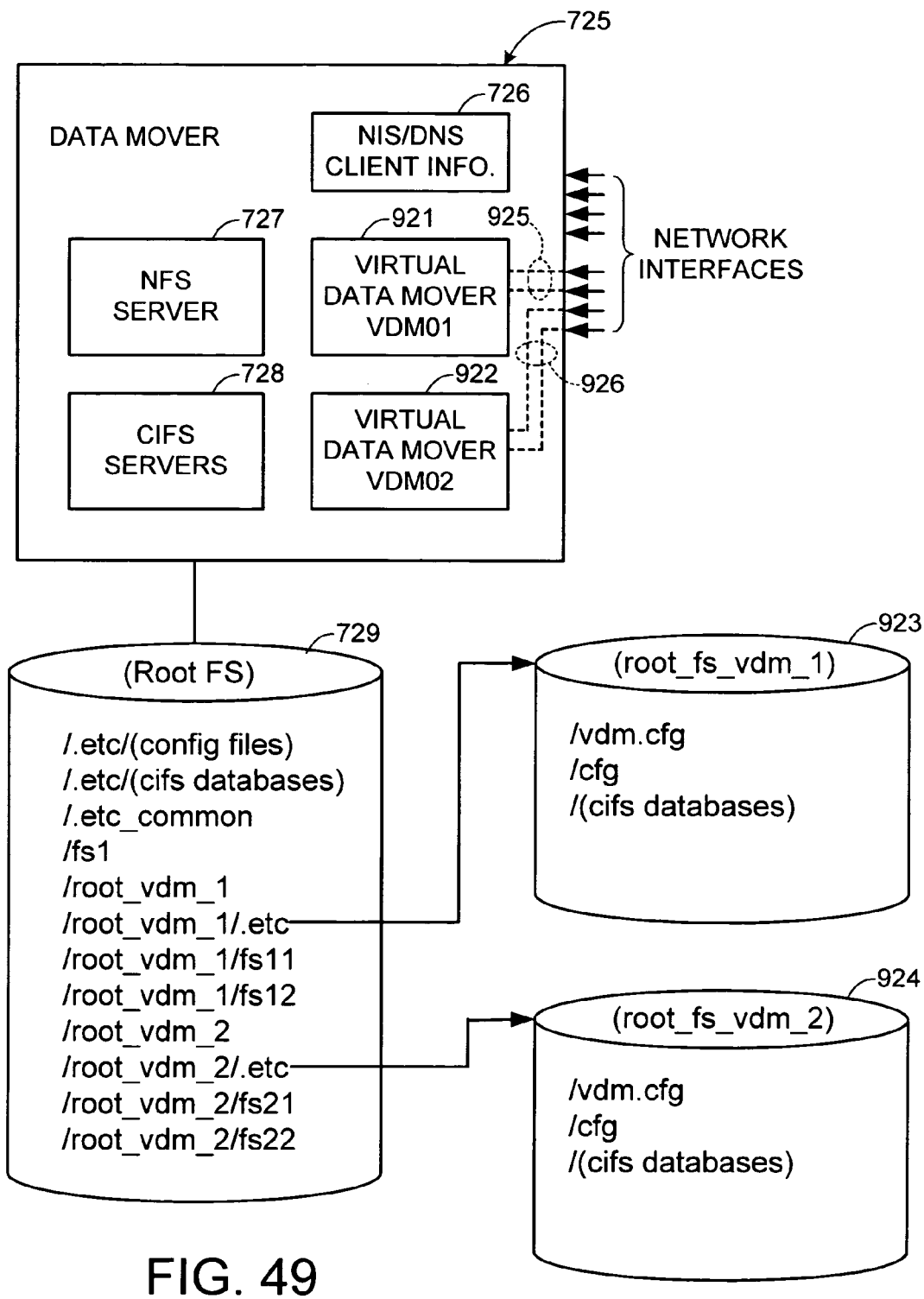
FIG. 49 shows the installation of two virtual data movers in the data mover of FIG. 48.

FIG. 49 shows that two virtual data movers 921, 922 have been installed in the data mover 725 of FIG. 48. Each VDM 921, 922 contains a group of CIFS servers working on a particular file system. Each VDM 921, 922 establishes a logical link between a subset of the network interfaces and a file system of the data mover that stores the CIFS databases for the VDM. For example, the virtual data mover "VDM01" 921 establishes a logical link between the network interfaces 925 and the file system 923 named "root_fs_vdm_1", and the virtual data mover "VDM02" 922 establishes a logical link between the network interfaces 926 and the file system "root_fs_vdm_2". As shown, the root file system for the VDM is mounted onto a "/.etc" file for the VDM in the root file system 729 of the physical data mover 725 containing the VDM. The CIFS server is then able to retrieve the CIFS information from the client connection that is using the data mover's interface. This information includes an audit log, local group and shares database stored in a set of files under the .etc private directory of the file system associated with the VDM.

The virtual data movers 921, 922 provide isolation between their servers as is needed in some environments such as Internet Service Providers (ISPs). The virtual data movers also provide isolation between their respective file systems 923, 924, which is useful for isolating data from disjoint user groups or departments hosted on the same data mover.

A file system in a VDM can be exported via NFS in a fashion similar to CIFS, so that the VDM NFS export will be relative to the VDM root. For example, to export a file system "/fs11" in the VDM01, one may use a command such as "server_export vdm_1/fs11".

Figure 50:
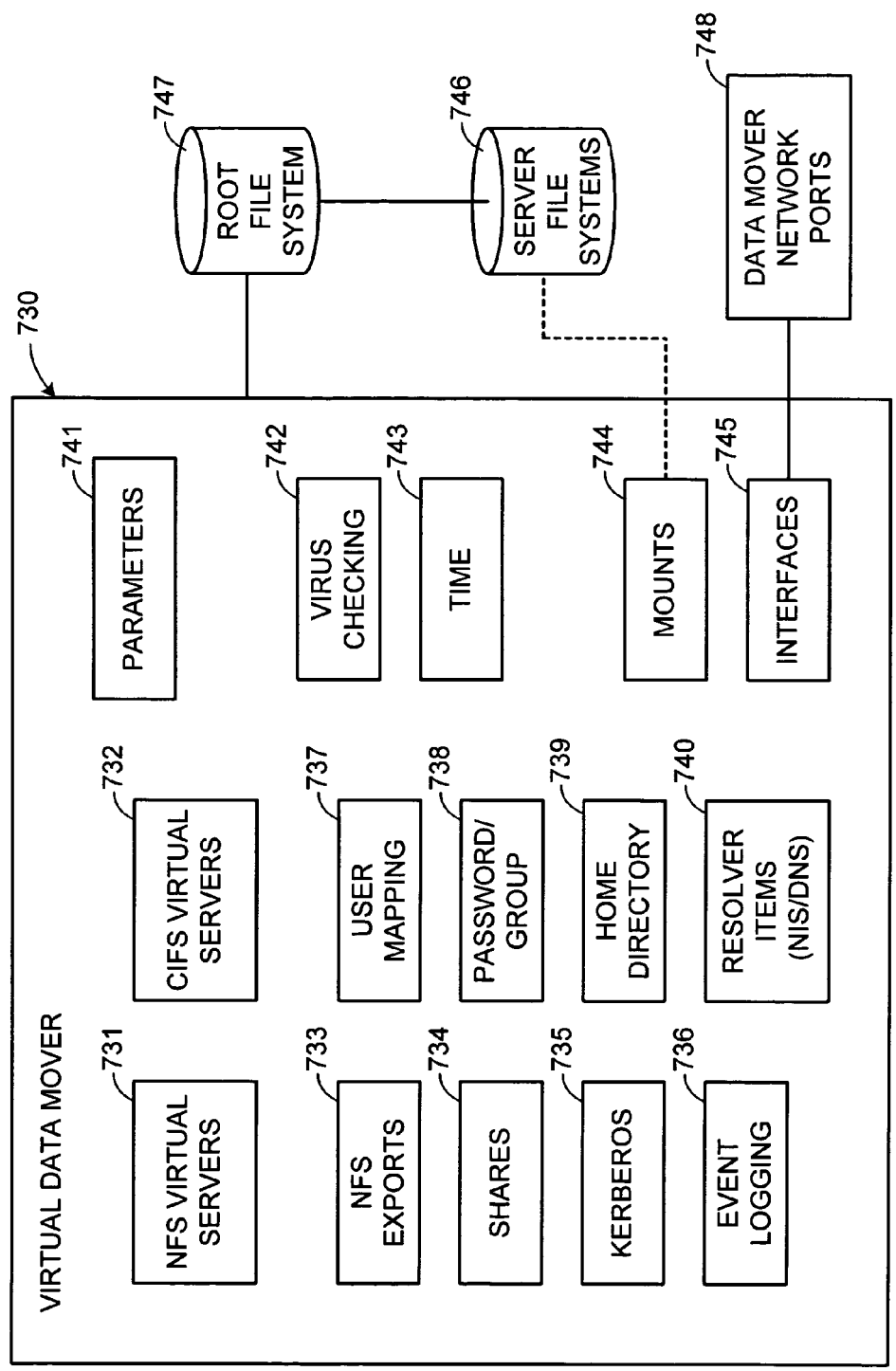
FIG. 50 shows various components of a virtual data mover.

FIG. 50 shows various components of a virtual data mover 730. These components become stored in a root file system 747 for the virtual data mover 730, and server file systems 746 for the virtual servers 731, 732 become mounted to the root file system 747.

There are four types of components of the virtual data mover 730. These types of components are: (1) items that can be contained entirely within the virtual data mover; (2) those items which need to be enumerated and compared to a global set; (3) those items which need to be "reserved or allocated" because they are physical devices; and (4) those items which are specific to a site and its related architecture.

Items of the first type (fully contained within a VDM) include NFS virtual servers 731, CIFS virtual servers 732, NFS exports 733, shares 734, Kerberos files 735, event logging 736, user mapping 737, password and group files 738, home directory 739, and NIS/DNS resolver items 740. Items of the second type (enumerated and compared, and merged where able) include data mover parameters such as parameter for setting the lookup technique for CIFS/NFS mapping (AD Mapping, Resolver, useUnixGID, etc.). Items of the third type (tracked and reserved) include mounts and interfaces. Items of the fourth type (global items affected by the "site") include virus checking parameters and time.

Mounts should be tracked inside of the virtual data mover, and when a virtual data mover is installed, it should be queriable for the mounts that it expects. The virtual data mover should be able to automatically mount the file systems that it needs if they are available for mount on the host data mover. If there are conflicts, or unavailable resources, then the load should either completely error out (in the case of a conflict) or reflect that the mount was only partially successful (in the case of unavailability).

The interfaces expected by a virtual data mover should also be queriable from the virtual data mover. For example, a request for information on a specified virtual data mover should return something like:
Virtual DataMover Name: vCIFS01
Currently mounted on: <unmounted>
Uses Interfaces: cge0v1, cge0v2, cge0v3
CIFS servers: vCIFSa, vCIFSb, vCIFSc
Filesystems: /fs01 (mta_fs_01), /fs02 (mta_fs_02), /fs03 (mta_fs_03)

A virtual data mover should be considered a targetable object for server level commands (e.g., log, mount, uptime, etc.). A virtual data mover should be manageable in a similar fashion as a physical data mover. In addition, a virtual data mover is a top-level object, like a file system, that can be mounted to a physical data mover, migrated, or replicated. The mounting process will be called loading the virtual data mover onto a physical data mover. Once loaded, a virtual data mover appears much like another server. More than one virtual data mover could be loaded onto a single physical data mover. For load balancing, a virtual data mover could be unloaded from one physical data mover and loaded onto another physical data mover within the same network file server. For migration, a virtual data mover could be unloaded from one network file server and loaded on another network file server. For disaster protection, a virtual data mover could be replicated from one network file server to another network file server.

Figure 51:
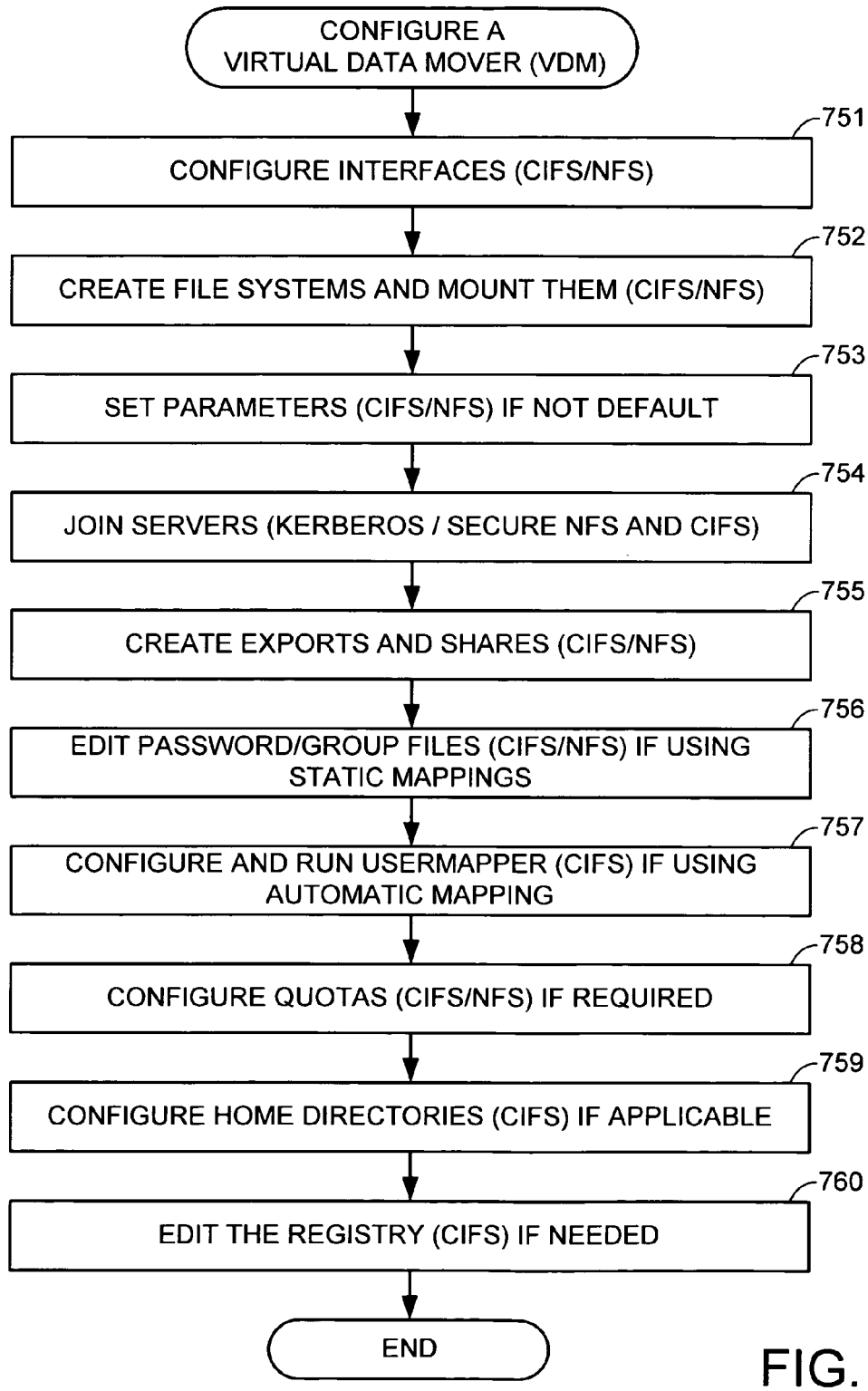
FIG. 51 is a flowchart of a procedure for configuring a virtual data mover.

FIG. 51 shows a procedure for configuring a virtual data mover. Some of these steps apply only to virtual data movers with a CIFS server, and other steps apply to virtual data movers with a CIFS server or a NFS server. In step 751, the system administrator configures the data mover interfaces (CIFS/NFS). In step 752, the system administrator creates file systems and mounts them (CIFS/NFS). In step 753, the system administrator sets data mover parameters (CIFS/NFS), unless default data mover parameters are to be used. In step 754, the system administrator edits Kerberos files to join servers for secure communication (NFS/CIFS). In step 755, the system administrator creates exports and shares (CIFS/NFS). In step 756, the system administrator edits user and user group password files (CIFS/NFS), if static mappings are used. In step 757, the system administrator configures and runs a user mapper (CIFS) in order to set user access privileges, if automatic mapping is to be used. The user mapper is a service that assigns UNIX style user identifiers (UIDs) and user group identifiers (GIDs) to CIFS clients. In step 758, the system administrator configures quotas (CIFS/NFS), if quotas are required. The quotas specify limits on storage capacity available to specified users or user groups. In step 759, the system administrator configures home directories (CIFS) if applicable. In step 760, the system administrator edits the Windows registry (CIFS) if needed.

Once a virtual data mover has been configured, no additional configuration should be required to fully move the entire configuration from one physical data mover to another. All of the required configuration information should be contained within the configuration files depending from the root directory of the virtual data mover.

Virus checking is configured at the site level. If virus checking is to be run at the secondary site, it should be configured there independently. When virus checking is run at the secondary site, it is recommended that a scan should be initiated on a first read after failover. This will ensure scanning of any virus infected files that were on the virus checking queue at the time that the production file was paused to take a delta set for transmission to the secondary site. Alternatively, the virus checking process at the primary could be coordinated with delta set creation so that only virus-free delta sets are created. For example, the normal pause during delta set creation could be extended to flush the virus checking queue before the delta set is taken. In this fashion, the integrity of the file system with respect to virus checking could be preserved during a failover and failback, as well as more typical operations such as migration and backup.

Figure 52:
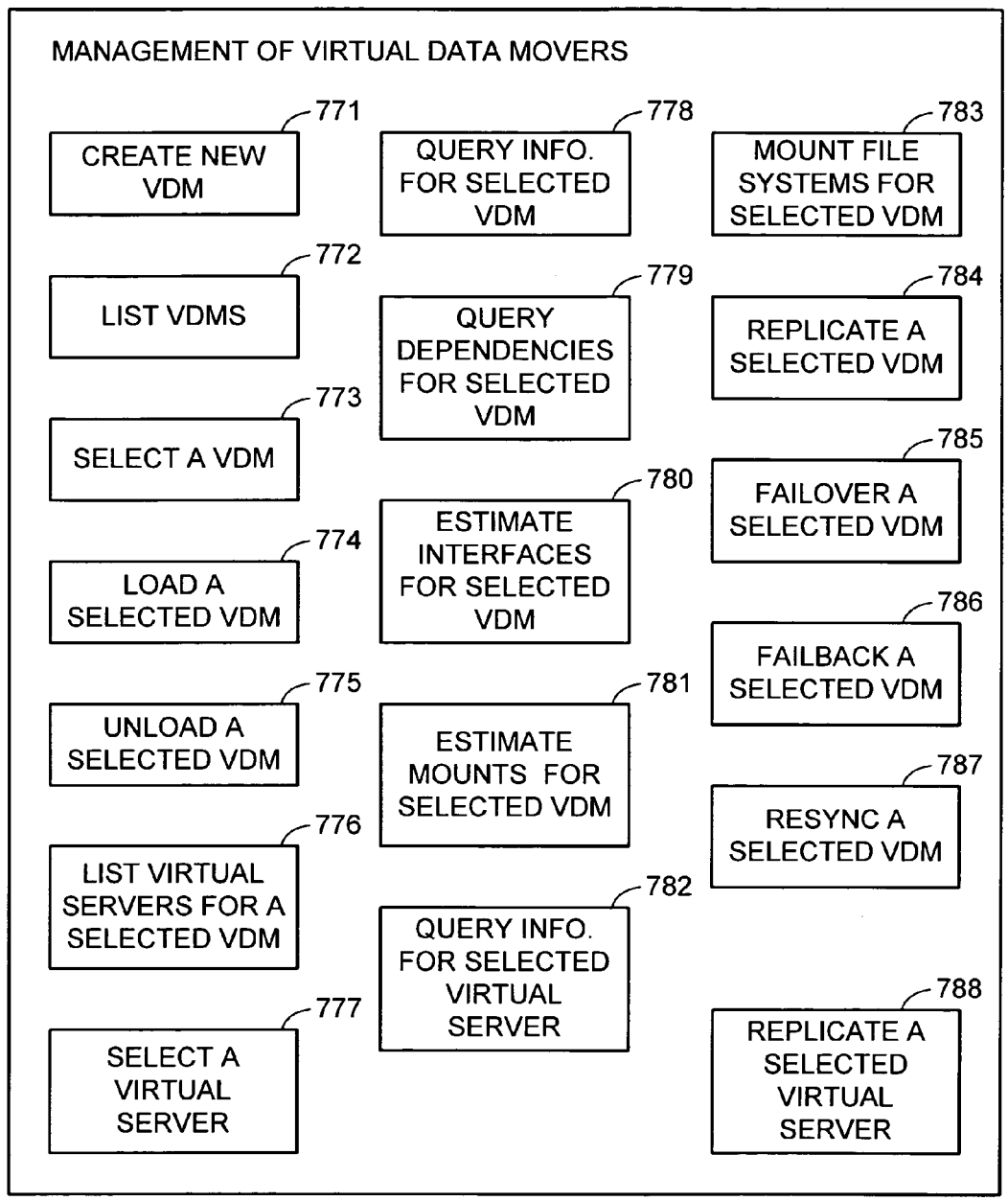
FIG. 52 shows a menu of operations selectable by a system administrator for management of a virtual data mover.

A graphical user interface (GUI) has been used for management of physical data movers within a network file server. This GUI is extended to provide management of virtual data movers within the network file server or hosted by a selected physical data mover in the network file server. FIG. 52, for example, shows various virtual data mover management functions that are selectable from the GUI. These functions include create a new VDM (771), list VDMs (772), select a VDM (773), load a selected VDM (774), unload a selected VDM (775), list virtual servers for a selected VDM (776), select a virtual server (777), query information for a selected VDM (778), query dependencies for a selected VDM (779), estimate interfaces for a selected VDM (780), estimate mounts for a selected VDM (781), query information for a selected virtual server (782), mount file systems for a selected VDM (783), replicate a selected VDM (784), failover a selected VDM (785), failback a selected VDM (786), resync a selected VDM (787), and replicate a selected virtual server (788).

Creation of a new VDM (771) involves allocation of a new root file system of the VDM unless the user specifies an existing root file system. The default size for a new root file system, for example, is 128 megabytes, which is the same as the default size for a new root file system for a physical data mover. On success, the control station of the network file server saves the binding relationship between the VDM and the root file system into the control station database for further management.

Query dependencies for a selected VDM (779) is often executed before a configuration change on the primary. For instance, dependencies on a selected VDM can be checked to ensure that the interfaces or mounts on the primary also exist on the secondary. It is also possible to check for dependencies for a proposed configuration change such as addition of a CIFS server on the primary. The system administrator will be advised of any interfaces or mounts for the proposed CIFS server that are missing from the primary or secondary.

A load of a selected VDM (774) onto a physical data mover involves the physical data mover checking whether the VDM configuration information (from the procedure of FIG. 51) has been stored on the VDM root file system, and if not, the physical data mover will require creation of the VDM configuration information. Once the configuration information has been stored on the VDM root file system, the physical data mover retrieves the configuration information from the root file system and stores it in data mover memory. However, the load operation will fail if the VDM is already loaded onto any physical data mover in the network file server.

When a VDM is loaded, the physical data mover plays a CIFS setup stored in a /.etc/vdm.cfg file to retrieve the CIFS configuration of the VDM. During this operation, the interface assignment is applied to each CIFS server, and warning messages may be reported in the server's log if a bad interface (already in used or unknown) is specified. In that case, the administrator will have to change the CIFS configuration to setup the right interface configuration.

A server_mountpoint command is provided to permit a system administrator to create a mountpoint on a specified VDM, and to check the mountpoints that are currently created on the VDM. These mountpoints are relative to the VDM. For example, a mountpoint /fs1 is actually /root_fs_vdm1/fs from the data mover point of view. Commands are also provided for mounting a file system and unmounting a file system. For a raw file system, the mountpoint is required to be created using the server_mountpoint command before a server mount operation. For a Unix-based file system, if a mountpoint is not specified, it will be automatically created when mounting a file system on a VDM and cleaned up when unmounted. The default file system name will be the same as the file system name; e.g., a file system named "fs" will be mounted as /root_fs_vdm1/fs. A system administrator can only mount or unmount a file system on a VDM when the VDM has been loaded. The control station will direct mount and unmount commands to the physical data mover to which the VDM has been loaded. For example, the system administrator can load a VDM in a passive mode, mount file systems to the VDM, and then activate the VDM.

A server_cifs command is provided to allow configuring a WINS configuration for a VDM. If no particular settings are applied to a VDM, the settings are defaulted to the values of the physical data mover containing the VDM.

Any user mapper configuration, which is for an external user mapper, is global to the physical data mover just as NIS and the password file. In general, for a CIFS client to access a UNIX-based file system, the CIFS client must be assigned a unique UNIX style user identifier (UID) and a corresponding user group identifier (GID). This enables the CIFS client to access the UNIX file permissions and quotas. The mappings of CIFS clients to UNIX style UIDs and GIDs can be established in a number of different ways, such as storage of the mappings in a static file of mappings, storage of the mappings in the Microsoft Active Directory (AD), storage of the mappings in NIS, or by running the user mapper service.

The user mapper service runs on the data mover, and it automatically and persistently allocates UIDs and GIDs from a range set aside for CIFS users. Therefore, the user mapper service simplifies CIFS only environments by taking all administration out of managing these mappings. When a CIFS user establishes an initial connection with a data mover or a VDM, the data mover or VDM requests the mapping from the user mapper, and the mapping from the user mapper is persistently cached in the root directory of the data mover or VDM. After the user mapping is cached, the data mover or VDM need not request the user mapping for the user from the user mapper, because the data mover or VDM may obtain the user mapping from the root directory of the data mover or VDM.

Stopping and starting CIFS threads (which process all VDM and non-VDM CIFS requests) is global to the physical data mover. A server_setup server_x-P cifs-o stop/start command affects all the VDMs of the physical data mover named "server_x".

Having a CIFS configuration file per VDM allows use of a different CIFS setup for WINS and home directory strategy on the same physical data mover. The share and local group databases (e.g., Kerberos and other configuration databases) are split per VDM basis. The share paths are now relative to the VDM's file system, which allows abstracting of the mount point path of the file system.

When a VDM is unloaded, the CIFS servers of the VDM are stopped and removed from the Data Mover, including release of DNS and WINS host registrations. If a computer name is defined in the VDM configuration, the unjoin from the Windows domain should be issued before unloading the VDM.

A "server_cifs-delete" command is provided to remove one or more interfaces from a CIFS server and to put them in a list of unused VDM interfaces.

A VDM move command is provided to combine an unload of a selected VDM from one physical data mover and a load of the selected VDM on another physical data mover. The move command also internally takes care of the unmount and mount of the non-root virtual server file systems contained within the VDM, so that the virtual servers contained within the selected VDM are moved as well.

A VDM can be moved from one physical data mover to another without changing the share configuration and no local group migration is required. For example:
  nas_server -vdm vdm_1 -move server_2

The nas_server command can specify interfaces to assign to the VDM. If one of these interfaces is already used by another VDM, the command fails. So, all the specified interfaces should be in the unused VDM interface list to complete the command successfully.

A move command also can be used to move an existing CIFS server of the "global" CIFS servers located on the root file system of the physical data mover to the VDM loaded on top of it or move it back. For example, in response to the command:
  server_cifs    <source    mover>-move    netbios/
    compname=<server_name> <target_mover>
the interfaces connected to the CIFS server are moved from the source server to the target server. The share and local group databases for the CIFS server are moved to the private directory of the target server. The vdm.cfg/boot.cfg files of the source and destination servers are updated so that the physical data mover is able to reload the CIFS configuration at boot time.

Kerberos information can be split into each VDM so that each VDM keeps its own keytab and configuration files. In this case CIFS servers are initially joined to the VDM, and credentials need not be moved into and out of VDMs. This means that CIFS servers are initially created in their VDMs, and joined to the domain. In this way, their kerberos information is stored in the VDM root file system. In this manner, a VDM can be unloaded from one physical data mover and loaded onto another, without the need to rejoin the domain.

A VDM delete operation is provided to allow a system administrator to irrevocably delete a VDM including the entire CIFS configuration (local group and share databases) and the VDM root file system. All non-root file systems mounted on the VDM are required to be unmounted before the deletion.

A VDM access control level command is provided to set an access control level value that defines the owner of a VDM, or the level of access allowed for users and groups defined in an access control level table for the VDM.

A VDM replicate command takes a VDM as an argument, and by default replicates, as a group, the VDM root file system as well as the data file systems associated with that VDM. The system administrator may also choose partial replication of the VDM file systems. The system administrator may request information about the status of replication. For example, in response to a "replicate info" command, the file server returns something like:

|  |  | <state> | <rate> | <rep_state> | <#deltas> |
|---|---|---|---|---|---|
| Virtual DataMover Name: | vCIFS01 |  |  |  |  |
| Currently mounted on: | server_2 |  |  |  |  |
| Filesystems: | vdm_vCIFS01 | replicated | 700 k/s | alive | 1 |
|  | mta_fs_01 | replicated | 2000 k/s | alive | 3 |
|  | mta_fs_02 | non-replicated | n/a | n/a | n/a |
|  | mta_fs_03 | replicated | n/a | out-of-sync | n/a |
|  | mta_fs_04 | replicated | 0 k/s | no-comm | 17 |

If the replication information indicates that a file system has fallen out of sync (or has never been replicated), then the system administrator can individually reinitialize the replication session.

A VDM failover command results in the failover of the file systems (VDM root and supporting file systems) as well as unloading the VDM on the primary file server and loading of the VDM on the secondary file server. In a similar fashion, a VDM failback command results in the failback of the file systems (VDM root and supporting file systems) as well as unloading the VDM on the secondary file server and loading of the VDM on the primary file server. Failover and failback, however, should be performed on an entire VDM and all of its available supporting file systems, and not just one supporting file system. Replication should support quality of service (e.g., network bandwidth throttling) at the file system level, as well as the ability to consistently snapshot a VDM and its file systems. There should be an option to consistently coordinate the delta set creation and playback for a set of file systems. Group consistent snapshots should also be supported on the read-only secondary file system side.

Failover and failback semantics should support synchronously or asynchronously issuing a failover or a failback command. In the case of a synchronous failover, a failover command is issued, production file systems are mounted read-only, final production side delta sets are cut, final production side delta sets are replayed on the secondary, and then the secondary file systems are mounted read-write. This provides the system administrator with a way to do a failover of a VDM with no data loss. For the case of asynchronous failover, a failover command is issued for the VDM, all available delta sets are replayed on the secondary side, the production file systems are mounted read-only (or ignored, depending on whether the primary is available), and the secondary file systems are taken read-write. The failover commands (especially for the synchronous case), should be executed in parallel by the control station, and not sequentially.

It should be possible for a system administrator to manage the virtual data movers as shown in FIG. 52 from a web-based GUI provided by the control station (230 in FIG. 47) of the network file server. At the control station level, the VDMs are manageable server objects that can be loaded and unloaded, and operated on from the replication level. The web-based GUI should permit the system administrator to create a new VDM, load a VDM, unload a VDM, query information about a VDM, query dependencies for a VDM, list VDMs, enumerate the expected interfaces, enumerate the expected mounts, and automatically mount file systems as far as possible. Once a VDM is loaded, the system administrator should be permitted to manage shares, CIFS servers, file systems, and the other aspects of the VDM configuration. The system administrator should be permitted to list the available VDMs, choose one, and replicate the VDM and some of the data file systems associated with the VDM. The system administrator should be permitted to choose a VDM and failover from that VDM, resync that VDM, and failback to that VDM.

The web-based GUI should permit the system administrator to monitor replication initialization and steady state from a top-level summary perspective. For example, the GUI should show all file system replications for a specified virtual server in a specified VDM. For replication of a specified virtual server, the GUI should show the number of delta sets outstanding and the state of replication and playback. The GUI should permit the system administrator to set events based on a specified percentage of the save volume being full or a specified number of delta sets outstanding for alerting the operator of impending normal or abnormal completion of the replication process.

In general, for replication of a VDM from a primary site to a secondary site, it is not necessary for there to be any checking or reservation of resources on the secondary site that would be needed for loading of the VDM at the secondary site. It is recommended, however, that items such as mounts and interfaces (as well as non-VDM aware configuration items such as DNS, NIS, time, and parameters) should be validated to ensure that mounts are identical on the primary file server and the secondary file server, interfaces are identical and functioning on the secondary file server, and the DNS, time, and parameters are properly configured on the secondary file server. Once a disaster recovery environment is established, if additional interfaces or file systems are added to the VDM at the primary file server (and the changes to the VDM are replicated to the secondary file server), then the secondary file server will automatically be checked for the additional interfaces or file systems.

During loading or operation of a VDM at the secondary site after failover, missing items or improperly configured parameters may cause problems. Therefore, the system administrator may issue a command for comparing the requirements for interfaces and mounts of a VDM with the resources available on a secondary file server. In response to the command, the secondary file server provides the system administrator with a list of any discrepancies that should normally prevent a VDM from loading on the secondary file system. Such discrepancies would include missing file systems or file systems that cannot be mounted, insufficient interfaces, or inconsistent configuration parameters. For example, a file system can be mounted in only one VDM at any given time. The system administrator may issue this command on demand, to verify the disaster recovery environment after a change. The system administrator may also run the command prior to failover.

Figure 53:
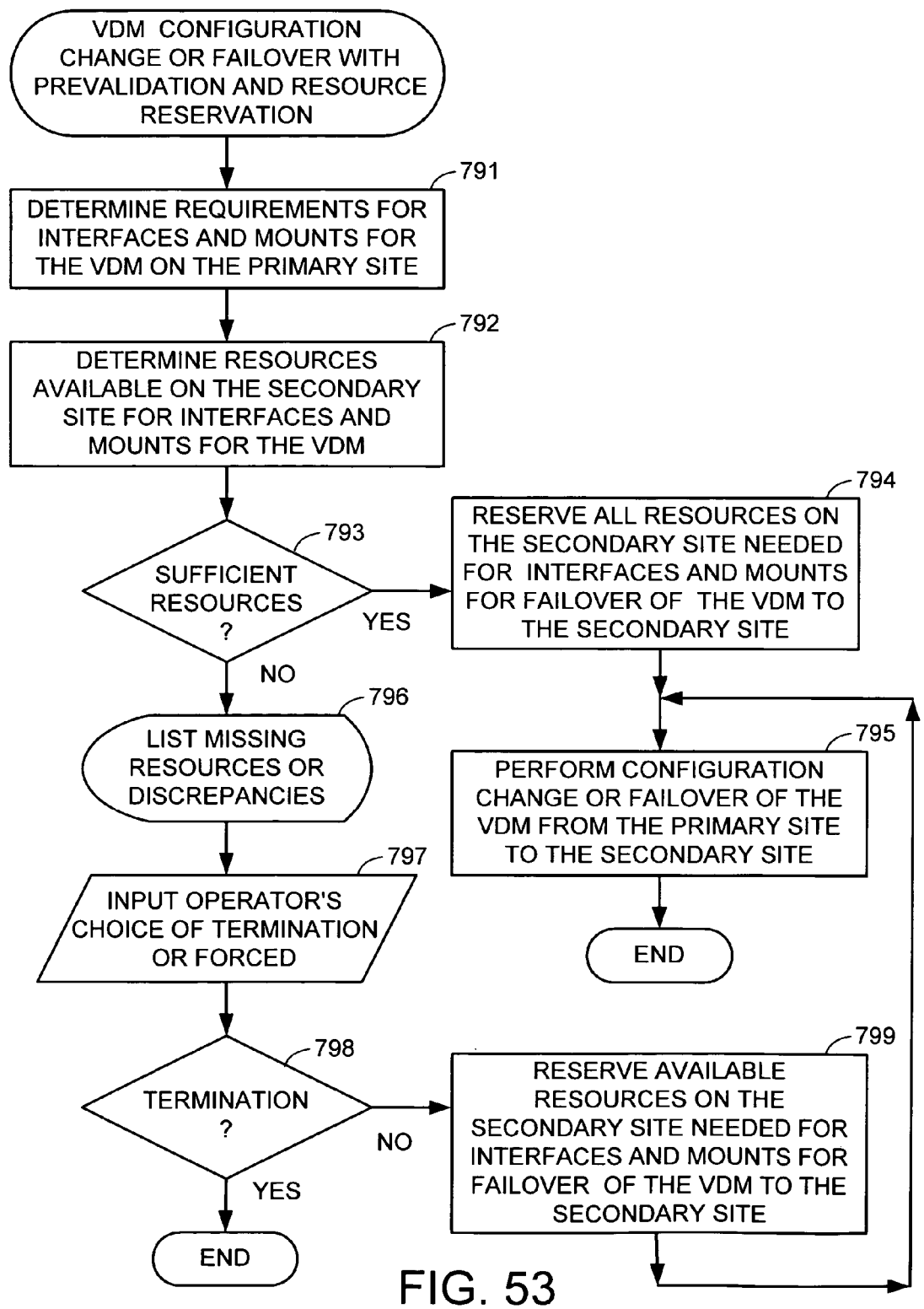
FIG. 53 is a flowchart of a procedure for prevalidation and resource reservation for a configuration change of a virtual data mover or for failover of a virtual data mover from an active site to a disaster recovery site.

Prevalidation and Resource Reservation for a Configuration Change or for Failover In a typical case, it is desirable to perform prevalidation and resource reservation when a configuration change is made to the primary that may need additional resources such as interfaces or mounts on the secondary side. It is also desirable to perform prevalidation and resource reservation just prior to failover of a VDM, in case the system has been operating without sufficient resources on the secondary side to ensure full user access at the disaster recovery site after failover from the active site to the disaster recovery site. FIG. 53 shows such a procedure, which performs prevalidation, resource reservation, and then a configuration change or failover. The procedure, for example, is performed by the control station of the primary file server in response to a configuration change request or a failover request from a system administrator. The procedure could also be performed by the control station of the secondary file server in response to a disaster at the primary file server, for a case where the VDM has already been replicated to the secondary file server.

In a first step 791, the control station determines the requirements for interfaces and mounts for the VDM on the primary site. For a desired configuration change, the requirements include the interfaces and mounts needed for the VDM to support the desired configuration change. Then in step 792, the control station determines the resources available on the secondary site for interfaces and mounts for the VDM. In step 793, if there are sufficient resources on the secondary site for the proper loading and operation of the VDM on the secondary site to support any desired configuration change and to support failover, then execution branches to step 794. In step 794, the control station reserves all of the resources on the secondary site for the interfaces and mounts needed to support any desired configuration change and for failover of the VDM to the secondary site. Then, in step 795, the control station performs the desired configuration change or the failover of the VDM from the primary site to the secondary site, and the procedure is finished.

In step 793, if there are insufficient resources on the secondary site for all of the required interfaces and mounts of the VDM, then execution continues to step 796. In step 796, the control station provides the system administrator with a list of the missing resources or discrepancies that may cause problems with the loading or operation of the VDM on the secondary file server if any desired configuration change is made and failover would occur. In step 797, the control station receives the system administrator's choice of whether to terminate or to force a configuration change or to force failover. If the system administrator chooses termination, then the procedure is finished. Otherwise, if the system administrator chooses to force a configuration change or to force failover, then in step 799 the control station reserves available resources on the secondary site needed for interfaces and mounts if any desired configuration change is made and failover of the VDM would occur. Execution continues from step 788 to step 795, to perform the desired configuration change or failover of the VDM from the primary file server to the secondary file server. After step 795, the procedure is finished.

Continuous Availability of User Mappings During Failover

In a typical disaster recovery environment, users log onto a virtual server in a virtual data mover on a primary file server at an active site. During user access, changes to the root file system of the virtual data mover and the mounted file systems of the virtual servers are replicated to a secondary file server at a disaster recovery site. When a disaster occurs at the active site, the virtual data movers are activated at the disaster recovery site in a failover operation. The users can then log onto the virtual servers at the disaster recovery site, and continue data access operations.

For some critical applications, the network traffic and processing resources for enabling a user to log onto a server are problematic in the disaster recovery environment. This is especially true for a CIFS server. For example, a typical user logging onto a Windows 2000 server may use eight different protocols (SMB, ICMP, UDP, NBT, TCP, MSRPC, LDAP, and Kerberos) transferring about 31 kilobytes of data over the network in 167 frames. See, for example, Greg Molnar et al., "Windows 2000 Startup and Logon Traffic Analysis," Microsoft Enterprises Services, White Paper, August 2000, pp. 1-34, Microsoft Corp., www.microsoft.com. Continuance of user access by the user logging into the secondary server in the event of a disaster is impeded by the need for network resources at a time when network resources are least available.

One way of providing continuance of user access in the event of a disaster is to provide mirroring of user mapping information from the logon process from the active site to the disaster recovery site. This provides continuance of user access unless the disaster occurs at the active site before all of the user mapping information from the logon process is transmitted from the active site.

Figure 54:
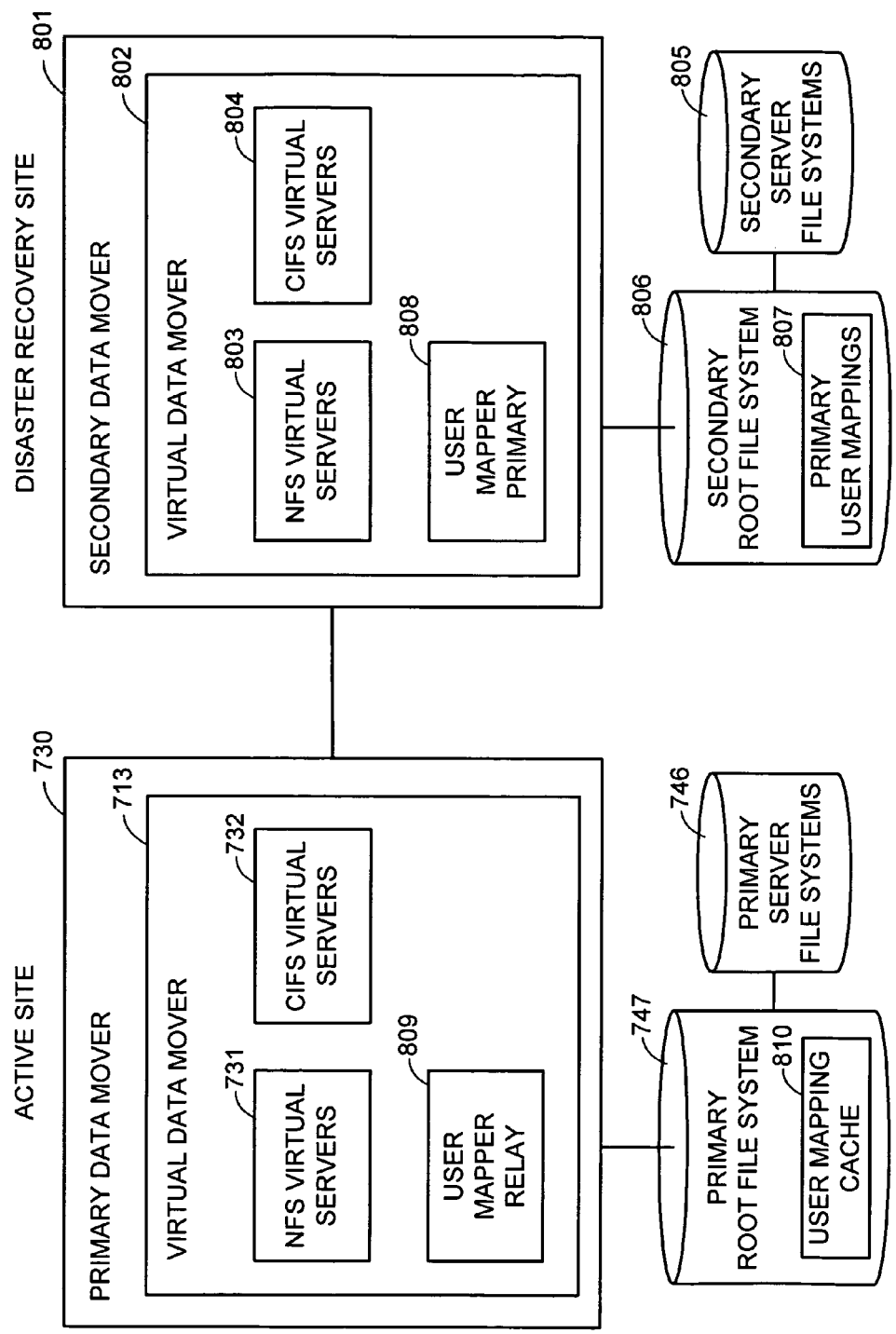
FIG. 54 shows user mapping facilities in a primary data mover at an active site and a secondary data mover at a disaster recovery site.

FIG. 54 shows an example of a disaster recovery environment in which a secondary data mover 801 at a disaster recovery site handles user mapping for the primary data mover 730 at an active site 730. A primary copy of user mappings 807 is stored in the root of the secondary root file system 806. The user mappings permit current users of the primary copy of the VDM file system 747 (and selected primary server file systems 746) to continue to access the secondary copy of the VDM file system 806 (and selected secondary server file systems 805).

The virtual data mover 713 contained in the primary data mover 730 has a user mapper relay 809 for intercepting user mapping requests. The user mapper relay 809 forwards to a user mapper primary 808 in the secondary virtual data mover 802 any request for user mapping information that is not found in a read-only user mapping cache 810 in the primary root file system 747. For example, the user mapper relay 809 forwards to the user mapper primary 808 a request for user mapping information of a new user that is logging into the primary virtual data mover 713. The user mapper primary 808 accesses the primary user mappings 807 and returns the user mappings for the new user to the user mapper relay 809. The user mapper relay 809 stores the user mapping information for the new user in the read-only user mapping cache 810 in the root of the primary root file system 747.

In the case of a disaster at the disaster recovery site 801, the user mappings for the active users are found in the user mapping cache 810. The user mapper relay 809 is then promoted to primary status and takes over the functions of the user mapper primary 806 and stores any new user mappings in the user mapping cache 810. Once operation at the disaster recovery site 801 is restored, the new user mappings are migrated from the user mapping cache 810 to the primary user mappings 807 at the disaster recovery site 801, and then the user mapper primary 808 returns to primary status and the user mapper relay 809 returns to secondary status.

Figure 55:
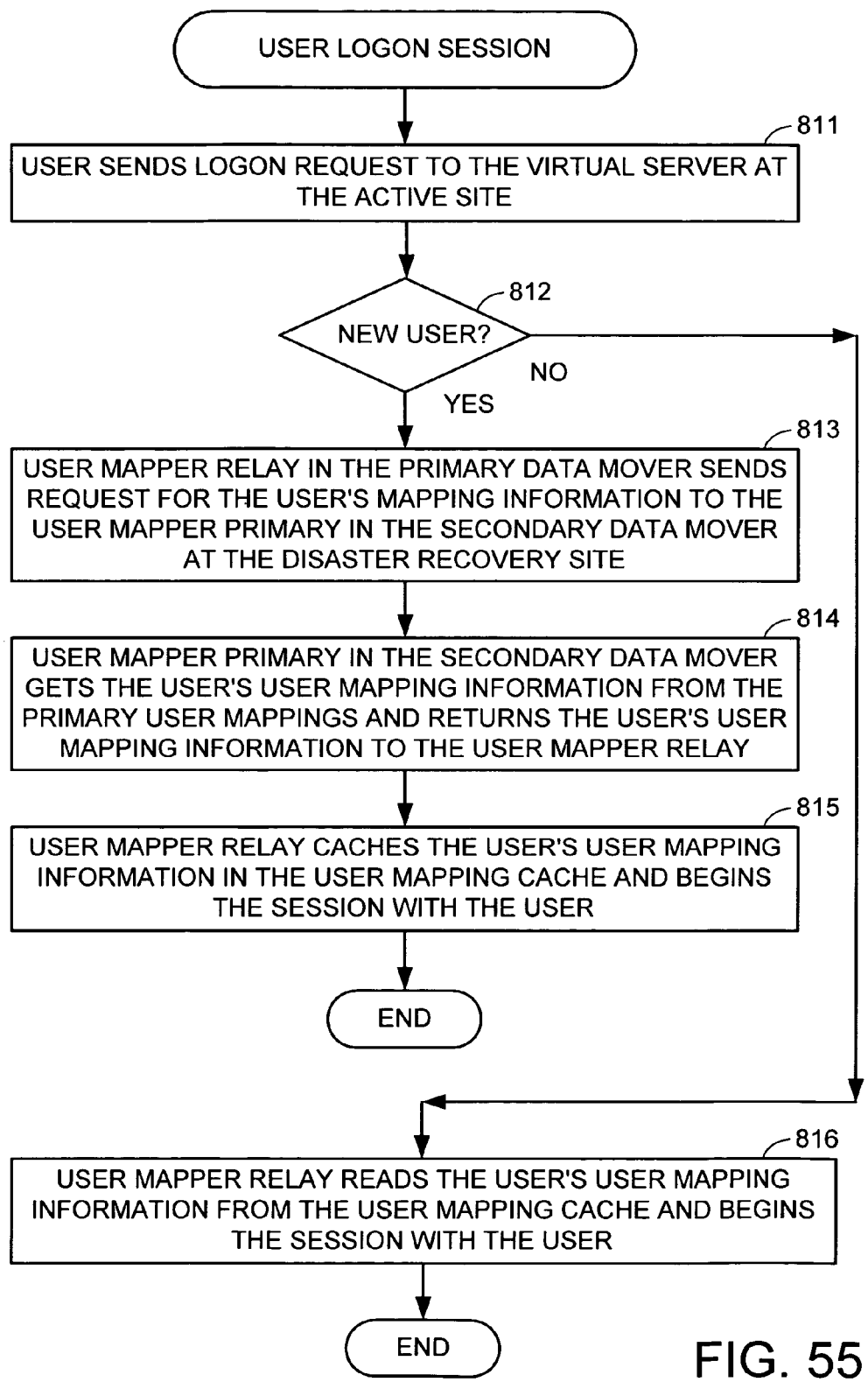
FIG. 55 is a flowchart of a procedure for using the user mapping facilities of FIG. 54.

FIG. 55 shows a procedure for using the user mapping facilities of FIG. 54. In a first step 811, the user sends a logon request to the virtual server at the active site. In step 812, user mapper relay in the primary data mover checks the user mapping cache at the active site for mapping information for the user. If the user mapping cache does not have current mapping information for the user, then the user is a new user and execution continues from step 812 to step 813. In step 813, the user mapper relay in the primary data mover sends a request for the user's mapping information to the user mapper primary in the secondary data mover at the disaster recovery site. In step 814, the user mapper primary in the secondary data mover accesses the user's user mapping information in the primary user mappings and returns the user's user mapping information to the user mapper relay. Finally, in step 814, the user mapper relay caches the user's user mapping information in the user mapping cache and begins the session with the user.

In step 812, if the user is not a new user, then execution branches from step 812 to step 816. In step 816, the user mapper relay reads the user's user mapping information from the user mapping cache and begins the session with the user.

Elimination of CIFS Disconnection During Failover

A further enhancement to the user mapping facilities in the disaster recovery environment of FIG. 54 would be the elimination of CIFS disconnections in the event of failover. CIFS disconnections may result when requested access to a file system is denied for longer than a certain timeout interval. For example, CIFS session disconnects may result from freeze/thaw operations that normally occur with the playback of delta sets during the replication process if the freeze/thaw operation is not completed within the timeout interval. These CIFS session disconnects could be eliminated by the CIFS interface in the data mover setting a timer upon receipt of a CIFS request in order to always return a response to the CIFS client within the timeout interval.

In the disaster recovery environment of FIG. 54, another possible cause of CIFS disconnects would be a disaster at the active site causing a disconnection of the CIFS session between a CIFS client and the primary data mover 730. These CIFS session disconnects could be eliminated in the disaster recovery environment of FIG. 54 by reprogramming the CIFS client to direct further CIFS requests to the disaster recovery site if the active site 730 fails to respond with the timeout interval. The secondary data mover 801 would recognize that the CIFS client is an active client, inspect the health of the active site, and initiate a failover from the active site to the disaster recovery site if the active site would be inoperative. The primary data mover could confirm to the CIFS client that further CIFS requests should be sent to the disaster recovery site, or else the IP network interconnecting the CIFS client, the active site, and the disaster recovery site could be re-programmed so that the disaster recovery site 801 would assume the network identify of the active site and would receive any further CIFS requests addressed to the active site.

Figure 56:
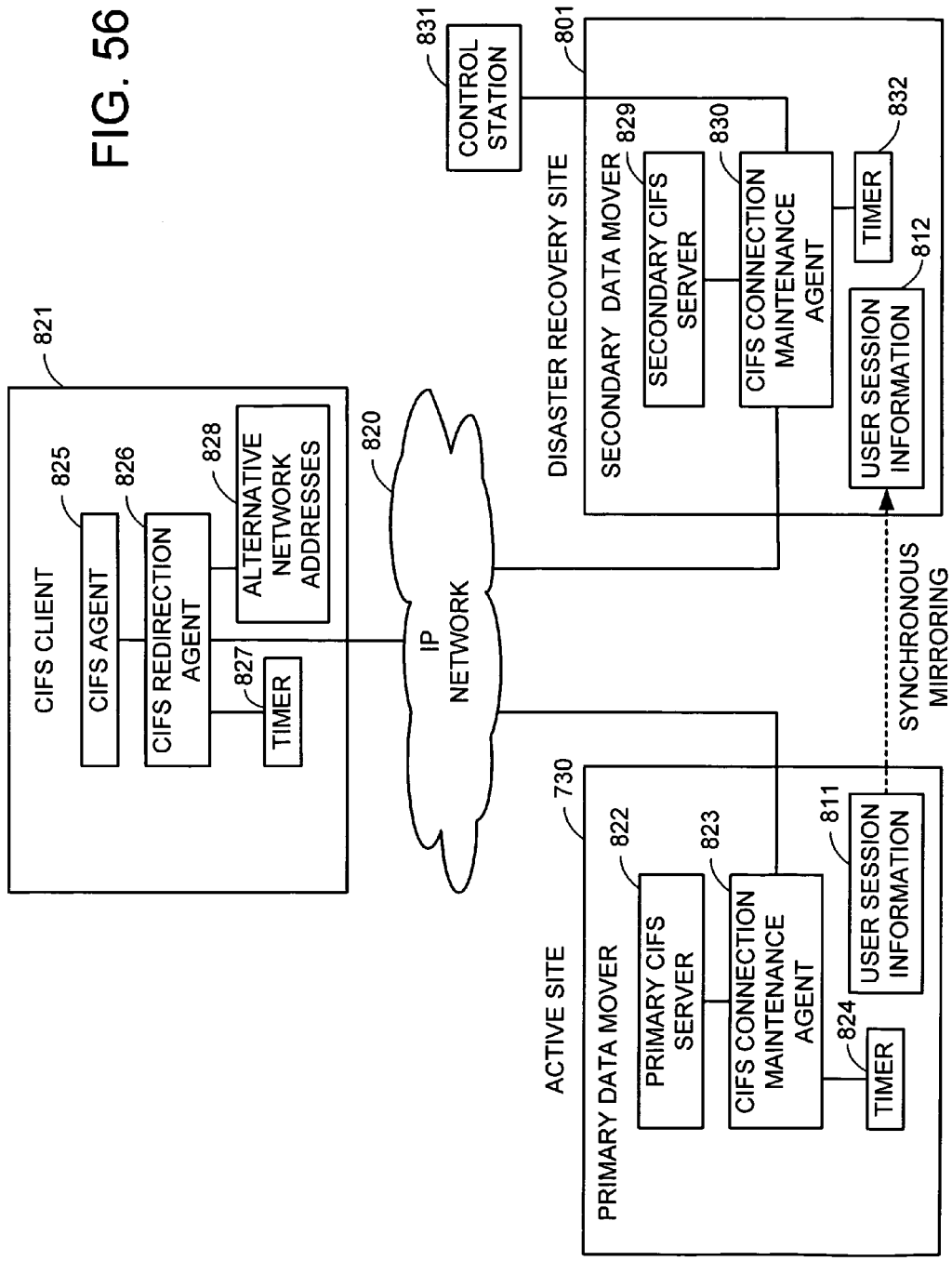
FIG. 56 is a block diagram showing a number of agents in a disaster recovery environment for maintaining a client-server connection during a disaster.

FIG. 56 shows a specific example of a disaster recovery environment for maintaining CIFS connections during a disaster. An IP network 820 interconnects a CIFS client 821 to a primary CIFS server 822 in the primary data mover 730 and to a secondary CIFS server 829 in the secondary data mover 801. For maintaining CIFS connections, a primary copy of user session information 811 is collected in the primary data mover 730 and synchronously mirrored to a secondary copy 812 in the secondary data mover 801. This synchronous mirroring of the user session information could be performed by transmitting the user session information from the primary data mover 730 to the secondary data mover 801 over the IP network 820 or by transmitting the user session information over a dedicated data transmission link from the primary data mover 730 to the secondary data mover 801.

The user session information 811, 812 identifies each user having an active session with the primary data mover, and includes the credentials assigned to each user during each active session. In this fashion, a user session may be interrupted at the active site and resumed at the disaster recovery site using the credentials in the secondary copy 812 of the user session information without a need for the user to login to the secondary data mover at the disaster recovery site. The user session information 811, 812 may also include a sufficient amount of session state information that is synchronously mirrored from the primary data mover to the secondary data mover to avoid disruption of an active session when the active session is interrupted at the active site and resumed at the disaster recovery site. For example, an active session is subdivided into a series of transactions, and session state information that is committed to the primary copy 811 of the user session information at the end of each transaction is also committed to the secondary copy 812 of user session information before the session proceeds to the next transaction.

A CIFS connection maintenance agent 823 is interposed between the IP network 820 and the primary CIFS server 822 in order to intercept CIFS requests from a CIFS agent 825 in the CIFS client 821 and to pass the CIFS requests to the primary CIFS server. The CIFS connection maintenance agent 823 has a timer 824 for determining when the primary CIFS server 822 fails to respond to a CIFS request within a first time interval that is less than the timeout interval for a CIFS connection. When the primary CIFS server 822 fails to respond to a CIFS request within the first time interval, the CIFS connection maintenance agent 823 returns a "keep alive" response to the CIFS agent 825, and also logs the problem and reports the problem to the system administrator.

The CIFS client 821 has a CIFS redirection agent 826 interposed between the CIFS agent 825 and the IP network 820 for intercepting requests and responses between the CIFS agent 825 and the IP network. The CIFS redirection agent 826 has a timer 827 for determining when the primary data mover 730 fails to respond to a CIFS request within a second time interval that is greater than the first time interval and less than the CIFS connection timeout interval. In this case, the CIFS redirection agent will return a "keep alive" response to the CIFS, and the CIFS agent will retransmit the CIFS request. After a CIFS request has been retransmitted a certain number of times to the primary data mover without a response, the CIFS redirection agent 826 accesses a database 828 of alternative network addresses. Upon finding that the database 828 contains an alternative address of a secondary CIFS server 829 registered for the primary CIFS server 822, the CIFS redirection agent 826 redirects the CIFS request to the secondary CIFS server 829 in the secondary data mover 801.

The secondary data mover 801 has a CIFS connection maintenance agent 830 interposed between the IP network 820 and the secondary CIFS server 829 for intercepting redirected CIFS requests from network clients. The CIFS connection maintenance agent 830 reports any redirected CIFS request to the control station 830 for the secondary data mover 801. The control station determines whether or not to initiate failover from the primary CIFS server to the secondary CIFS server. Once failover has been completed, the CIFS connection maintenance agent 830 passes the CIFS request to the secondary CIFS server 829 in order to continue the CIFS session. Then the CIFS connection maintenance agent functions in a fashion similar to the CIFS connection maintenance agent 823 in the primary data mover. In other words, the CIFS connection maintenance agent 830 operates a timer 832 to determine when the secondary CIFS server 829 fails to respond to a CIFS request within the first time interval, and if so, to return a "keep alive" response to the CIFS client 821 in order to maintain the CIFS connection.

Figure 57:
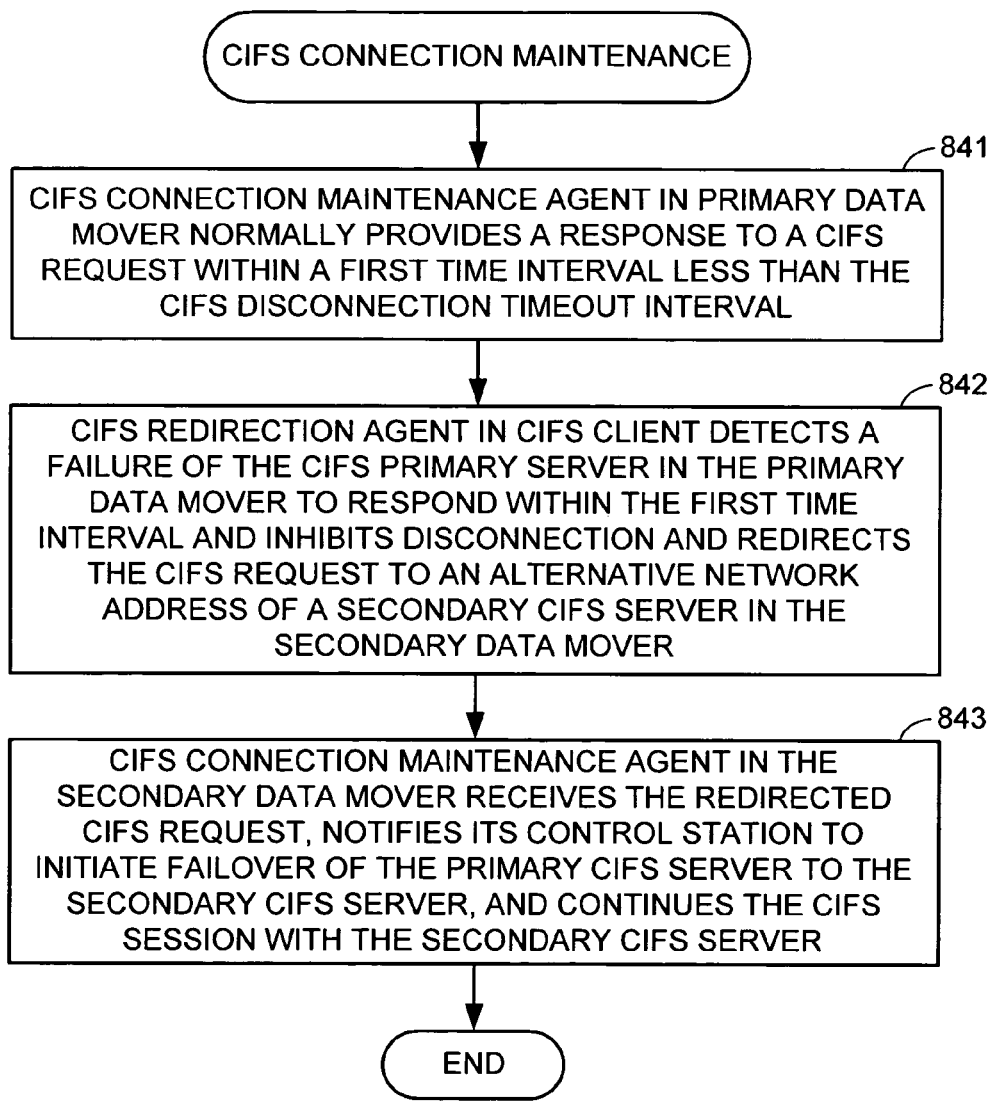
FIG. 57 is a flowchart of a procedure used in the disaster recovery environment of FIG. 56 for maintaining the client-server connection.

FIG. 57 summarizes the operation of the CIFS connection and redirection agents in the disaster recovery environment of FIG. 56. In a first step 841, the CIFS connection maintenance agent in the primary data mover normally provides a response to a CIFS request with the first time interval, which is less than the CIFS disconnection time-out interval. Next, in step 842, the CIFS redirection agent in the CIFS client detects a failure of the CIFS primary server in the primary data mover to respond within the first time interval and inhibits disconnection and redirects the CIFS request to an alternative network address of a secondary CIFS server in the secondary data mover. Finally, in step 843, the CIFS connection maintenance agent in the secondary data mover receives the redirected CIFS request, notifies it control station to initiate failover of the primary CIFS server to the secondary CIFS server, and continues the CIFS session with the secondary CIFS server.

The discussion above concerning the replication of virtual data movers from an active site to a data recovery site has focused on techniques for reducing or eliminating disruption due to a disaster at the active site or loss of communication between the user and the active site. The replication of virtual data movers, however, can be particularly useful for various situations where the disruption cannot be eliminated or when a disruption does not occur. One such situation is where it is desired to maintain a series of snapshot copies of the virtual data mover for recovery from software and data corruption, and for data mining tasks. In this situation, the snapshot copies of the virtual data mover can be created at the disaster recovery site without use of any processing capability or storage capacity at the primary site.

Figure 58:
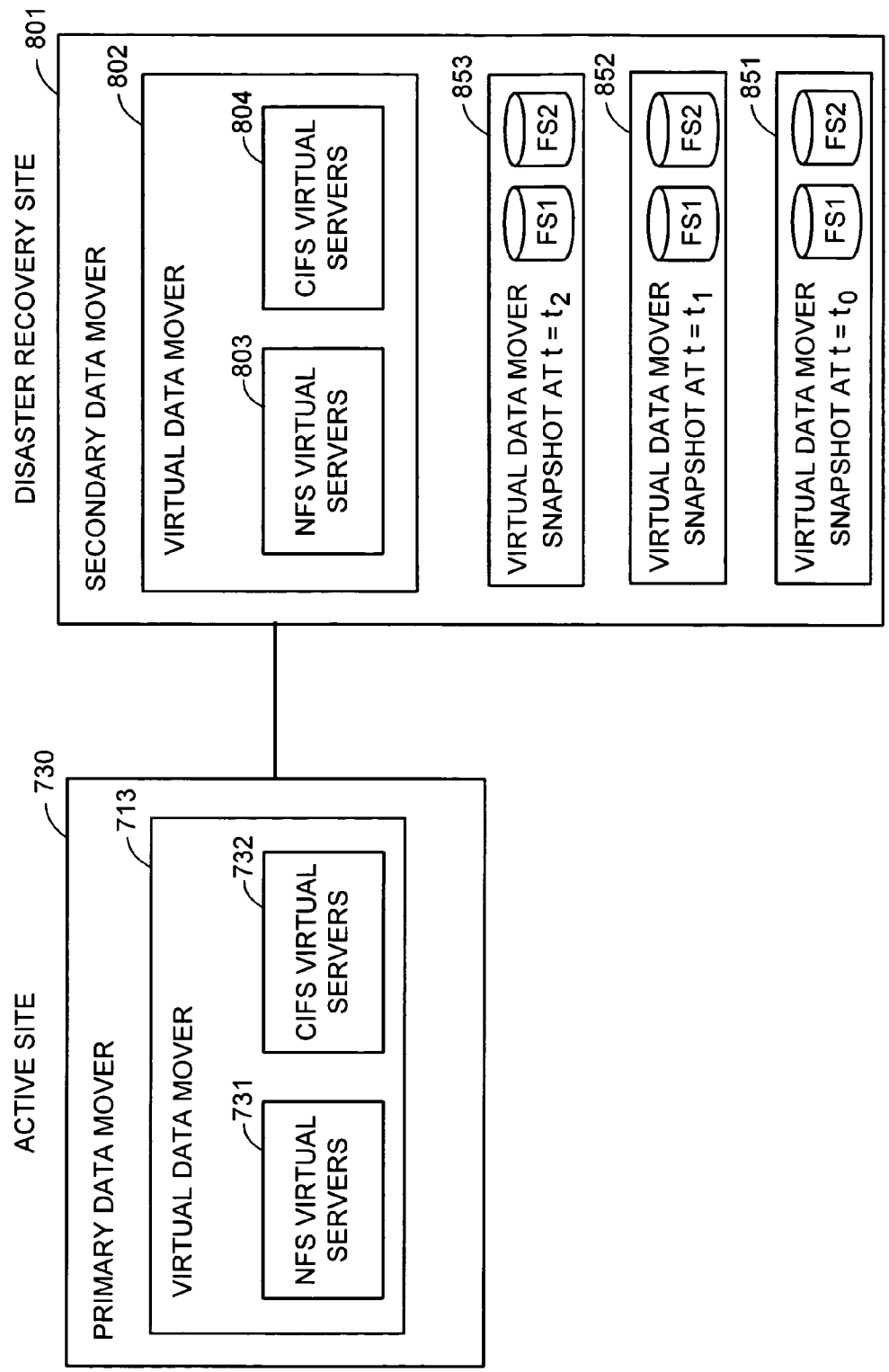
FIG. 58 is a block diagram showing a series of snapshot copies of a virtual data mover at the disaster recovery site.

FIG. 58, for example, shows that the secondary data mover 801 has created a series of snapshot copies of the virtual data mover 802 at respective points in time at $t=t_0$, $t=t_1$, and $t=t_2$. It is desired for each of these snapshot copies to have a consistent state for the virtual data mover, and it is also desired for the user files to be in a group consistent state in the user file systems (FS1, FS2) in each snapshot copy 851, 852, 853. For example, if the user files include financial accounts in which money is transferred from an account in the first user file system FS1 to an account in the second user file system FS2, the user file systems would be group consistent when the accounts balance. The accounts would balance before the transaction and once the transaction has completed. Therefore, it would be possible to permit user access to resume from any such prior consistent state of the virtual data mover.

For example, if the primary data mover 730 were to crash and it were found that the files associated with the primary data mover were corrupted, an attempt would be made to restore the virtual data mover 712 at the primary site with the present state of the virtual data mover 802 at the disaster recovery site. However, if the corruption were caused by a virus or by malicious tampering, it is possible that the present state of the virtual data mover 802 could also be corrupted. Under these circumstances, it would be desirable to restore the virtual data mover 713 at the active site with the state of the most recent one of the snapshot copies 853, 852, 853 that has not been corrupted.

Figure 59:
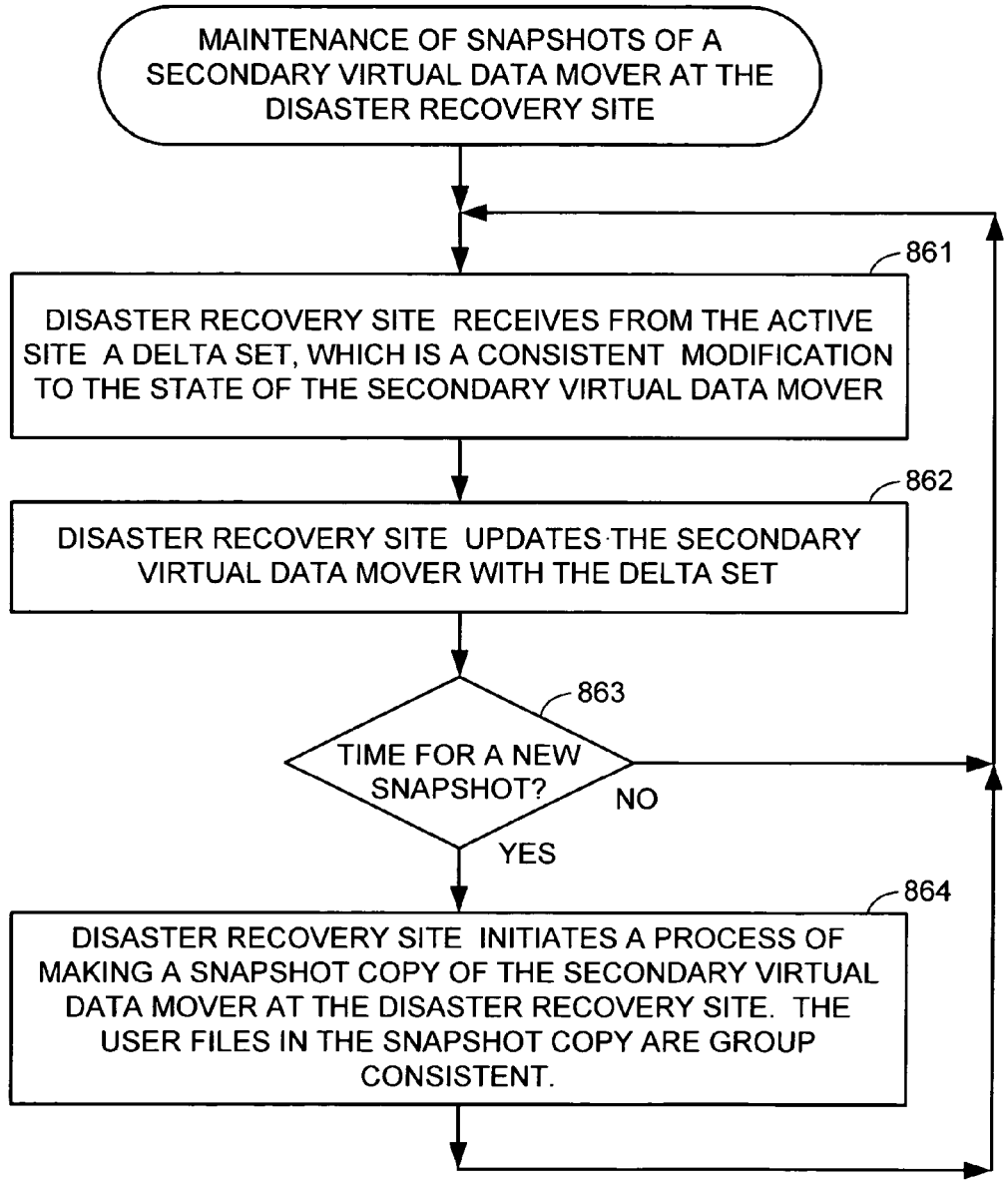
FIG. 59 is a flowchart of a procedure used at the disaster site for creating the series of snapshot copies of the virtual data mover at the disaster recovery site.

FIG. 59 is a flowchart of a procedure used at the disaster site for creating the series of snapshot copies of a secondary virtual data mover at the disaster recovery site. Basically, a background process creates each snapshot copy concurrent with the updating of the secondary virtual data mover with delta sets from the active site. In a first step 861, the disaster recovery site receives a delta set from the active site. The delta set is a consistent modification to the environment of the secondary virtual data mover. In step 862, the disaster recovery site updates the secondary virtual data mover with the delta set. In step 863, if it is not time for a new snapshot of the secondary virtual data mover, then execution loops back to step 861.

Otherwise, if it is time for a new snapshot of the secondary virtual data mover, then in step 864, the disaster recovery site initiates a process of making a snapshot copy of the secondary virtual data mover. For example, snapshots for backup purposes can be made periodically, and before or after a major configuration change, such as before the deletion of a virtual server, or after the addition of a virtual server. Execution loops from step 864 back to step 861. Most of the processing for making the snapshot copy occurs in background, after execution loops from step 864 back to step 861.

In order for user files to be in a group consistent state when a snapshot is made, user access at the active site can be temporarily suspended while current transactions complete, and any modifications from these current transactions are included in delta sets transmitted from the active site to the disaster recovery site. Once the modifications from these current transactions are included in delta sets transmitted to the disaster recovery site, user access at the active site can be resumed. Once the modification from these current transactions have been received in delta sets transmitted to the disaster recovery site and integrated into the secondary copies of the user files at the disaster recovery site, a snapshot copy of the secondary virtual data mover is made at the disaster recovery site.

In view of the above, there has been described a disaster recovery system in which files that define the user environment of a file server at an active site are replicated to produce a virtual server at a disaster recovery site remote from the active site. To discontinue user access at the active site and resume user access at the disaster recovery site, the disaster recovery system determines whether there are sufficient network interfaces and file system mounts at the disaster recovery site for the virtual server for providing user access at the disaster recovery site. If so, the required resources are reserved for the virtual file server, and user access is switched over from the active site to the disaster recovery site. If not, an operator is given a list of missing resources or discrepancies, and a choice of termination or forced failover. Interruptions during the failover can be avoided by maintaining a copy of user mappings and a copy of session information at the disaster recovery site, and keeping alive client-server connections and re-directing client requests from the active site to the disaster recovery site during a failure at the active site.

What is claimed is:

1. In a disaster recovery environment including a primary file server at an active site and a secondary virtual file server at a disaster recovery site remote from the active site, the secondary virtual file server including a collection of files being replicated from the primary file server to the disaster recovery site, the secondary virtual file server needing resources including network interfaces and file system mounts at the disaster recovery site for providing user access at the disaster recovery site, a method comprising:

a) determining whether there are sufficient network interfaces and file system mounts at the disaster recovery site for the secondary virtual file server for providing user access at the disaster recovery site; and b) upon finding that there are sufficient network interfaces and file system mounts at the disaster recovery site for the secondary virtual file server for providing user access at the disaster recovery site, reserving the network interfaces and file system mounts that are needed at the disaster recovery site for providing user access at the disaster recovery site;

wherein a primary copy of user mappings is kept at the disaster recovery site, and a read-only cache of the user mappings is kept at the active site.

2. In a disaster recovery environment including a primary file server at an active site and a secondary virtual file server at a disaster recovery site remote from the active site, the secondary virtual file server including a collection of files being replicated from the primary file server to the disaster recovery site, the secondary virtual file server needing resources including network interfaces and file system mounts at the disaster recovery site for providing user access at the disaster recovery site, a method comprising:

a) determining whether there are sufficient network interfaces and file system mounts at the disaster recovery site for the virtual secondary file server for providing unrestricted user access at the disaster recovery site once a configuration change would be made to the primary file server; and b) upon finding that there are insufficient network interfaces and file system mounts at the disaster recovery site for the virtual secondary file server for providing unrestricted user access at the disaster recovery site once the configuration change would be made to the primary file server, providing an operator with a list of missing resources or discrepancies, and receiving from the operator a choice of termination or configuration change; and c) upon receiving from the operator a choice of configuration change, reserving network interfaces and file system mounts that are available and needed at the disaster recovery site for providing user access at the disaster recovery site once the configuration change would be made to the primary file server; and then d) performing the configuration change to the primary file server.

3. In a disaster recovery environment including a primary file server at an active site and a secondary virtual file server at a disaster recovery site remote from the active site, the secondary virtual file server including a collection of files being replicated from the primary file server to the disaster recovery site, the secondary virtual file server needing resources including network interfaces and file system mounts at the disaster recovery site for providing user access at the disaster recovery site, a method comprising:

a) determining whether there are sufficient network interfaces and file system mounts at the disaster recovery site for the virtual secondary file server for providing unrestricted user access at the disaster recovery site; and b) upon finding that there are insufficient network interfaces and file system mounts at the disaster recovery site for the virtual secondary file server for providing unrestricted user access at the disaster recovery site, providing an operator with a list of missing resources or discrepancies, and receiving from the operator a choice of termination or forced failover; and c) upon receiving from the operator a choice of forced failover, reserving network interfaces and file system mounts that are available and needed at the disaster recovery site for providing user access at the disaster recovery site; and then d) performing failover of user access from the active site to the disaster recovery site.

4. In a disaster recovery environment including a primary file server at an active site and a secondary virtual file server at a disaster recovery site remote from the active site, the secondary virtual file server including a collection of files being replicated from the primary file server to the disaster recovery site, a method comprising:

maintaining a primary copy of user mappings at the disaster recovery site and a read-only cache of the user mappings at the active site during user file access at the active site; and upon failover of user access from the primary file server at the active site to the virtual secondary server at the disaster recovery site, accessing the primary copy of user mappings at the disaster recovery site in order to continue user file access at the disaster recovery site.

5. The method as claimed in claim 4, wherein user session information is kept at the disaster recovery site so that users accessing files of the primary file server at the active site may continue to access copies of the files at the disaster recovery site without a need to log onto the disaster recovery site upon failover of user access from the active site to the disaster recovery site.

6. A disaster recovery system comprising:

a primary file server at an active site; and a secondary virtual file server at a disaster recovery site remote from the active site, the secondary virtual file server including a collection of files that have been replicated from the primary file server to the disaster recovery site, the secondary virtual file server needing resources including network interfaces and file system mounts at the disaster recovery site for providing user access at the disaster recovery site, wherein the disaster recovery system is programmed for responding to a request from a system administrator by:

a) determining whether there are sufficient network interfaces and file system mounts at the disaster recovery site for the secondary virtual file server for providing user access at the disaster recovery site; and b) upon finding that there are sufficient network interfaces and file system mounts at the disaster recovery site for the secondary virtual file server for providing user access at the disaster recovery site, reserving the network interfaces and file system mounts that are needed at the disaster recovery site for providing user access at the disaster recovery site;

and which includes storage at the disaster recovery site containing a primary copy of user mappings, and which includes a read-only cache of the user mappings at the active site.

7. A disaster recovery system comprising:

a primary file server at an active site; and a secondary virtual file server at a disaster recovery site remote from the active site, the secondary virtual file server including a collection of files that have been replicated from the primary file server to the disaster recovery site, the secondary virtual file server needing resources including network interfaces and file system mounts at the disaster recovery site for providing user access at the disaster recovery site, wherein the disaster recovery system is programmed for responding to a configuration change request from a system administrator by:

a) determining whether there are sufficient network interfaces and file system mounts at the disaster recovery site for the virtual secondary file server for providing unrestricted user access at the disaster recovery site once a configuration change would be made to the primary file server; and b) upon finding that there are insufficient network interfaces and file system mounts at the disaster recovery site for the virtual secondary file server for providing unrestricted user access at the disaster recovery site once the configuration change would be made to the primary file server, providing the system administrator with a list of missing resources or discrepancies, and receiving from the operator a choice of termination or configuration change; and c) upon receiving from the operator a choice of configuration change, reserving network interfaces and file system mounts that are available and needed at the disaster recovery site for providing user access at the disaster recovery site once the configuration change would be made to the primary file server; and then d) performing the configuration change to the primary file server.

8. A disaster recovery system comprising:

a primary file server at an active site; and a secondary virtual file server at a disaster recovery site remote from the active site, the secondary virtual file server including a collection of files that have been replicated from the primary file server to the disaster recovery site, the secondary virtual file server needing resources including network interfaces and file system mounts at the disaster recovery site for providing user access at the disaster recovery site, wherein the disaster recovery system is programmed for responding to a failover request from a system administrator by:

a) determining whether there are sufficient network interfaces and file system mounts at the disaster recovery site for the virtual secondary file server for providing unrestricted user access at the disaster recovery site; and b) upon finding that there are insufficient network interfaces and file system mounts at the disaster recovery site for the virtual secondary file server for providing unrestricted user access at the disaster recovery site, providing the system administrator with a list of missing resources or discrepancies, and receiving from the operator a choice of termination or forced failover; and c) upon receiving from the operator a choice of forced failover, reserving network interfaces and file system mounts that are available and needed at the disaster recovery site for providing user access at the disaster recovery site; and then d) performing failover of user access from the active site to the disaster recovery site.

9. A disaster recovery system comprising:

a primary file server at an active site; and a secondary virtual file server at a disaster recovery site remote from the active site, the secondary virtual file server including a collection of files being replicated from the primary file server to the disaster recovery site;

wherein the disaster recovery system is programmed for:

maintaining a primary copy of user mappings at the disaster recovery site and a read-only cache of the user mappings at the active site during user file access at the active site; and upon failover of user access from the primary file server at the active site to the virtual secondary server at the disaster recovery site, for accessing the primary copy of user mappings at the disaster recovery site in order to continue user file access at the disaster recovery site.

* * * * *